United States Patent
Kobayashi et al.

(10) Patent No.: US 6,825,886 B2
(45) Date of Patent: Nov. 30, 2004

(54) PICTURE SIGNAL PROCESSING METHOD AND APPARATUS

(75) Inventors: Hiroshi Kobayashi, Kanagawa (JP); Minoru Morio, Tokyo (JP); Motoki Kato, Kanagawa (JP); Nobuhiro Igi, Kanagawa (JP); Koji Obata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/106,290

(22) Filed: Mar. 25, 2002

(65) Prior Publication Data

US 2002/0141503 A1 Oct. 3, 2002

Related U.S. Application Data

(63) Continuation of application No. 09/220,746, filed on Dec. 23, 1998.

(30) Foreign Application Priority Data

Dec. 26, 1997 (JP) ............................................. 9-361500

(51) Int. Cl.[7] .............................................. H04N 7/18
(52) U.S. Cl. ............. 348/405; 375/240.12; 375/240.27; 375/240.29
(58) Field of Search ......................... 375/240.01–240.29

(56) References Cited

U.S. PATENT DOCUMENTS

| | | | | |
|---|---|---|---|---|
| 5,557,330 A | * | 9/1996 | Astle .......................... 348/394.1 |
| 5,819,035 A | * | 10/1998 | Devaney et al. ............. 709/202 |
| 5,875,003 A | * | 2/1999 | Kato et al. ................... 348/699 |
| 5,974,197 A | * | 10/1999 | Lee et al. ..................... 382/268 |
| 6,028,965 A | * | 2/2000 | Normile ...................... 382/250 |
| 6,188,799 B1 | * | 2/2001 | Tan et al. .................... 382/260 |
| 6,195,394 B1 | * | 2/2001 | Arbeiter et al. ......... 375/240.29 |

* cited by examiner

*Primary Examiner*—Andy Rao
(74) *Attorney, Agent, or Firm*—Frommer Lawrence & Haug LLP; William S. Frommer; Darren M. Simon

(57) ABSTRACT

A picture signal processing method and apparatus in which the block distortion as well as the mosquito noise produced on encoding/decoding a picture is to be suppressed. The picture signal processing apparatus includes a filter for filtering a picture, an encoder 5 for block-encoding the picture, a decoder 13 for decoding an encoded picture from the encoder 5 and a noise reducing unit 14 for reducing at least the block distortion of a picture decoded by the decoding unit 13 to reduce the noise otherwise produced on encoding/decoding the picture.

22 Claims, 38 Drawing Sheets

$$\begin{pmatrix} 1 & k & 1 \\ k & k^2 & k \\ 1 & k & 1 \end{pmatrix} / (k+2)^2$$

```
k_current = f ( d_current , k_gop ) ;   ........ (a)
if ( k_current > A*k_ref ) {           ............. (b)
  k_current = A*k_ref ;
}
else if ( k_current < B*k_ref ) {      .......... (c)
  k_current = B*k_ref ;
}
            WHERE A > 1 , B < 1
```

```
if ( d_current > C*d_ref ) {          · · · · · · · · · · · · · · · (d)
  d_current = C*d_ref ;
}
else if ( d_current < D*d_ref ) {     · · · · · · · · · · · (e)
  d_current = D*d_ref ;
}
k_current = f ( d_current , k_gop ) ; · · · · · · · · (f)
          WHERE C > 1 , D < 1
```

$$k\_current = \frac{t}{s+t} k\_ref(2) + \frac{s}{s+t} k\_ref(3) ; \cdots (g)$$

```
if ( k_current > E*k_ref(4) {  ................ (h)
  k_current = E*k_ref(4) ;
}
else if ( k_current < F*k_ref(4) ) {  ........... (i)
  k_current = F*k_ref(4) ;
}
           WHERE E > 1 , F < 1
```

FIG.21

$$d\_current = \frac{t}{s+t} d\_ref(2) + \frac{s}{s+t} d\_ref(3) ; \cdots (j)$$

```
if ( d_current > G*d_ref(4) {  ................ (k)
  d_current = G*d_ref(4) ;
}
else if ( d_current < H*d_ref(4) ) {  ........... (l)
  d_current = H*d_ref(4) ;
}
k_current = f ( d_current , k_gop ) ;  ........ (m)
           WHERE G > 1 , H < 1
```

FIG.23

PICTURE SIGNAL PROCESSING METHOD AND APPARATUS

This application is a continuation of U.S. patent application Ser. No 09/220,746, filed Dec. 23, 1998.

BACKGROUND OF THE INVENTION

1. Field of the Invention

This invention relates to a picture signal processing method and apparatus used with advantage for recording/reproducing moving picture signals and still picture signals on or from a recording medium, such as an optical disc or a magnetic tape, and for transmitting moving and still picture signals from a sender to a receiver over a transmission path such as in a teleconferencing system, a television telephone system or in a broadcasting equipment.

2. Description of the Related Art

As an encoding system for efficient encoding of still or moving pictures, by way of data compression, there has so far been known a block encoding system, such as block discrete cosine transform (DCT) encoding system.

In companding picture data by encoding, the ringing noise (mosquito noise) or block distortion tends to be produced. The higher the compression ratio, the more readily the noise is liable to be produced. Also, the more intricate the input picture data, the more readily the noise is liable to be produced. The result is that deterioration due to the noise is produced in a picture corresponding to the picture data obtained on compression/expansion.

For reducing picture deterioration of the picture data due to noise produced on compression/expansion, it may be contemplated to use a pre-filter, such as a low-pass filter (LPF), and to perform filtering on the picture data corresponding to the input picture prior to encoding.

FIG. 1 shows an example of an encoding device for moving picture signals using the above-mentioned pre-filter.

In the encoding device, shown in FIG. 1, digital moving picture signals, entering a terminal 201, are filtered by a pre-filtering circuit 202. The filtered picture signals for processing are entered to an encoding circuit 205.

The encoding circuit 205 encodes digital moving picture signals using a hybrid encoding method combined from the motion-compensated inter-frame prediction and transform coding, such as DCT. That is, the encoding circuit 205 performs inter-frame/intra-frame adaptive prediction on an input signal S211, while performing DCT on prediction error signals by an arithmetic unit 206. A quantizer 208 quantizes calculated DCT coefficients to output an encoded output signal S215 at a terminal 220. It is noted that the quantizer 208 sets the quantization step size which will give a constant bitrate of the output signal S215.

The output signal S215 is dequantized by a dequantizer 209 and inverse DCTed by an inverse DCT unit 210 to restore prediction error signals to which prediction picture signals are added at an arithmetic unit 211 by way of local decoding. This addition gives decoded picture signals S213 which are stored in a frame memory 212.

In general, the more intricate the input moving picture or the more vigorous its motion, the larger becomes an inter-frame difference signal S212. If, for suppressing the volume of the generated information to a pre-set bitrate, coarse quantization is used at this time at the quantizer 208, perceptually outstanding block distortion is produced to deteriorate the apparent picture quality.

Thus, in the encoding device shown in FIG. 1, the low-pass passband of the pre-filter with respect to the input picture is restricted, in dependence upon the magnitude of the inter-frame difference signal of the input picture, responsive to the magnitude of the inter-frame difference signal of an input picture, in consideration that the magnitude of such inter-frame difference signal of the input signal affects the quantity of generated bits for inter-frame predictive coding. This attenuates the energy of the prediction error signals to prohibit coarse quantization to improve the apparent picture quality.

The variable pre-filter controlling method in the present encoding device is now explained.

In the arithmetic unit 204, an inter-frame difference r between a picture signal S210 entering the input terminal 201 and a picture signal S214 entering a memory 212 is calculated. The picture signal S214 is a signal to which reference is had in the inter-frame prediction for the input picture signal S210. The inter-frame difference r is entered to a pre-filter controller 203 which then generates a pre-filtering coefficient k, as a parameter for controlling the low-pass passband of the pre-filter, in dependence upon the magnitude of the inter-frame difference r. The pre-filter 202 has two-dimensional low-pass filter characteristics, shown in FIG. 2, with the low-pass passband showing monotonous increase with respect to the pre-filtering coefficient k. FIG. 3 shows the relation between the inter-frame difference r and the pre-filtering coefficient k. By the above relation, the pre-filter controller 203 controls the low-pass characteristics of the pre-filter depending on the magnitude of the inter-frame difference signal of the input picture.

As a technique for reducing the mosquito noise and the block distortion following the decoding, there is known a technique employing a system in which the pixel-based noise quantity is predicted from the macroscopic characteristics of the block level and from the microscopic characteristics of the pixel level, based on the local statistic quantity and the encoding information of the picture, and the noise component is removed by adaptive filtering.

As the technique for reducing the block distortion or the mosquito noise, there is known a post-filtering technique of filtering as-decoded output picture signals in addition to the above-described technique.

Although the above-mentioned pre-filtering processing, prior to encoding, is able to suppress the mosquito noise, the block distortion cannot be effectively removed especially in a picture performing vigorous movements. Moreover, the high frequency components are diminished by pre-filtering, such that, if a pre-filtered picture is decoded, only the block distortion is apparent to the eye.

In the post-filtering processing, performed following the decoding, there is no change caused in the encoding efficiency following the encoding, because no processing occurs on the decoding side, such that it is not possible to cope successfully with roughed quantization over an entire input picture performing vigorous movements difficult to predict.

That is, in a conventional picture encoding/decoding apparatus, the pre-filtering prior to the encoding and the post-filtering following the decoding are performed independently of each other, such that the noise cannot be removed effectively.

SUMMARY OF THE INVENTION

It is therefore an object of the present invention to provide a picture signal processing method and apparatus whereby it is possible to suppress the block distortion or the mosquito noise generated on encoding or decoding input moving or still pictures.

In one aspect, the present invention provides a picture signal processing apparatus for encoding and decoding an input picture on a block basis, including filtering means for filtering the input picture responsive to characteristics of the input picture, encoding means for block encoding a picture filtered by the filtering means, decoding means for decoding the picture encoded by the encoding means and noise reducing means for reducing at least the block distortion of the picture decoded by the decoding means.

With this picture signal processing apparatus, the input is filtered by a filtering means before being passed through the encoding means, while the picture decided by the decoding means is reduced in block distortion by noise reducing means.

With the picture signal processing apparatus, the input is improved in encoding efficiency by filtering, while it is reduced in the block distortion or mosquito noise otherwise produced on decoding.

Thus, with the present picture signal processing apparatus, the high frequency components of the input picture are reduced and the block distortion etc produced on decoding is rendered apparent to improve the detection accuracy of the block distortion etc. Thus, the noise can be reduced effectively by the noise reducing means following the decoding.

In another aspect, the present invention provides a picture signal processing method for encoding and decoding an input picture on a block basis, including filtering the input picture responsive to characteristics of the input picture, block encoding a filtered input picture, decoding the picture encoded by the block encoding and reducing at least the block distortion of the decoded picture.

With this picture signal processing method, the input picture is filtered before being encoded, while the block distortion in the picture is reduced following the decoding.

Thus, with the present picture signal processing method, the high frequency components of the input picture are reduced and the block distortion etc produced on decoding is rendered apparent to improve the detection accuracy of the block distortion etc. Thus, the noise can be reduced effectively following the decoding.

BRIEF DESCRIPTION OF THE DRAWINGS

FIG. 21 shows an example of calculating pre-filtering characteristics in a picture of non-filtering characteristics by interpolation using pre-filter characteristics used in a minor block to which reference is had in the inter-frame prediction for the current minor block.

FIG. 23 illustrates an example of calculations of the low-pass pre-filtering characteristics k_current of a picture of non-filtering characteristics.

DESCRIPTION OF THE PREFERRED EMBODIMENTS

Figure 1:
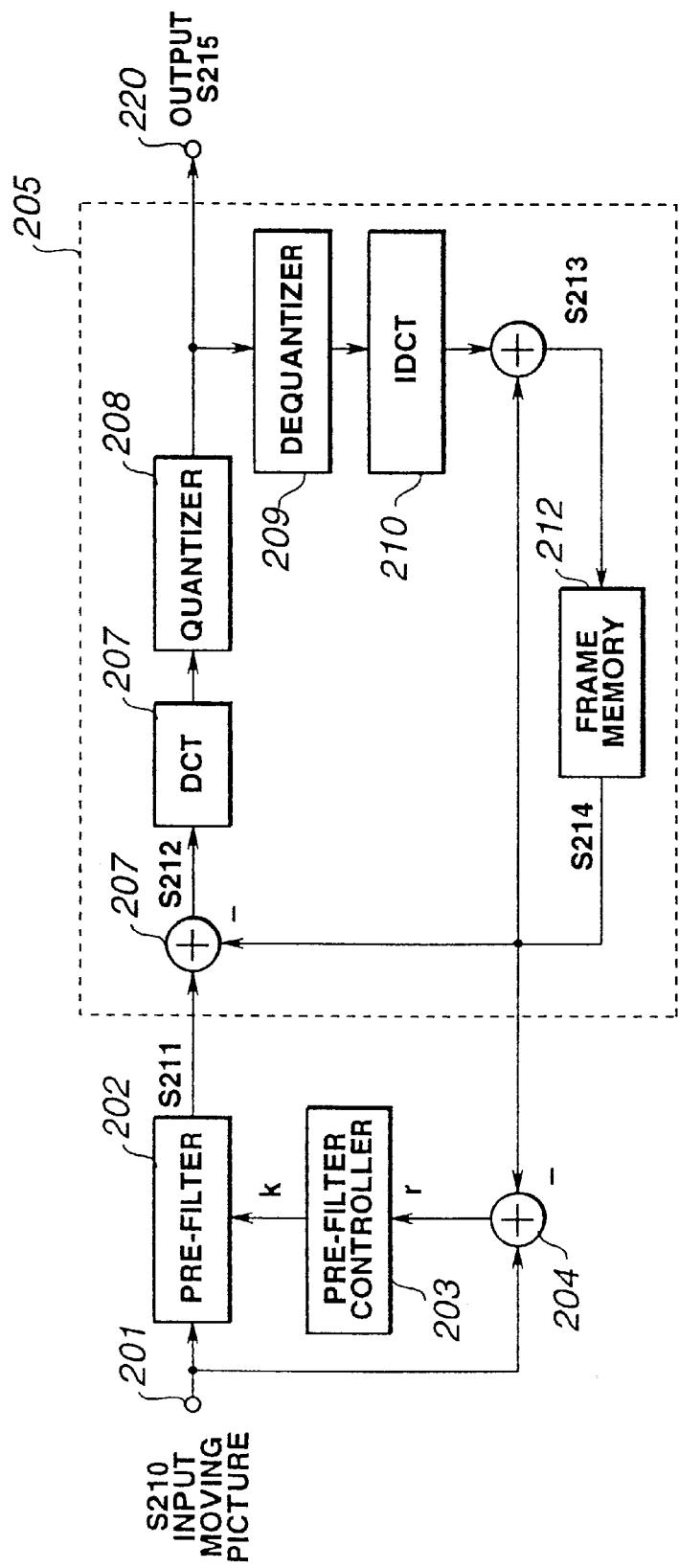
FIG. 1 is a block diagram showing an example of a conventional noise reducing circuit.

Referring to the drawings, preferred embodiments of the present invention will be explained in detail.

Figure 4:
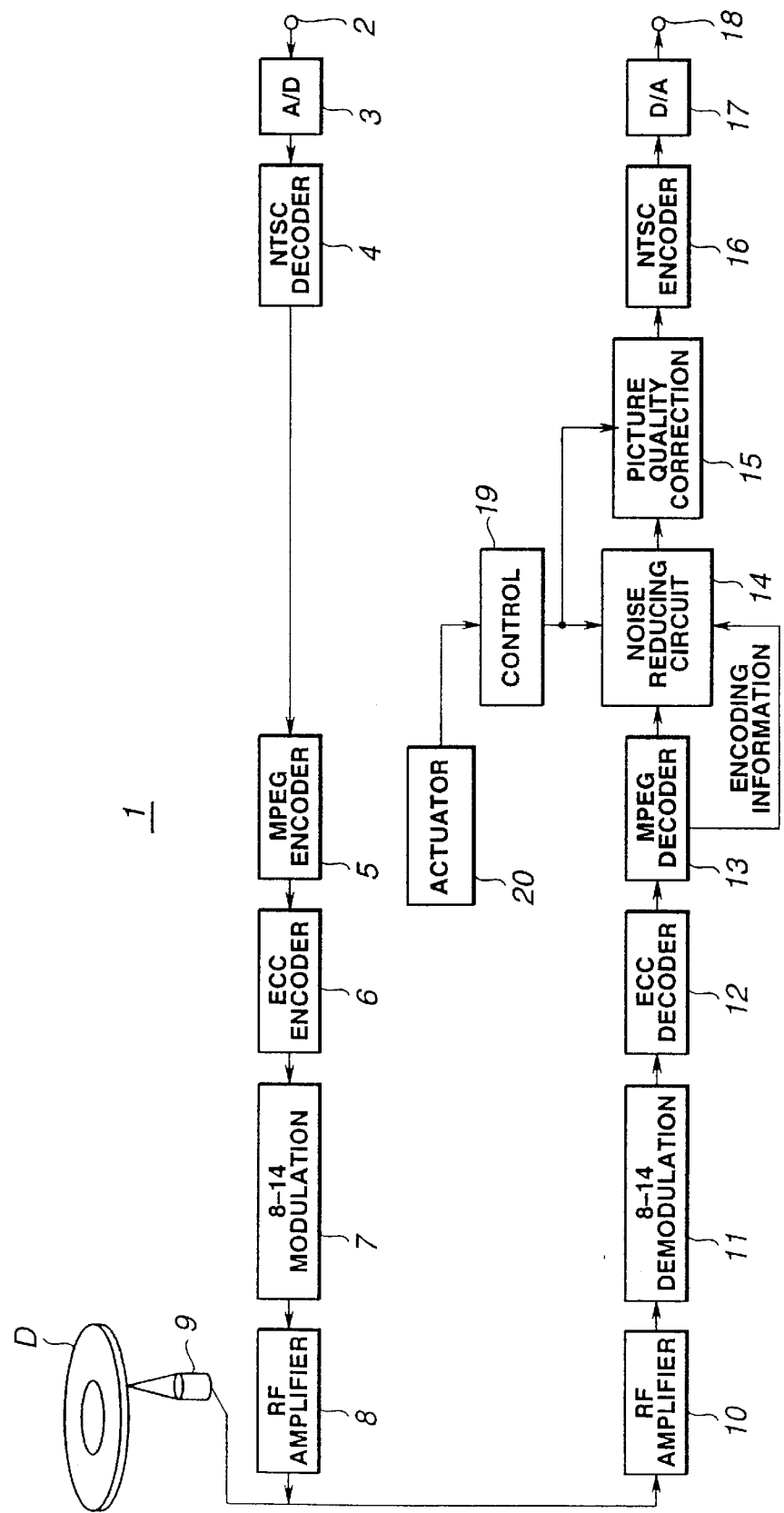
FIG. 4 is a block diagram showing an example of an optical disc recording/reproducing apparatus according to the present invention.

The picture signal processing method and apparatus according to the present invention is realized by an optical disc recording/reproducing device 1 shown in FIG. 4.

The recording system for the optical disc recording/reproducing device 1 is made up of an A/D converter circuit 3, at an input terminal 2 of which picture signals are supplied, a NTSC (National Television System Committee) decoder 4, fed with picture data from the A/D converter circuit 3, an MPEG (Moving Pictures Experts Group) encoder 5, fed with the picture data from the NTSC decoder 4, and an ECC encoder 6 fed with the picture data from the MPEG encoder 5. The recording system also includes an 8-14 modulation circuit 7 fed with the picture data from the ECC encoder 6 and an RF amplifier 8 fed with the picture data from the 8-14 modulation circuit 7.

The A/D converter circuit 3 is fed with picture signals of the NTSC system from the input terminal 2 to perform A/D conversion thereon. By this A/D conversion, the A/D converter circuit 3 converts analog picture signals into digital picture signals. This A/D converter circuit 3 outputs the picture data to the NTSC decoder 4.

The NTSC decoder 4 is fed with the picture data of the NTSC system from the A/D converter circuit 3. This NTSC decoder 4 decodes composite signals of the NTSC system. By this decoding, the NTSC decoder 4 converts the picture data into baseband signals. This NTSC decoder 4 outputs the picture data to the MPEG encoder 5.

The MPEG encoder 5 applies block DCT (discrete cosine transform) to the picture data from the NTSC decoder 4. By this encoding, the MPEG encoder 5 converts the picture data to picture data of the MPEG system. At this time, the MPEG encoder 5 appends the encoding information, such as quantization scale, to the picture data to formulate a bitstream.

This MPEG encoder 5 includes a pre-filter, the detailed structure of which will be explained subsequently. At this time, the MPEG encoder 5 applies pre-filtering by a pre-filter to reduce the block distortion or the mosquito noise produced in the compressed encoded picture data. This MPEG encoder 5 outputs the picture data to the ECC encoder 6.

The ECC encoder 6 appends error correction codes to the bitstream from the MPEG encoder 5. This ECC encoder 6 outputs this bitstream to the 8-14 modulation circuit 7.

The 8-14modulation circuit 7 applies signal processing, such as 8-14 modulation, to the bitstream from the ECC encoder 6. The 8-14modulation circuit 7 outputs the 8-14modulated bitstream to the RF amplifier 8.

The RF amplifier 8 amplifies a bitstream from the 8-14modulation circuit 7 to output the amplified bitstream to an optical pickup 9.

The recording system of the optical disc recording/reproducing device 1 records a bitstream specifying a picture on a optical disc D via optical pickup 9.

The reproducing system of the optical disc recording/reproducing device 1 includes an RF amplifier 10, fed with picture data recorded on the optical disc D via optical pickup 9, an 8-14demodulation circuit 11, fed with picture data from the RF amplifier 10, an ECC decoder 12, fed with the picture data from the 8-14 demodulation circuit 11, an MPEG decoder 13, fed with picture data from the ECC decoder 12, and a noise reducing circuit 14 fed with picture data from the MPEG decoder 13. The reproducing system also includes a picture quality correction circuit 15, fed with noise-suppressed picture data from the noise reducing circuit 14, an NTSC encoder 16, fed with picture data, corrected for picture quality by the picture quality correction circuit 15, and a D/A converter circuit 17, fed with picture data f the NTSC system from the NTSC encoder 16.

The RF amplifier 10 amplifies the picture data from the optical disc D as detected by the optical pickup 9. This RF amplifier 10 outputs the amplified picture data to the 8-14demodulation circuit 11.

The 8-14demodulation circuit 11 demodulates picture data from the RF amplifier 10. This 8-14demodulation circuit 11 outputs the demodulated picture data to the ECC decoder 12.

The ECC decoder 12 decodes the picture data from the 8-14demodulation circuit 11 to process the error correction codes appended by the ECC encoder 6. The ECC decoder 12 outputs the decoded picture data to the MPEG decoder 13.

The MPEG decoder 13 decodes the picture data of the NTSC system from the ECC decoder 12. The MPEG decoder 13 outputs the decoded picture data to the noise reducing circuit 14.

The noise reducing circuit 14, which will be explained subsequently, reduces the noise in the picture data from the MPEG decoder 13 by pre-filtering. This noise reducing circuit 14 reduces the mosquito noise or block distortion produced due to decoding by the MPEG decoder 13 by the noise-reducing processing. Also, the noise reducing circuit 14 is connected to a control circuit 19, as later explained, and is controlled responsive to the control signals from the control circuit 19. The noise reducing circuit 14 outputs the picture data reduced in noise to the picture quality correction circuit 15.

The picture quality correction circuit 15 processes picture data from the noise reducing circuit 14 with picture quality correction, such as contour correction. The picture quality correction circuit 15 is connected to a control circuit 19, as later explained, and is controlled in its operation response to control signals from the control circuit 19. The picture quality correction circuit 15 outputs the picture data, corrected for picture quality, to the NTSC encoder 16.

The NTSC encoder 16 encodes picture data from the picture quality correction circuit 15. By this encoding, the NTSC encoder 16 converts the picture data to the picture signals of the NTSC system. The NTSC encoder 16 outputs the D/A converted picture signals to a D/A converting circuit 17.

The D/A converting circuit 17 D/A converts the picture data of the NTSC system from the NTSC encoder 16. The D/A converting circuit 17 converts the NTSC picture data by D/A conversion to analog NTSC system picture signals. The D/A converting circuit 17 outputs the D/A converted picture signals to an output terminal 18.

The reproducing system of the optical disc recording/reproducing device 1 has a control circuit 19 for sending control signals to the noise reducing circuit 14 and to the picture quality correction circuit 15 and an actuating input unit 20 actuated by a user for sending an input signal to the control circuit 19.

The control circuit 19 is constituted by, for example, a micro-computer, and sends control signals to the noise reducing circuit 14 and to the picture quality correction circuit 15. The control circuit 19 is responsive to the input signal from the actuating input unit 20 to send control signals for reducing, for example, the block distortion, to the noise reducing circuit 14. The control circuit 19 also sends the control signals specifying whether or not picture quality correction should be made or control signals specifying the degree of picture quality correction.

The actuating input unit 20 generates and outputs input signals when the user selectively thrusts a switch, for example, in order to implement on/off control for reducing the block distortion. The actuating input unit 20 has a switch etc. to permit the user to control the degree of picture quality correction, so that the input signal is generated and outputted by the user selectively thrusting the switch.

An illustrative structure of the MPEG encoder 5 having the above-mentioned pre-filter is hereinafter explained.

Figure 5:
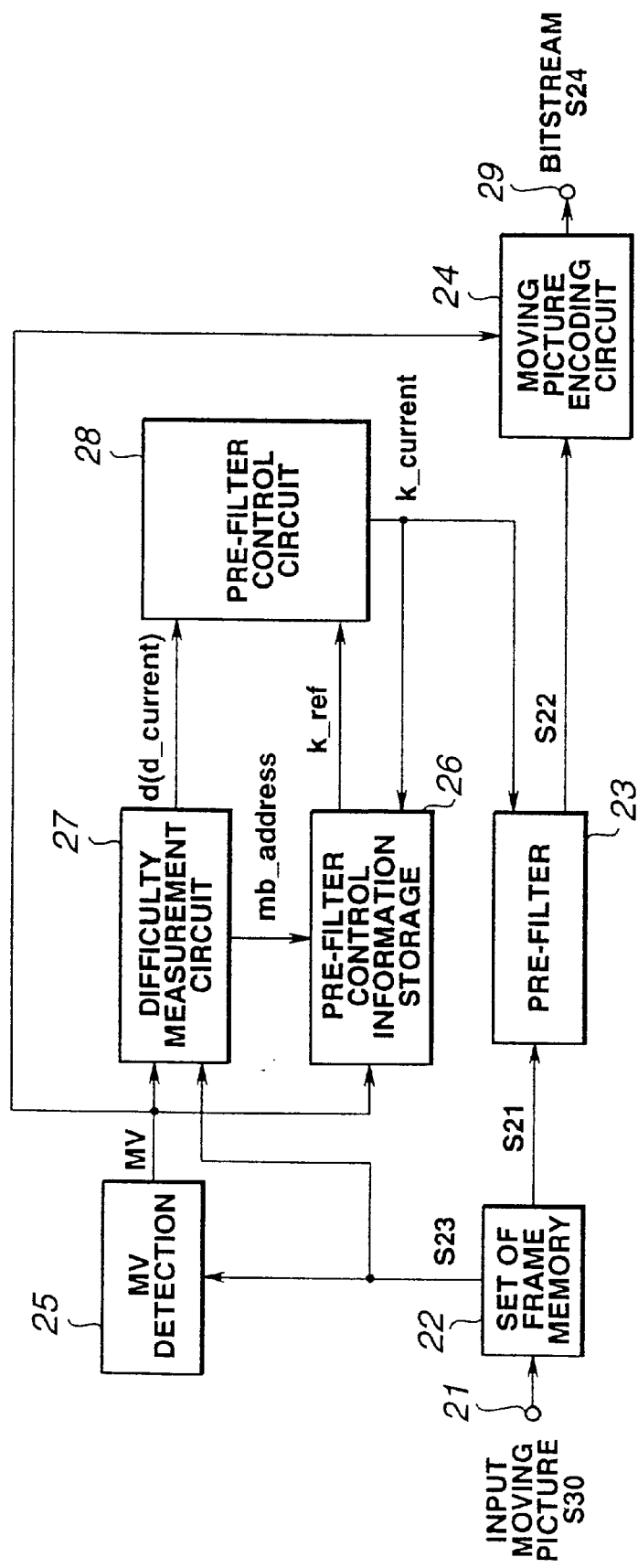
FIG. 5 is a block diagram showing an example of an MPEG encoder having a pre-filter.

In the first embodiment of the MPEG encoder 5, shown in FIG. 5, a digital moving picture signal S30, entered to the input terminal 21, is entered to a set of frame memories 22 for storage therein.

Using the picture data S23, stored in this set of frame memories 22, a motion vector detection circuit 25 detects the motion vector between frames. Specifically, the motion vector detection circuit 25 divides a frame into plural small blocks to calculate the motion vector MV on the small block basis. Each small block is made up of, for example, 16 pixels by 16 lines. The motion vector detection is carried out by pattern matching between a reference frame and the current small block. That is, the sum Ef of the absolute values of the difference between a signal Aij of the current small block and a signal Fij of the small block to which reference is had by an optional motion vector is found by $$Ef = \Sigma |Aij - Fij|$$

where i=0 to 15 and j=0 to 15     (1)

The motion vector detection circuit 25 outputs a motion vector which minimizes the value Ef as a motion vector signal MV.

The picture data S23 and the motion vector signal MV are entered to an encoding difficulty measurement circuit 27 where the encoding difficulty (d_current) is calculated from one small block of the input picture to another. In the present first embodiment, the encoding difficulty d is a parameter specifying the relative difficulty encountered when compressing the codes generated in a moving picture encoding circuit 24 as later explained to a pre-set bitrate. A specified structure of the encoding difficulty measurement circuit 27 will be explained subsequently.

To a pre-filter control circuit 28 is then entered the encoding difficulty d of the current small block for encoding, found as described above.

In a pre-filter control information storage circuit 26, there are stored pre-filter coefficients used in the small blocks entered in the past. To this pre-filter control information storage circuit 26 are entered a block address mb_address indicating the position of the current small block on the frame and a motion vector signal MV of the current small block. Based on these, the pre-filter control information storage circuit 26 reads out a filter coefficient k_ref, as a parameter specifying passband limitations of a low-pass pre-filter used in the small block to which the current small block refers in the inter-frame prediction. This filter coefficient k_ref is sent to the pre-filter control circuit 28. For reading out the above filter coefficient k_ref, it is also possible to use only the block address mb_address and to read out, as the aforementioned filter coefficient k_ref, the parameter specifying the passband limitations of the low-pass pre-filter used in the small block lying at the same block address position mb_address on the frame to which reference is had in the inter-frame prediction. In this case, there is no necessity of inputting the motion vector signal MV to the pre-filter control information storage circuit 26.

Figures 2, 3:
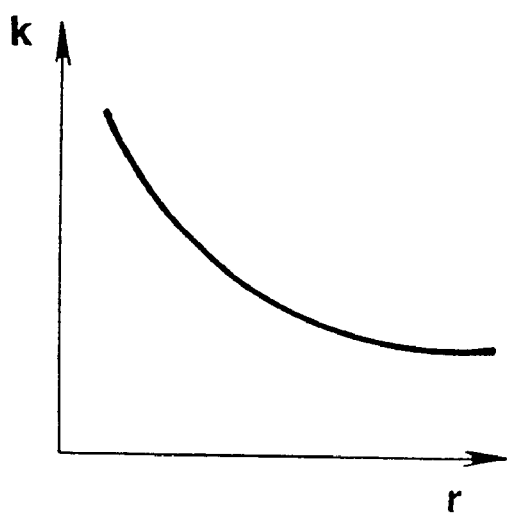
FIG. 2 shows pre-low-pass filter coefficients.
FIG. 3 shows the relation between the pre-filter coefficients and the encoding difficulty.

When fed with the encoding difficulty d and the filter coefficient k_ref, the pre-filter control circuit 28 is responsive thereto to generate the filter coefficient k_current as the parameter specifying the passband limitations of the low-pass filter used for the current small block to output the generated filter coefficient to the pre-filter 23. The characteristics of the pre-filter 23 are shown in FIG. 3. Thus, the low-pass filter characteristics are selected so that the passband of the filter is narrower the smaller the filter coefficient k_current.

The pre-filter 23 may be a low-pass filter having characteristics other than those shown in FIG. 3.

The filter coefficient k_current, calculated by the pre-filter control circuit 28, is also entered to and stored in the pre-filter control information storage circuit 26 so as to be used as a reference value for setting a pre-filter characteristics used in the small block entered in future.

Figure 6:
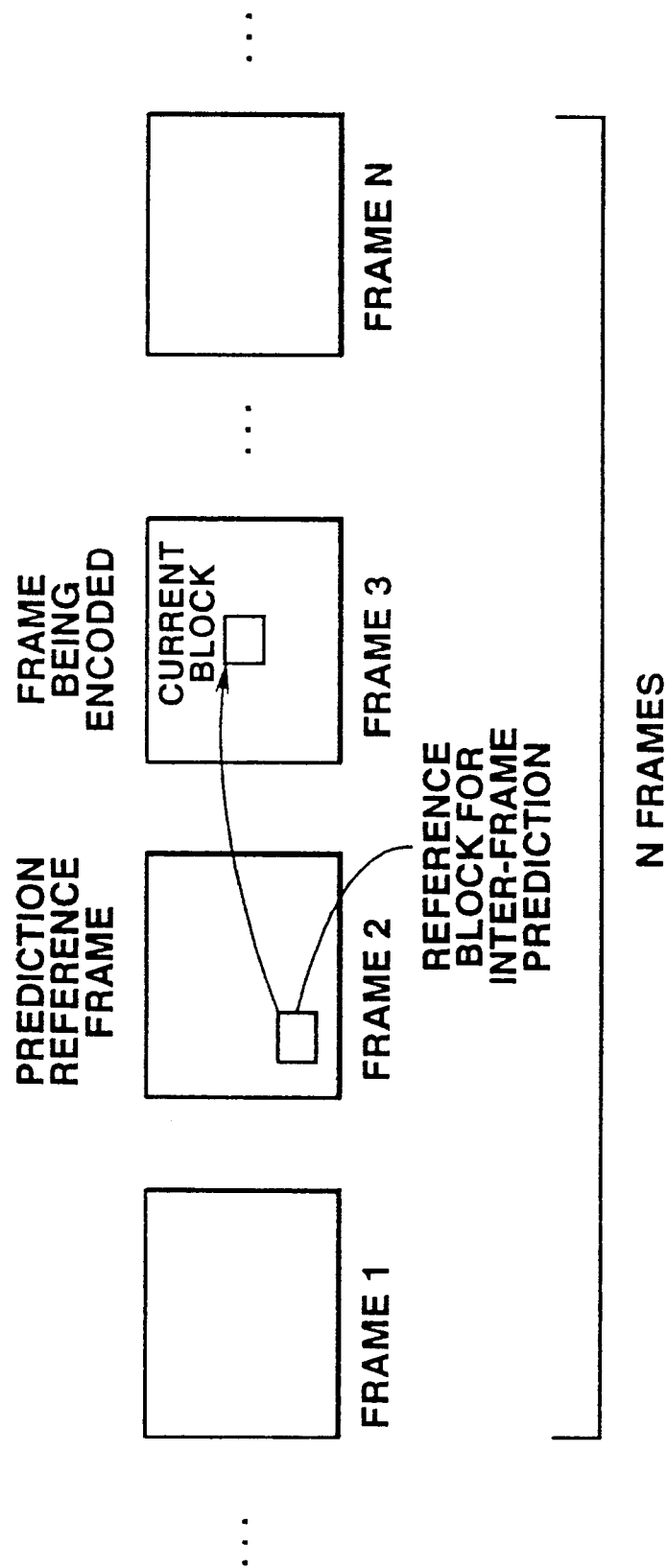
FIG. 6 shows the relation between a frame and a minor block.

A typical method for calculating the filter coefficient k_current is hereinafter explained. Here, a number of frame groups, each being made up of N frames, where N≧1, are formulated, in the inputting sequence of the input moving pictures, as shown in FIG. 6. This frame group is to be a processing unit. Referring to the flowchart of FIG. 7, the control operation for the pre-filter coefficients is explained.

Figure 7:
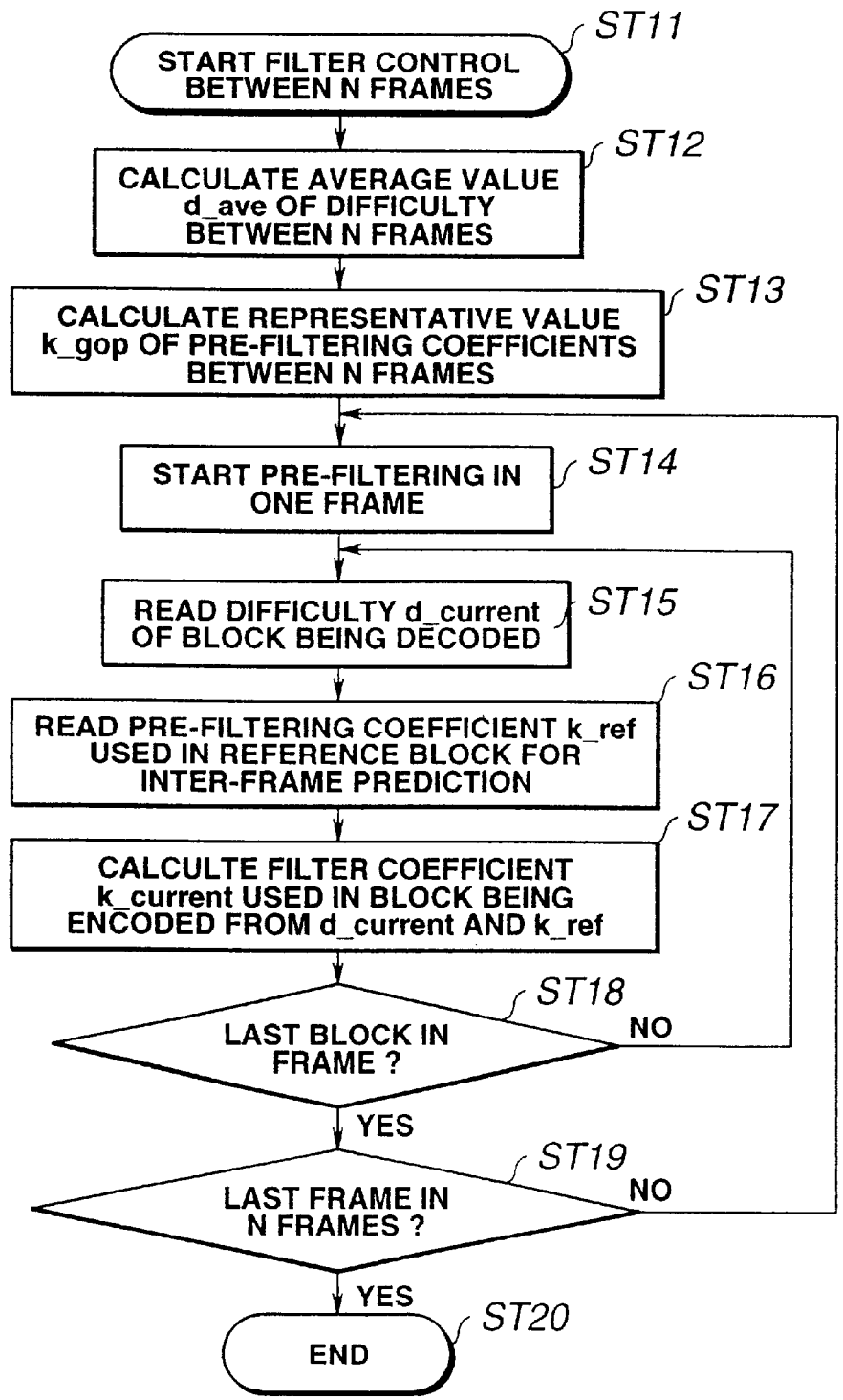
FIG. 7 is a flowchart showing an example of an MPEG encoder having a pre-filter.

At step ST11 of the flowchart of FIG. 7, filter control is started between the N frames of a set containing the current frame being encoded.

At step ST12, an average value d_ave of the encoding difficulty between the N frames is calculated. At the next step ST13, a representative value k_gop of the pre-filter coefficient between the N frames is calculated. The representative value k_gop of the pre-filter coefficient is empirically pre-set so as to adapt itself to the representative (average) pre-filter characteristics with respect to the average value d_ave of the encoding difficulty between N frames. Here, the low-pass filter characteristics with the narrower passband, that is the smaller value of k_gop, is associated with the higher encoding difficulty. The relation between the average value d_ave of the encoding difficulty and the representative value k_gop of the pre-filter coefficient is shown for example in FIG. 8.

At the next step ST14, filter control in one frame is started.

First, at step ST15, the encoding difficulty d(d_current) of the small block now being encoded is read. At the next step ST16, the low-pass pre-filter coefficient k_ref used in the small block, to which the current small block refers to in the inter-frame prediction, is read.

Next, at step ST17, the low-pass pre-filter coefficient k_current, used in the current small block, is calculated from the encoding difficulty d_current and the low-pass pre-filter coefficient k_ref.

Figures 8, 9:
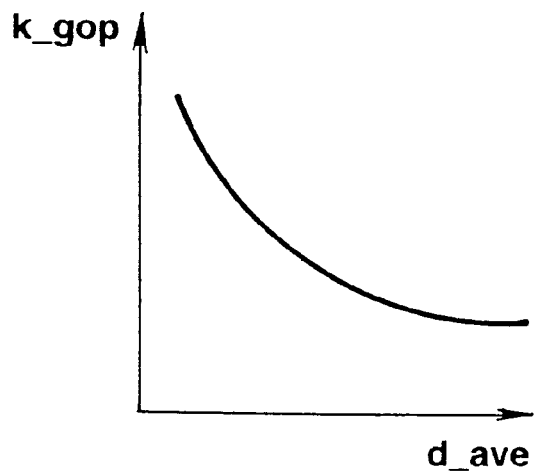
FIG. 8 shows the relation of correspondence between an average value d_avr of the encoding difficulty and a representative value k_gop of the pre-filter coefficients.
FIG. 9 illustrates an example of calculating pre-filter coefficients taking into account pre-filtering characteristics used in a minor block to which reference is had in the inter-frame prediction of the current minor block.

FIG. 9 shows typical calculations of the low-pass pre-filter coefficient k_current. In the typical calculations, shown in FIG. 9, k_current is provisionally statistically calculated from d_current and k_gop, as shown by the equation (a). If d_current is larger than d_ave, k_current is smaller than k_gop, that is the low-pass filter characteristics with a narrower passband prevails, whereas, if d_current is smaller than d_ave, k_current is larger than k_gop, that is the low-pass filter characteristics with a broader passband prevails. The relation of correspondence between the encoding difficulty d_current and the low-pass pre-filter coefficient k_current is shown for example in FIG. 10.

In the illustrative calculations, shown in FIG. 9, the above-mentioned low-pass pre-filter coefficient k_current and the low-pass pre-filter coefficient k_ref, used in the small block referred to by the current small block in the inter-frame prediction, are compared to each other, as in the conditions (b) and (c). If the change in k_current and k_ref is larger than a pre-set threshold value, control is used to suppress the change. Specifically, in the illustrative calculations, shown in FIG. 9, if k_current is larger than A times k_ref, where A>1, as in the condition (b), k_current is changed to A times k_ref. If k_current is smaller than B times k_ref, where B<1, as in the condition (c), k_current is changed to B times k_ref. That is, the low-pass pre-filter coefficient k_current, used in the current small block, is calculated, as described above.

Returning to the flowchart of FIG. 7, it is verified, at the step ST18, next following the above-mentioned step ST17, whether or not the current small block is the last block in the frame. If, in the verification of step ST18, the current small block is verified to be not the last block in the frame, processing reverts to step ST15. If, in the verification of step ST18, the current small block is verified to be the last block in the frame, processing transfers to step ST19.

At step ST19, it is verified whether or not the current frame is the last frame of the set of N frames. If, in the verification of this step ST19, the current frame is verified to be not the last frame of the group of N frames, processing reverts to step ST14. If the current frame is verified to be the last frame of the group of N frames, processing transfers to step ST20.

At this step ST49, filter control for the group made up of N frames comes to a close.

The pre-filter control circuit 28 sets the pre-filter coefficient k_ref, as described above.

In the steps ST16 and ST17 in the flowchart of FIG. 7, the encoding difficulty d_ref of the small block, referred to by the current small block in the inter-frame prediction, may be used in place of the filter coefficient k_ref.

Figure 11:
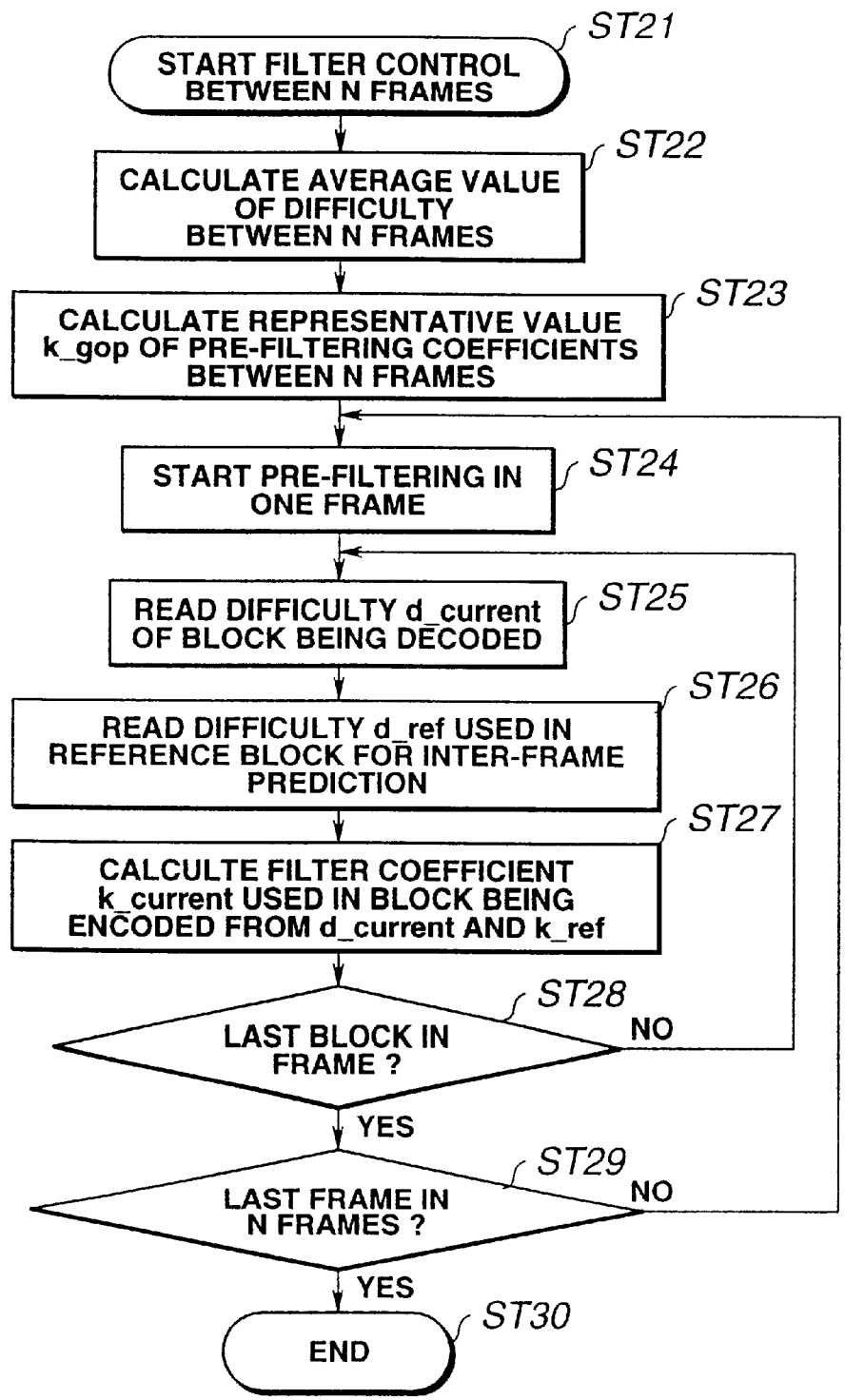
FIG. 11 is a flowchart showing an example of a method for calculation of the low-pass filter coefficient k_current.

Referring to the flowchart of FIG. 11, the typical calculating method for pre-filter coefficient k_current is explained. The flowchart of FIG. 11 differs from the flowchart of FIG. 7 as to steps ST26 and ST27, which correspond to steps ST16 and ST17 in FIG. 7, respectively. Meanwhile, the steps ST21 to ST25 in FIG. 11 are the same as the steps ST11 to ST15 in FIG. 7, respectively, while steps ST28 and the ensuing steps are the same as the step ST18 and the ensuing steps in FIG. 7, respectively, so that these steps are not explained specifically.

In the flowchart of FIG. 11, the encoding difficulty d_ref of the small block, referred to by the current small block in the inter-frame prediction, is read at step ST26, as shown in FIG. 6.

Then, at step ST27, the encoding difficulty d_current of the small block now being encoded is calculated from the low-pass pre-filter coefficient k_current of the current small block and the encoding difficulty d_current.

Figures 10, 12:
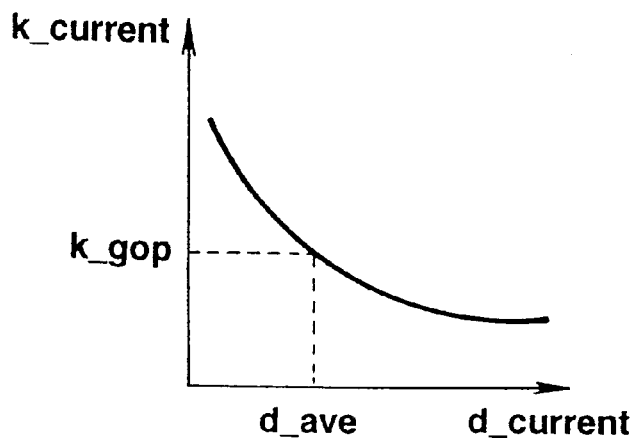
FIG. 10 shows the relation of correspondence between the encoding difficulty d_current and the low-pass filter coefficient k_current.
FIG. 12 shows an example of calculations of the low-pass filter coefficient k_current.

FIG. 12 shows illustrative calculations for the low-pass pre-filter coefficient k_current. In the illustrative calculations, shown in FIG. 12, the above-mentioned encoding difficulty d_current of the small block now being encoded and the encoding difficulty d_ref, used in the small block referred to by the current small block in the inter-frame prediction, are compared to each other, as in the conditions (d) and (e). If the change in d_current and d_ref is larger than a pre-set threshold value, control is used to suppress the change. Specifically, if d_current is larger than C times d_ref, where C>1, as in the condition (d), d_current is changed to C times d_ref. If d_current is smaller than D times d_ref, where D<1, as in the condition (e), d_current is changed to D times d_ref. The encoding difficulty d_current used in the current small block is inspected as described above. Then, k_current is provisionally statistically calculated from d_current and k_gop, as in the equation (f0 in FIG. 12.

In the case of the flowchart of FIG. 12, there are stored, in the pre-filter control information storage circuit 26 of FIG. 5, the encoding difficulty d_ref of small blocks calculated in the past. From this storage circuit 26, the encoding difficulty d_ref of the small blocks, referred to in the inter-frame prediction, is read out from the block address mb_address of the current small block and the motion vector signal MV.

In reading out the encoding difficulty d_ref, it is also possible to use only the block address mb_address to read out the passband limitations of the low-pass pre-filter used in the small block at the position of the same block address mb_address on the frame as that referred to in the inter-frame prediction, as the filter coefficient d_ref, as described above. In this case, it is unnecessary to enter the motion vector signal MV to the pre-filter control information storage circuit 26.

Returning to FIG. 5, the pre-filter 23 performs low-pass filtering, specified by the pre-filter coefficient k_current, on the current small block, to output processed picture signals S22.

The processed picture signals S22 and the motion vector signal MV are entered to the moving picture encoding circuit 24 where the signals are processed with pre-set inter-frame predictive encoding so as to be outputted at the output terminal 29 as the encoded bitstream S24.

Figure 13:
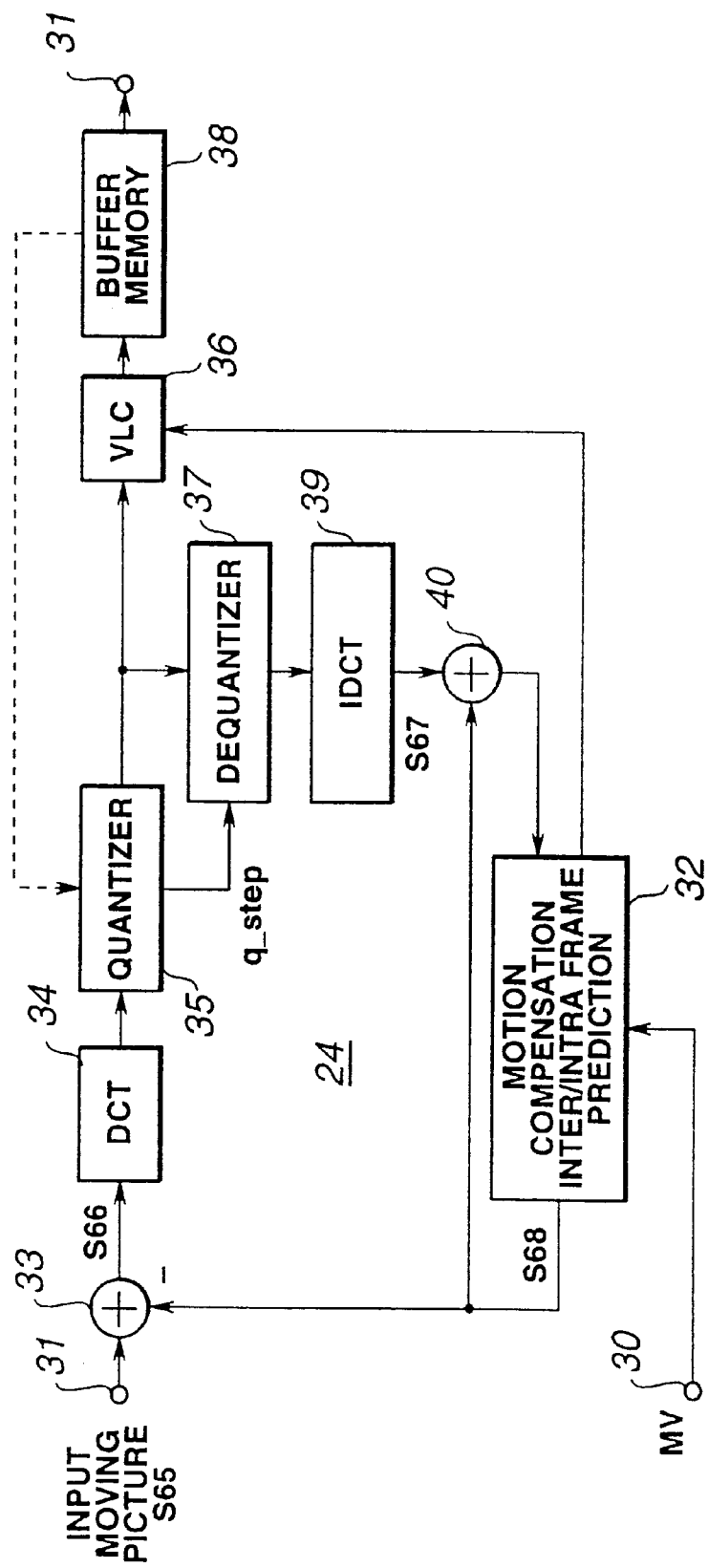
FIG. 13 is a block circuit diagram showing an illustrative structure of a moving picture encoding circuit in a moving picture encoding device.

FIG. 13 shows an illustrative structure of the moving picture encoding circuit 24 shown in FIG. 5. Meanwhile, FIG. 13 shows, as a specified example of the moving picture encoding circuit 24, such a circuit which performs hybrid encoding consisting in the combination of the motion-compensated inter-frame prediction and DCT as in the MPEG system.

Referring to FIG. 13, there is supplied to the input terminal 30 the motion vector signal MV entered from the motion vector detection circuit 25, while there is supplied from the input terminal 31 an input moving picture signal S65 to the moving picture encoding circuit (hybrid encoder) 24.

The moving picture encoding circuit 24 has a motion-compensating inter-frame intra-frame prediction circuit 32 which is provided with a picture memory and which outputs prediction picture signals S68 read out from the picture memory based on the motion vector signal MV from the input terminal 30.

An arithmetic unit 33 performs addition on the input moving picture signal S65 from the input terminal 31 as an addition signal and on the prediction picture signal S68 from the motion-compensating inter-frame intra-frame prediction circuit 32 as a subtraction signal, in order to calculate the difference between the input moving picture signal S65 and the prediction picture signal S68 to output the difference as a prediction residual signal S66. If any scene change has occurred, the input prediction picture signal S68 is directly outputted, without doing prediction.

The prediction residual signal S66 (original signal if prediction is not made) is entered to the DCT circuit 34. The DCT circuit 34 performs two-dimensional DCT on the prediction residual signal S66. The DCT coefficients, outputted by the DCT circuit 34, are scalar-quantized by a quantization circuit 35 to produce quantized output signals of the quantization circuit 35 which are entered to a variable encoding circuit (VLC) 36 and a dequantization circuit 37. The VLC circuit 36 encodes the quantized output signals by, for example, Huffman coding. The output signals of the VLC circuit 36 are entered to a buffer memory 38, which then smoothes the bitrate of the data string outputted from an output terminal 31 to the transmission channel. If overflow is likely to occur in the buffer memory 38, that effect is fed back to the quantization circuit 35 as a feedback control information. At this time, the quantization circuit 35 increases the quantization step to reduce the amount of the information outputted by the quantization circuit 35.

The dequantization circuit 37 dequantizes the quantized output signal in meeting with quantized step signals q_step supplied from the quantization circuit 35. An output of the dequantization circuit 37 is entered to a dequantization circuit 39 for inverse DCT. The prediction residual signals, decoded on IDCT, are entered to an arithmetic unit 40.

The arithmetic unit 40 is fed with a signal which is the same as the prediction picture signal S68 entered to the arithmetic unit 33. The arithmetic unit 40 adds the prediction picture signal S68 to the prediction residual signal S67 to give locally decoded picture signals which are the same as an output picture on the receiving side.

Figure 14:
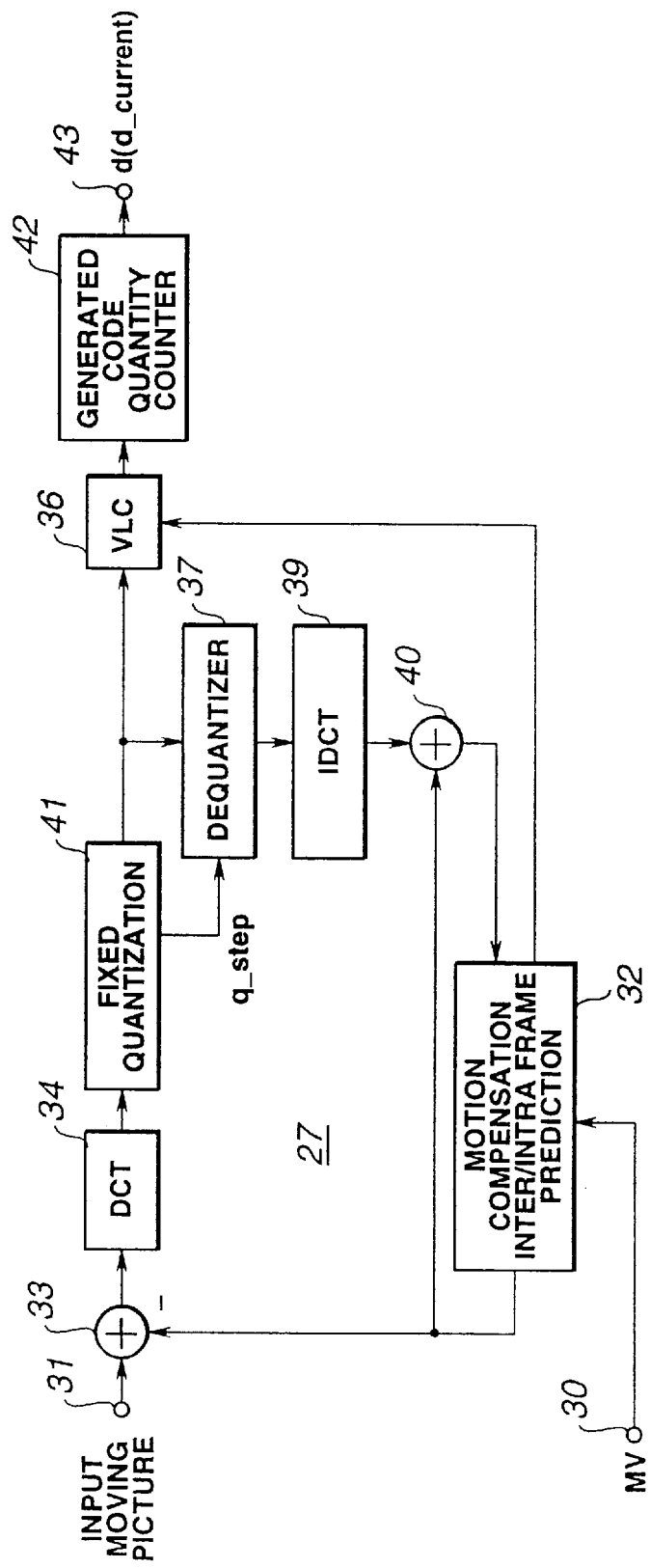
FIG. 14 is a block circuit diagram showing an illustrative structure of an encoding difficulty measurement circuit in the moving picture encoding device.

FIG. 14 shows an illustrative structure of the encoding difficulty measurement circuit 27 shown in FIG. 5. The structure of FIG. 14 is basically the same as that of the moving picture encoding circuit 24 explained with reference to FIG. 13 except that a quantization circuit 41 uses a fixed quantization scale and that no control is managed of the occupancy of the buffer memory with respect to the quantity of the generated bits from the VLC circuit 36. Specifically, the quantity of the generated bits from the VLC circuit 36 is counted by a counter 42 from one small block to another and the so-counted encoding difficulty d is outputted at an output terminal 43.

The above-described moving picture encoding circuit 24 splits a frame of the input moving picture signal S30 into small blocks each composed at least of one pixel, and calculates the encoding difficulty (a parameter indicating the difficulty with which the quantity of the generated codes of the moving picture encoding device is compressed to a pre-set bitrate). In doing low-pass pre-filtering on the small blocks now being encoded, the moving picture encoding circuit 24 adaptively determines low-pass pre-filter characteristics, based on the encoding difficulty of the current small block and the pre-filter control information used in the small block referred to by the current small block in the inter-frame prediction to perform encoding on the low-pass pre-filtered moving picture signals based on the above characteristics.

That is, in determining the filtering characteristics for pre-filtering moving picture signals subjected to inter-frame prediction, the moving picture encoding circuit 24 of the first embodiment of the present invention takes into account both the encoding difficulty of the small block being encoded and the pre-filtering control information used in the small block referred to in the inter-frame prediction.

Specifically, in the first stage, low-pass filters having narrower passbands and those having broader passbands are selected for an intricate pattern exhibiting locally fast movement and higher encoding difficulty and for a flatter picture pattern exhibiting locally slow movement and lower encoding difficulty, respectively, in order to take the visual sense of the human being into account. In the second stage, the filter characteristics selected in the first stage are corrected so that the encoding efficiency of the inter-frame prediction will not be lowered, taking into account the pre-filter control information used in the small block referred to by the currently encoded small block in the inter-frame prediction, in order to determine ultimately the pre-filtering characteristics for the small block now under encoding. This gives a low-pass filtered moving picture which has acceptable subjective impression and an acceptable encoding efficiency.

Figure 15:
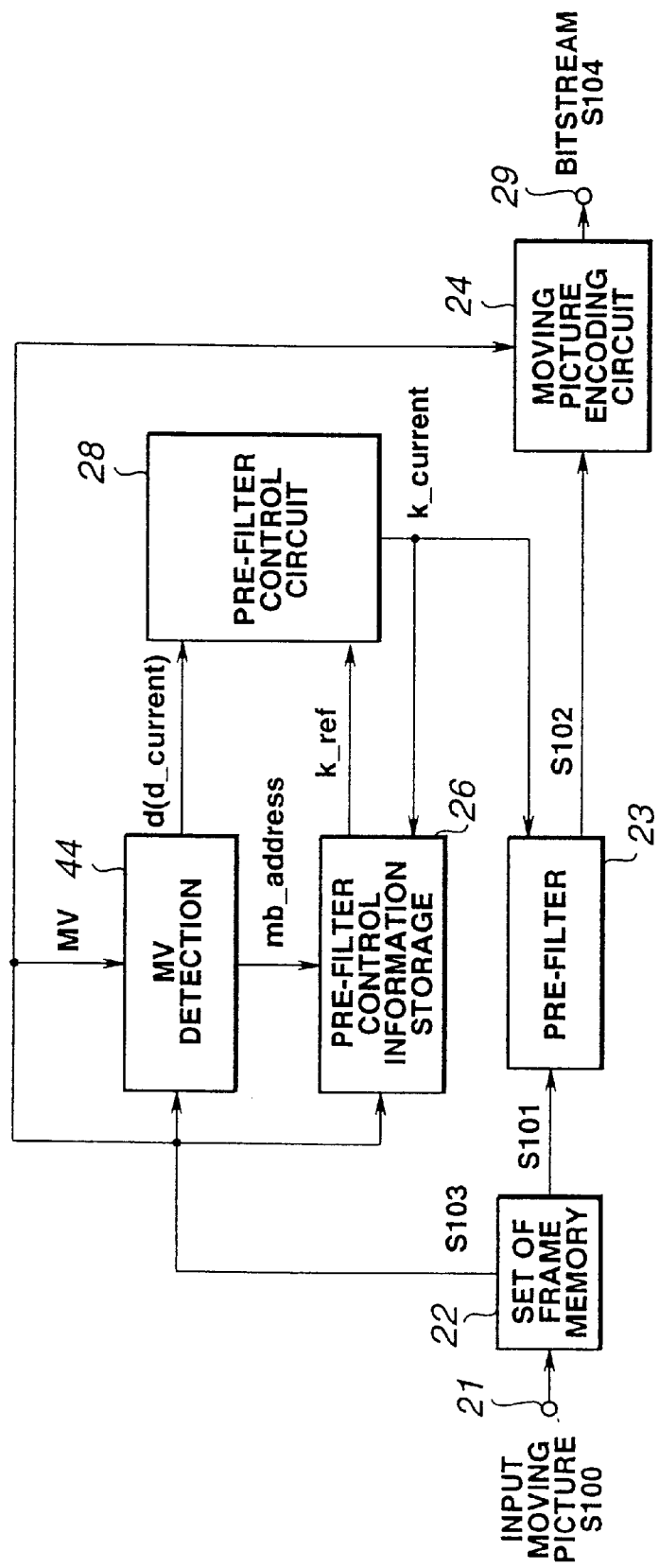
FIG. 15 is a block circuit diagram showing a second illustrative structure of the moving picture encoding device.

FIG. 15 shows a second embodiment of the moving picture encoding device according to a second embodiment of the MPEG encoder 5.

The crucial difference of the second embodiment shown in FIG. 15 from the moving picture encoding circuit 24 of the first embodiment is that there is used in the second embodiment the prediction residual outputted by a motion vector detection circuit 44, that is a sum Ef of the absolute values of the differences, calculated by the above equation (1), between the signal Aij of the current block and the signal Fij of a block referred to by a optional motion vector, as the encoding difficulty d_current entered to the pre-filter control circuit 28. In the second embodiment, now explained, the portions which are the same as those of the MPEG encoder 5 are depicted by the same reference numerals and are not explained specifically.

In FIG. 15, digital moving picture signals S100, entered to an input terminal 21, are entered to a set of frame memories 22 for storage therein. Using picture data S103, stored in the set of frame memories 22, the motion vector detection circuit 44 detects the frame-to-frame motion vector as explained with reference to the first embodiment described previously. The motion vector detection circuit 44 calculates the motion vector signal MV and the prediction residual Ef, calculated from the above equation (1), from one small block of the input picture to another. The prediction residual Ef is outputted from the motion vector detection circuit 44 as the encoding difficulty d of the small block.

The pre-filter control circuit 28 is fed with the encoding difficulty d of the small block now being encoded. In the pre-filter control information storage circuit 26, there are stored pre-filter coefficients used in small blocks entered in the past. The pre-filter control information storage circuit 26 is fed with the block address mb_address indicating the position on the frame of the current small block and the motion vector signal MV of the current small block. From this pre-filter control information storage circuit 26, the filter coefficient k_ref, as a parameter for specifying the passband limitations of the low-pass filter used in the small block referred to by the current small block in the inter-frame prediction, is read out based on the above block address and the motion vector signal, and is sent to the pre-filter control circuit 28. When reading out the filter coefficient k_ref, it is also possible to use only the block address mb_address and to read out as the filter coefficient k_ref a parameter specifying the passband limitations of the low-pass filter used in the small block lying at the same block address mb_address position on the frame referred to in the inter-frame prediction. In this case, it is unnecessary to enter the motion vector signal MV to the pre-filter control information storage circuit 26.

When fed with the encoding difficulty d and the filter coefficient k_ref, the pre-filter control circuit 28 generates the filter coefficient k_current as a parameter specifying the passband limitations of the low-pass filter used in the current small block, based on the encoding difficulty d and the filter coefficient k_ref, and outputs the generated filter coefficient k_ref to the pre-filter 23. It is noted that characteristics shown for example in FIG. 2 are used as the characteristics of the pre-filter 23. That is, the passband of the low-pass filter is narrower the smaller the above-mentioned filter coefficient k_current.

The characteristics of the filter 23 may also be different from those shown in FIG. 23.

The filter coefficient k_current, calculated by the pre-filter control circuit 28, is also entered to the pre-filter control information storage circuit 26 for storage therein and is used as a reference value k_ref in setting the pre-filter coefficient used for a small block to be entered in future.

The method for calculating the filter coefficient k_current is the same as that explained with reference to FIG. 9.

The pre-filter 23 processes the current small block with low-pass filtering specified by the pre-filter coefficient k_current to output a processed picture signals S102.

The processed picture signals S102 and its motion vector signal MV are sent to the moving picture encoding circuit 24 where they are processed with pre-set inter-frame predictive encoding, such as encoding by so-called MPEG system, to produce an encoded bitstream S104, which is outputted at an output terminal 29. The structure of the moving picture encoding circuit 24 is the same as that explained in the first illustrative structure using FIG. 10.

The above-described moving picture encoding device, employing, as the encoding difficulty d (d_current) entered to the pre-filter control circuit 28, the prediction residuals outputted by the motion vector detection circuit 44, that is the sum Ef of the absolute values of the differences between the signal Aij of the current block and the signal Fij of a block referred to by a optional motion vector, corrects the selected filter characteristics so as not to lower the inter-frame predictive encoding efficiency, in order to ultimately set the pre-filtering characteristics for the small block being encoded. This gives a low-pass filtered moving picture which has acceptable subjective impression and an acceptable encoding efficiency.

Meanwhile, the pre-filtering controlling method and apparatus for encoding the moving pictures, disclosed in Japanese Laying-Open Patent H-6-225267, also perform pre-filtering on the input picture signals. However, in the technique shown in this publication, the pre-filtering coefficients are not changed but are constant in a given picture, while the filter coefficients are rendered constant across plural frames.

In the above-described first and second embodiments of the moving picture encoding circuits, the filtering characteristics of the pre-filtering processing for the moving picture signals processed with inter-frame predictive encoding can be adaptively changed responsive to the encoding difficulty d from one small block of a picture to another. Thus, the passband of the low-pass filter can be selected to be narrower and broader for a portion in an intricate picture exhibiting locally fast movement and higher encoding difficulty and for a flatter portion in the picture exhibiting slow movement and lower encoding difficulty, respectively, in order to take into account the visual sense of the human being. Moreover, in setting the small-block-based pre-filtering characteristics, not only the encoding difficulty d of the small blocks but also the pre-filtering control information used in small blocks referred to for the inter-frame prediction by the small block being encoded, is taken into account, to correct the selected filtering characteristics to prevent the lowering of the inter-frame predictive coding efficiency so as to set ultimately the pre-filtering characteristics for the small block being encoded. Thus, the low-pass pre-filtered moving picture is higher than the picture obtained in the conventional technique in subjective impression and encoding efficiency.

Figure 16:
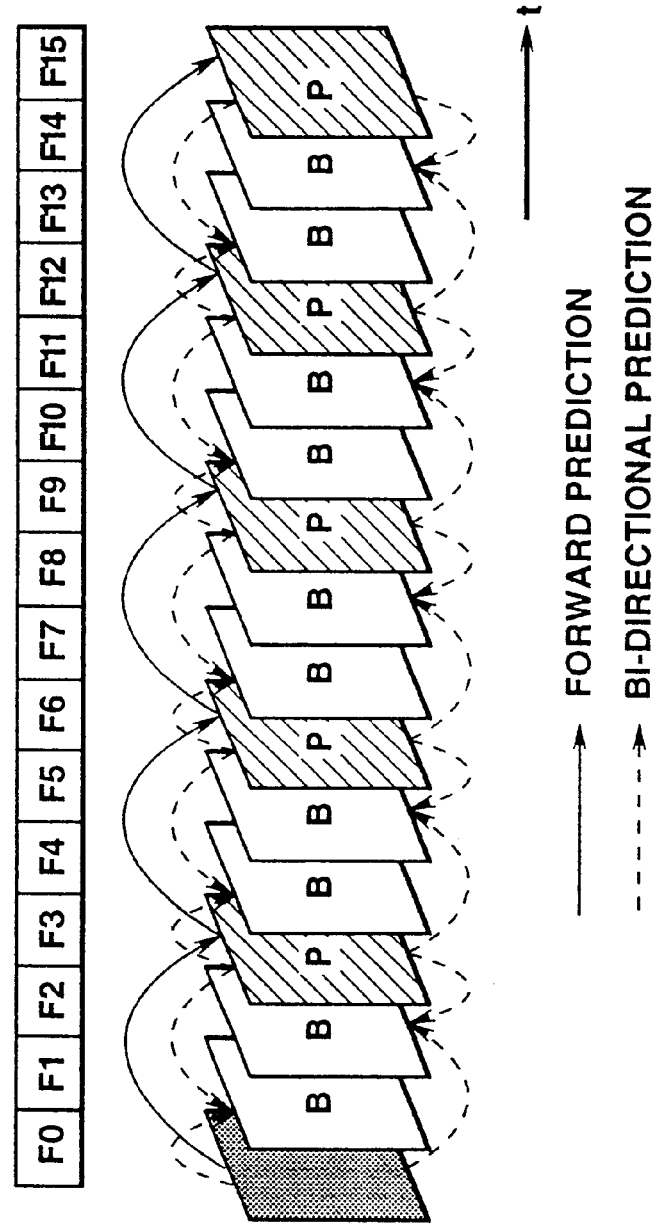
FIG. 16 shows a prediction structure and the structure of the respective picture types of the MPEG system.

In the inter-frame predictive encoding, used in the MPEG system, an I-picture, obtained on intra-coding without using prediction, a P-picture, obtained only on forward prediction, and B-picture, obtained on bi-directional coding, as shown in FIG. 16. In general, there are produced difference in the dynamic range of the encoding difficulty and difference in the distribution of the small-block-based encoding difficulty between these pictures. The pictures having different characteristics in the encoding difficulty are arrayed side-by-side in the MPEG system, so that, if filtering characteristics for low-pass filtering are set depending on the encoding difficulty of the entire input pictures, there may be produced deterioration in the subjective picture quality due to drastic difference in filtering characteristics between temporally neighboring pictures.

In the moving picture encoding circuits, constructed in accordance with the first and second embodiments, the filtering characteristics for low-pass filtering are set on the basis of the encoding difficulty of the small blocks of the input picture and the filter control information used in the small blocks referred to by the small block in the inter-picture prediction. However, in these embodiments, filtering characteristics between the I-picture for intra-coding, P-pictures having a B-picture interposed between it and the reference picture of filtering characteristics or temporally consecutive pictures, are not taken into account.

Also, in a picture doing inter-frame doing inter-frame prediction, there may exist a small block internally encoded without using prediction, so that, in the same picture, there may exist a small block having drastically higher encoding difficulty than the encoding difficulty of a spatially neighboring small block.

If filtering characteristics for low-pass filtering are adaptively determined for these pictures depending on the small-block-based encoding difficulty, there may be produced small blocks having temporally/spatially different low-pass bands, thus possibly deteriorating the subjective picture quality.

Figure 17:
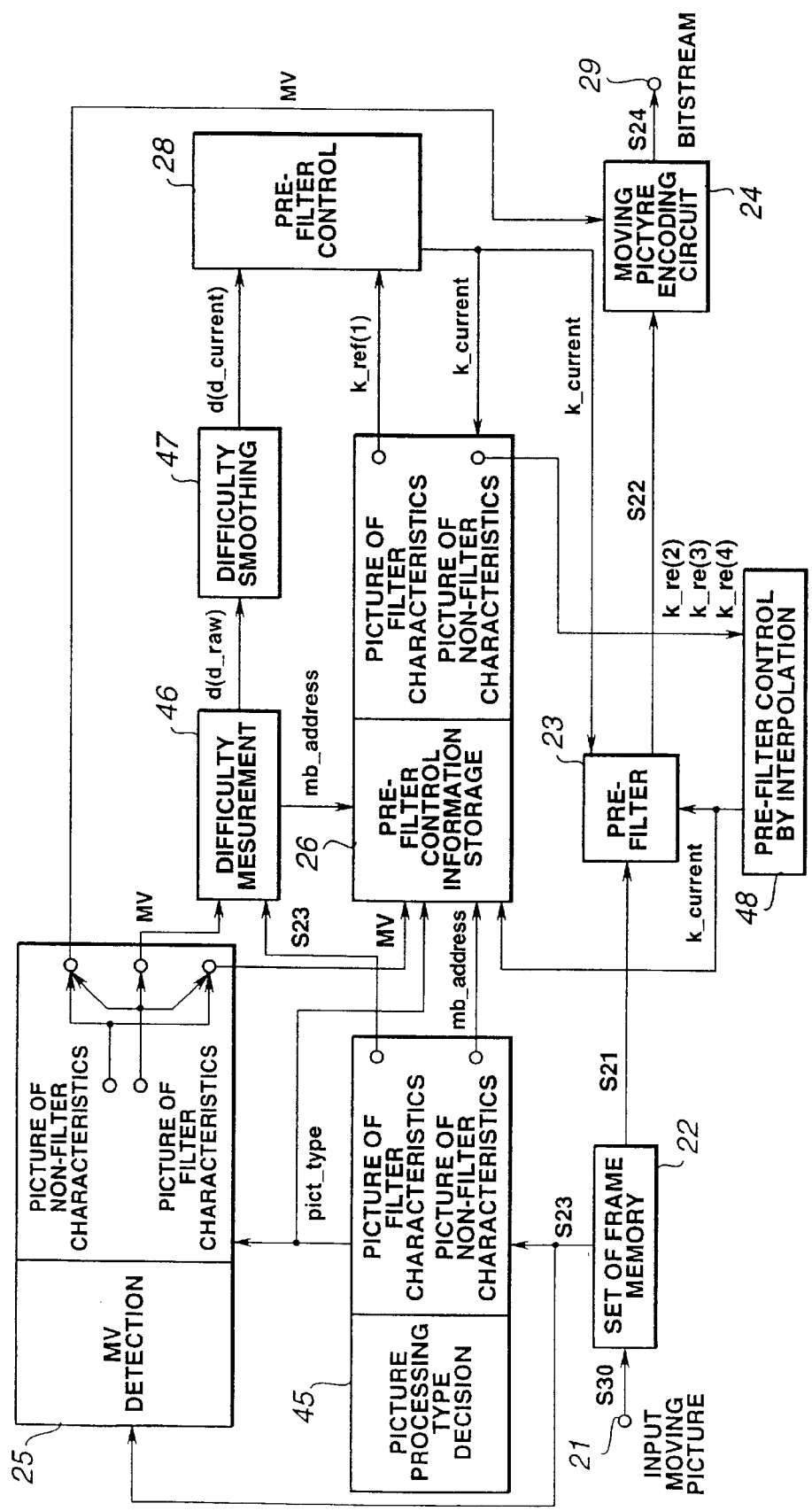
FIG. 17 is a block circuit diagram showing a third illustrative structure of the moving picture encoding device.

Thus, the moving picture encoding circuit according to a third embodiment of the present invention, shown in FIG. 17, is so constructed that, in determining the filtering characteristics for pre-filtering the moving picture signals, subjected to inter-frame predictive encoding, the frame of the input moving picture signal S30 being encoded is split into plural small blocks, each made up of at least one pixel, the picture being encoded is checked as to whether or not it is a picture of filtering characteristics or a non-filtering characteristics and not only the pre-filtering information of the current small block but also the pre-filtering control information used in the small block referred to in the inter-frame prediction and the pre-filtering control information used in the small block at the spatially same position of the temporally neighboring picture are simultaneously taken into consideration. In the following explanation of the third embodiment, the parts or components which are the same as those of the above-described first embodiment are depicted by the same reference numerals and the corresponding description is omitted for simplicity.

Specifically, as a first stage, an input picture of a specified encoding type is verified as a picture of filtering characteristics, while pictures of other encoding types are verified as pictures of non-filtering characteristics, in consideration that encoding difficulty differs with difference encoding types, such as I-, P- or B-pictures in the MPEG system. For example, a P-picture is used as a picture of filtering characteristics, while I- and B-pictures are used as pictures of non-filtering characteristics.

If an input picture is verified to be a picture of filtering characteristics, the encoding difficulty of the picture is calculated on the small block basis, and the encoding difficulty is smoothed in the picture by a predetermined method.

As a second stage, low-pass filters of narrower passbands are selected in the small blocks of a complex pattern having a locally fast movement and higher encoding difficulty, while low-pass filters of broader passbands are selected in the small blocks of a flat pattern having a locally slow movement and lower encoding difficulty, in order to take the visual sense of the human being into account. Also, the selected filtering characteristics are corrected to set the pre-filtering characteristics of the small block being encoded, so that, in taking into account the pre-filtering control information used in the small block referred to by the small block under encoding in the inter-frame prediction, there will be no risk of deterioration of the subjective picture quality or of the efficiency of the inter-frame predictive coding.

In the case of the pictures of non-filtering characteristics, pre-filtering characteristics for the small blocks under encoding are calculated, as a second stage, by interpolating the pre-filtering control information used in the small block of the past reference picture referred to by the small block being encoded in the inter-frame encoding and the pre-filtering control information used in the small block of the future reference picture. The calculated filtering characteristics are corrected, in consideration of the pre-filtering control information used in the small block at the spatially same position of the temporally adjacent picture, so that there occurs no subjective deterioration of the picture quality nor lowering of the efficiency of the inter-frame predictive coding, in order to determine pre-filtering characteristics with respect to the small blocks being encoded.

If the pictures of non-filtering characteristics is an intra-coded picture not employing prediction, such as I-picture in the MPEG system, pre-filtering characteristics of the small block under current encoding are set by interpolation based on the pre-filtering control information of the small blocks in the same spatial positions of the temporally previous and temporally succeeding p-pictures.

The moving picture, thus low-pass filtered, is superior in subjective impression of the encoded picture quality and in encoding efficiency.

In the moving picture encoding circuit according to a third embodiment of the present invention, shown in FIG. 17, the digital moving picture signal S30, entering the input terminal 21, is sent to and stored in the set of frame memories 22.

Figure 18A:
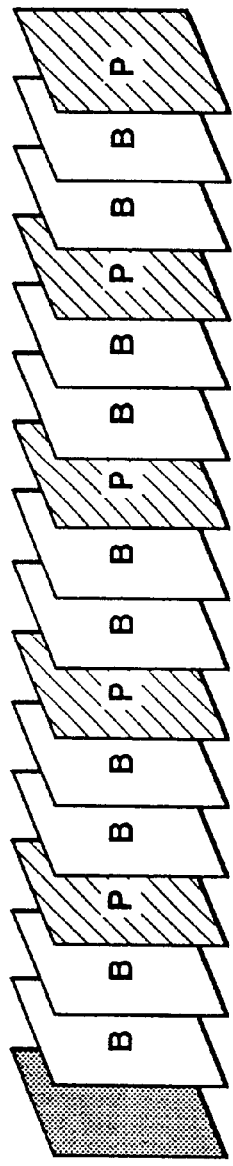
FIGS. 18A and 18B show the display sequence and the encoding sequence in the MPEG system.
Figure 18B:
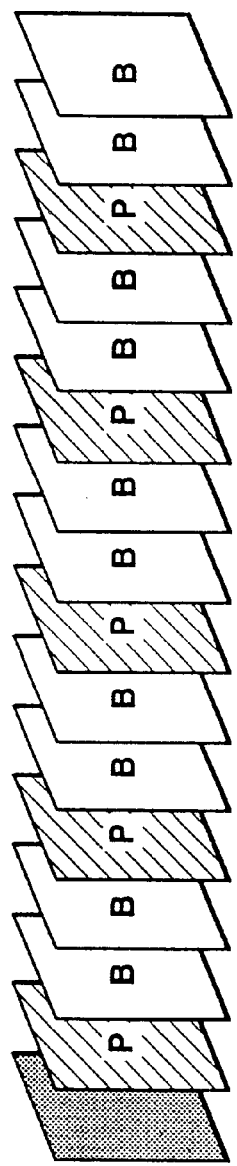

In the MPEG system, bidirectional prediction is used in carrying out the predictive coding, so that the picture inputting sequence and the picture encoding sequence differ from each other, as shown in FIGS. 18A and 18B. Thus, in the set of frame memories 22, the sequence of the input pictures is interchanged according to the encoding sequence.

Using picture data S23, stored in the set of frame memories 22, the motion vector detection circuit 25 detects the frame-to-frame motion vector. Specifically, the motion vector detection circuit 25 splits a frame into small blocks to calculate the motion vector MV on the small block basis. The small block is made up of, for example, 16 pixels by 16 lines, while motion vector detection is by pattern matching between a reference frame and the current small block. That is, the sum Ef of the absolute values of the differences between a signal Aij of the current small block and the small block Fij referred to by an optional motion vector is found.

The motion vector detection circuit 25 outputs, as the motion vector MV, the motion vector which gives the smallest value of Ef.

Depending on the picture type of the input picture data S23, a picture processing type verification circuit 45 varies the contents of an output circuit switching signal pict_type and the ensuing processing.

If the picture data S23 is a picture used as a picture of filtering characteristics, such as a P-picture, the picture data S23 is entered to an encoding difficulty measurement circuit 46, and a circuit switching signal pict_type (1) is entered to the motion vector detection circuit 25 and to the pre-filter control information storage circuit 26.

The motion vector detection circuit 25, fed with the circuit switching signal pict_type (1), sends the motion vector signal MV to the moving picture encoding circuit 24, pre-filter control information storage circuit 26 and to the encoding difficulty measurement circuit 46.

The encoding difficulty measurement circuit 46 fed with the picture data S23 and with the motion vector signal MV calculates the encoding difficulty d (d_raw) from one small block of the input picture to another.

The encoding difficulty d (d_raw) in the present third embodiment is a parameter representing the difficulty with which the quantity of the generated codes in the moving picture encoding circuit 24 as later explained is compressed to a pre-set bitrate. An illustrative structure of the encoding difficulty measurement circuit 46 will be explained subsequently.

For avoiding drastically different filter coefficients between neighboring small blocks, an encoding difficulty smoothing circuit 47 smoothes the input d (d_raw) within the frame to calculate the smoothing encoding difficulty information d (d_current). The encoding difficulty smoothing circuit 47 performs smoothing in accordance with the following equation (2):

$$d(\text{d\_current}) = \{d(i-1, j-1) + d(i, j-1) + d(i-1, j+1) + \quad (2)$$
$$d(i-1, j) + d(i, j) + d(i+1, j) +$$
$$d(i-1, j+1) + d(i, j+1) + d(i+1, j+1)\}/9$$

where d(i,j) denotes the encoding difficulty of a current small block for encoding which is the i'th and j'th small block in the transverse and vertical directions, respectively.

The pre-filter control information storage circuit 26 is fed with the encoding difficulty d (d_current) of the current small block for encoding found as described above.

In the pre-filter control information storage circuit 26, there are stored pre-filtering coefficients used in the small blocks entered in the past.

The pre-filter control information storage circuit 26 is fed with the block address mb_address, specifying the position of the frame of the current small block, motion vector signal MV of the current small block, and the circuit switching signal pict_type (1). Based on these, the pre-filter control information storage circuit 26 reads out the filter coefficient k_ref (1), as a parameter specifying the passband limitations of the low-pass pre-filter used in the small block referred to in the inter-frame prediction to enter the read-out filter coefficient to the pre-filter control circuit 28.

In reading out the filter coefficient k_ref (1) referred to in the inter-frame prediction, it is also possible to use only the block address mb_address to read out as the above-mentioned filter coefficient k_ref the parameter specifying the passband limitations of the low-pass pre-filter used in the small block lying at the position of the same block address mb_address on the frame referred to in the inter-frame prediction. In this case, there is no necessity of inputting the motion vector signal MV to the pre-filter control information storage circuit 26.

If fed with the encoding difficulty d (d_current) and the filter coefficient k_ref (1), the pre-filter control circuit 28 generates a filter coefficient k_current, as a parameter specifying the passband limitations of the low-pass pre-filter used in the small block, based on the above code and the coefficient, to input the filter coefficient k_current to the pre-filter 23.

The filter coefficient k_current, calculated by the pre-filter control circuit 28, is also entered to and stored in the pre-filter control information storage circuit 26 so as to be used as a reference value (filter coefficient k_ref) for setting the pre-filtering coefficient used in the small block entered in future.

If the picture data S23 is a pictures of non-filtering characteristics, for example, an I-picture or a B-picture of the MPEG system, the picture processing type verification circuit 45 enters the block address mb_address indicating the position on the frame of the current small block to the pre-filter control information storage circuit 26, while entering the circuit switching signal pict_type (2) to the motion vector detection circuit 25 and to the pre-filter control information storage circuit 26.

The motion vector detection circuit 25, fed with the circuit switching signal pict_type (2), sends the motion vector signal MV to the moving picture encoding circuit 24 and to the pre-filter control information storage circuit 26.

The pre-filter control information storage circuit 26, fed with the block address mb_current of the current small block and the motion vector MV of the current small block, reads out the filter coefficient k_ref (2) and k_ref (3), as parameters for specifying the passband limitations of the low-pass pre-filters used in the small blocks of the future reference picture and the past reference picture, referred to in the inter-frame prediction of the current small block, and the filter coefficient k_ref (4) as a parameter specifying the passband limitations of the low-pass pre-filter used by the small block at the same spatial position as the temporally neighboring picture, to send the read-out filter coefficients to a interpolation circuit 48.

In reading out the filter coefficient k_ref (2) and k_ref (3), it is also possible to use only the block address mb_address to read out as the above-mentioned filter coefficients k_ref (2) and (3) the parameter specifying the passband limitations of the low-pass pre-filter used by the small block lying at the same block address mb_address as that on the frame referred to in the inter-frame prediction. In this case, there is no necessity of entering the motion vector signal MV to the pre-filter control information storage circuit 26.

The interpolation circuit 48, fed with the filter coefficients k_ref (2), k_ref (3) and k_ref (4), as parameters of the current small block, performs interpolation, based on the filter coefficient k_ref (2) of the past reference picture and the filter coefficient k_ref (3) of the future reference picture, while generating the filter coefficient k_current of the current small block, using the filter coefficient k_current of the current small block lying at the same spatial position of the temporally proximate picture, to send the generated filter coefficient to the pre-filter 23.

It is also possible not to use the filter coefficient k_ref (4) used in the small block lying at the same position as the picture temporally proximate to the current small block and to read out only the filter coefficients k_ref (2) and k_ref (3) used in the small block referred to by the current small block in the inter-frame prediction to generate to output the filter coefficient k_current of the current small block.

If the pictures of non-filtering characteristics is a picture not performing inter-frame prediction, such as an I-picture of the MPEG system, the filter coefficients of the small blocks lying at the same spatial positions of the temporally previous and temporally succeeding pictures of filtering characteristics to perform the interpolation. In this case, the filter coefficient k_ref (4) of the small block lying at the same spatial position of the temporally proximate picture is not used.

The filter coefficient k_current, calculated by the interpolation circuit 48, is also entered to and stored in the pre-filter control information storage circuit 26 so as to be used as a reference value in setting the pre-filter coefficient used in the small block entered in future (filter coefficient k_ref).

The above-described procedure adaptively sets the filter coefficient of the pre-filter 23 to realize the encoding system which is excellent in subjective impression of the encoded picture quality and in the encoding efficiency.

The pre-filter 23 has characteristics as shown in FIG. 2. Here, the smaller the filter coefficient k_current, the narrower is the passband of the low-pass filter characteristics. Also, a low-pass filter having characteristics shown in FIG. 2 described above or low-pass filters having any other suitable characteristics may be used.

An instance of the method for calculating the filter coefficient k_current is hereinafter explained. Here, input moving pictures are grouped into sets of N frames, where $N \geq 1$, as shown in FIG. 19, each set containing pictures of filtering characteristics and pictures of non-filtering characteristics, in the inputting sequence of the input moving pictures, with each such set being used as a processing unit. Referring to the flowchart of FIG. 20, control of the pre-filter coefficients is explained.

Figure 20:
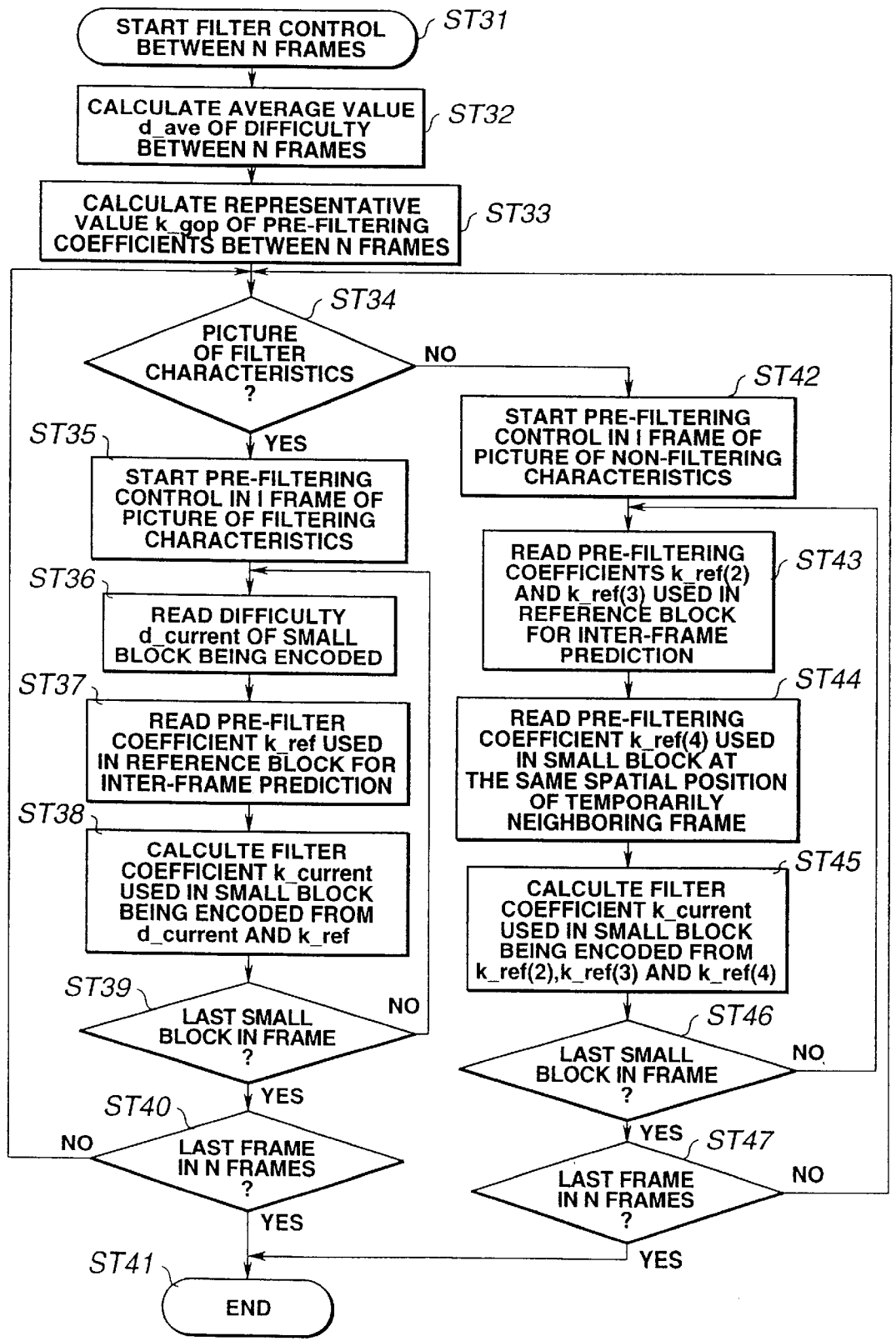
FIG. 20 is a flowchart showing an example of a pre-filter control method.

In the flowchart of FIG. 20, filter control is started at step ST31 between N frames containing a frame being encoded.

At step ST32, an average value d_ave of the encoding difficulty of the N frames of the pictures of filtering characteristics is calculated. At the next step ST33, a representative value k_gop of the pre-filter coefficient through the N frames is calculated. The representative value k_gop of the pre-filter coefficients is empirically set in advance with respect to the average value d_ave of the encoding difficulty of the N frames. Here, the passband of the low-pass filter is set so as to narrower, that is to say, the k_gop is set so as to be smaller, the higher the encoding difficulty. The relation of correspondence between the average value d_ave of the encoding difficulty and the representative value k_gop of the pre-filter coefficients is shown for example in FIG. 5.

Next, at step ST34, it is verified whether or not the frame being encoded is a picture of filtering characteristics or a picture of non-filtering characteristics. If the currently encoded picture is the picture of filtering characteristics, processing transfers to step ST35 and, if otherwise, to step ST42.

Figure 19A:
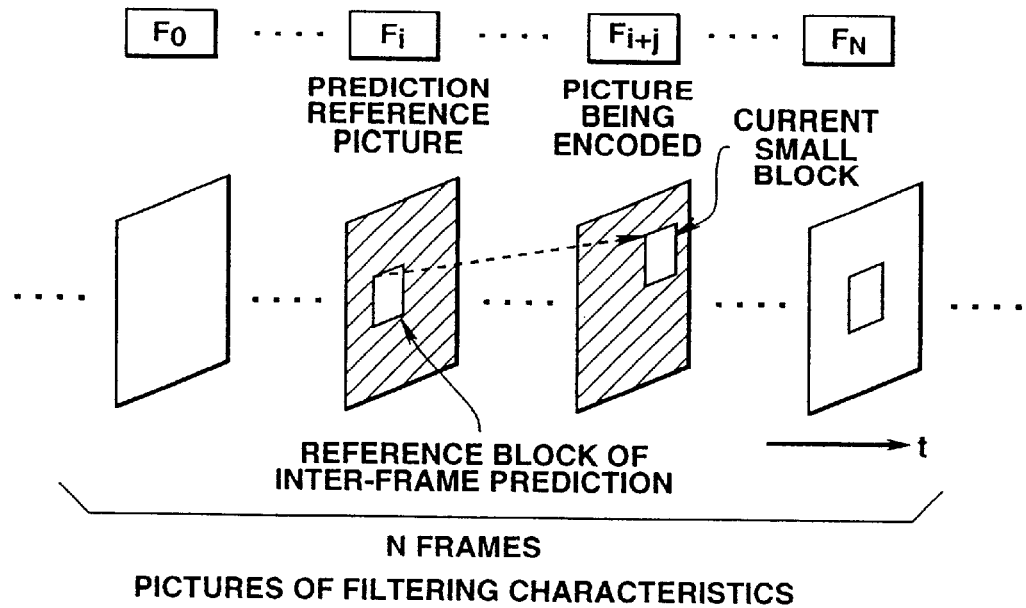
FIGS. 19A and 19B show the relation between a picture of filtering characteristics and a picture of non-filtering characteristics.

At step ST35, filter control is started within one frame of the picture of filtering characteristics. First, at step ST36, smoothed encoding difficulty d (d_current), averaged over the currently encoded small block, is read. At step ST37, the low-pass pre-filter characteristics k_ref (1) used in the small block referred to by the current small block in the inter-frame prediction, is read, as shown in FIG. 19A.

Then, at step ST38, the low-pass pre-filter characteristics k_current, used in the current small block, is calculated from the encoding difficulty d_current and the low-pass pre-filter characteristics k_ref (1), in the same way as in the typical calculations shown in FIG. 12.

At the next step ST39, it is verified whether or not the current small block is the last block in the frame. If, at this step ST39, the current small block is verified not to be the last block in the frame, processing reverts to step ST36. If it is found at step ST39 that the current small block is the last block in the frame, processing transfers to step ST40.

At step ST40, it is verified whether or not the current frame is the last picture of filtering characteristics of the group made up of N frames. If it is found at step ST40 that the current frame is not the last picture of filtering characteristics in the group made up of N frames, processing reverts to step ST34. If it is found that the current frame is the last picture of filtering characteristics in the N-frame set, processing transfers to step ST41.

Figure 19B:
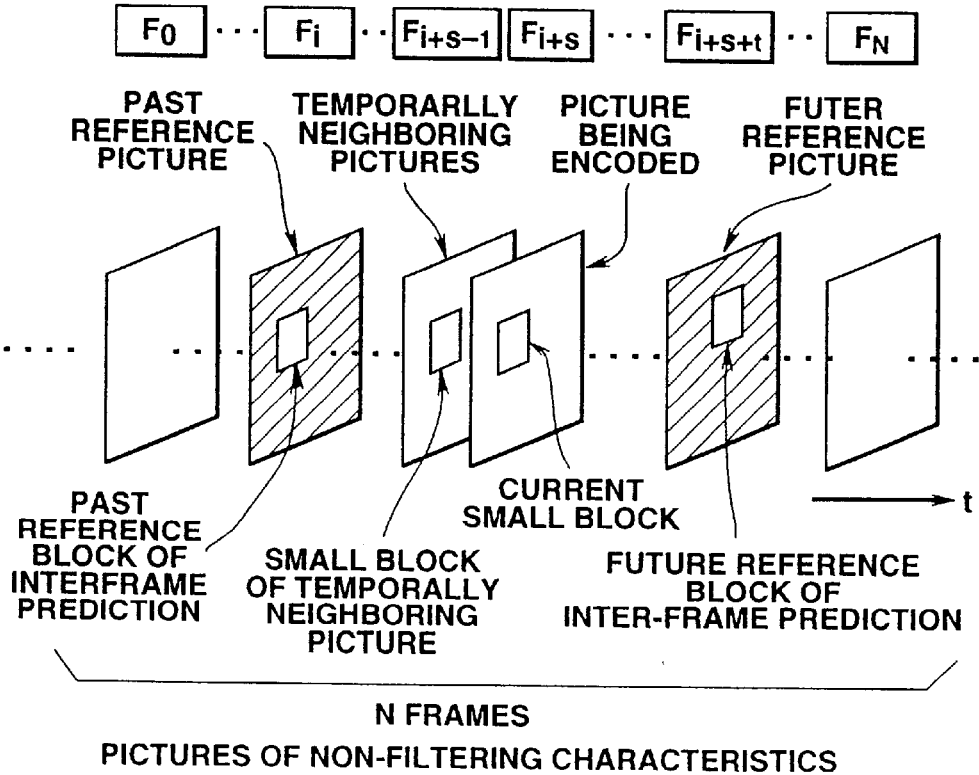

At step ST42, filter control is started in one frame of the pictures of non-filtering characteristics. First, at step ST43, the low-pass pre-filter characteristics k_ref (2) and k_ref (3), used in the small blocks of the past reference picture and the future reference picture, and which are referred to by the current small block in the inter-frame prediction, are read, as shown in FIG. 19B. At step ST44, the low-pass pre-filter characteristics k_ref (4), used in the small block at the same spatial position of the temporally proximate frame, is read, as shown in FIG. 19B. Then, at step ST54, the low-pass pre-filter characteristics k_current, used in the current small block, is calculated from the low-pass pre-filter characteristics k_ref (2), k_ref (3) and k_ref (4).

FIG. 21 shows typical calculations for the low-pass pre-filter characteristics k_current. If the current encoded picture, past reference picture and the future reference picture are related to one another as shown in FIG. 19B, k_current is calculated, in the typical calculations, shown in FIG. 21, by interpolation from the k_ref (2), k_ref (3), using the distance between the respective pictures, as shown by the equation (g). Then, as shown by the conditions (h) and (i), k_current is compared to the low-pass pre-filter characteristics k_ref (4) as used in the small block and which is at the same spatial position of the picture temporally proximate to the small block of the current encoded picture. If the variation of the k_current and the k_(ref) 4 is larger than a pre-set threshold, control is performed to suppress the variation.

Specifically, if, in the typical calculations, shown in FIG. 21, the k-current is larger by E times k_ref(4), where E>1, as shown in the condition (h), the k_current is changed to E times k_ref(4). If, as in condition (i), the k_current is smaller than F times the k_ref, where D<1, the k_current is changed to F times k_ref(4). The above procedure sets the low-pass pre-filter characteristics k_current used in the current small block.

If the pictures of non-filtering characteristics is an I-picture, calculations are carried out in a similar manner, with the low-pass filter coefficient used in the small block lying at the same position of the past reference picture being set as k_ref(2) and with the low-pass filter coefficient used in the small block lying at the same position of the future reference picture being set as k_ref(3).

Reverting to the flowchart of FIG. 20, it is verified, at a step ST46 next to the above-mentioned step ST45, whether or not the current small block is the last block in the frame. If it is found at this step ST46 that the current small block is not the last block in the frame, processing reverts to step ST43. If it is found at this step ST46 that the current small block is the last block in the frame, processing transfers to step ST47.

It is then verified, at step ST47, whether or not the current frame is the last picture of non-filtering characteristics of the group of N frames. If it is found at step ST47 that the current frame is not the pictures of non-filtering characteristics of the group of the N frames, processing reverts to step ST47. If it is found at step ST47 that the current frame is not the last picture of non-filtering characteristics of the group of the N frames, processing reverts to step ST47. If it is found at step ST47 that the current frame is the last picture of non-filtering characteristics of the group of the N frames, processing transfers to step ST41.

At this step ST41, the filter control for the N-frame group comes to a close.

The above procedure sets the pre-filter coefficient k_current by the pre-filter control circuit 28 and the interpolation circuit 48.

In the steps ST37, ST38, ST43, ST44 and ST45 of FIG. 20, the encoding difficulty d_ref(1), d_ref(2), d_ref(3), d_ref(4) of the small block, referred to by the current small block in the inter-frame prediction, may be used in place of the filter coefficients k_ref(1), k_ref(2), k_ref(3), k_ref (4).

If, in this case, the input picture is found at the picture processing type verification circuit 45 to be a picture of non-filtering characteristics, it is necessary to enter picture data S123 to the encoding difficulty measurement circuit 46 and to enter the motion vector signal MV from the motion vector detection circuit 25 to the encoding difficulty measurement circuit 46 to calculate the encoding difficulty d_ref (4).

Figure 22:
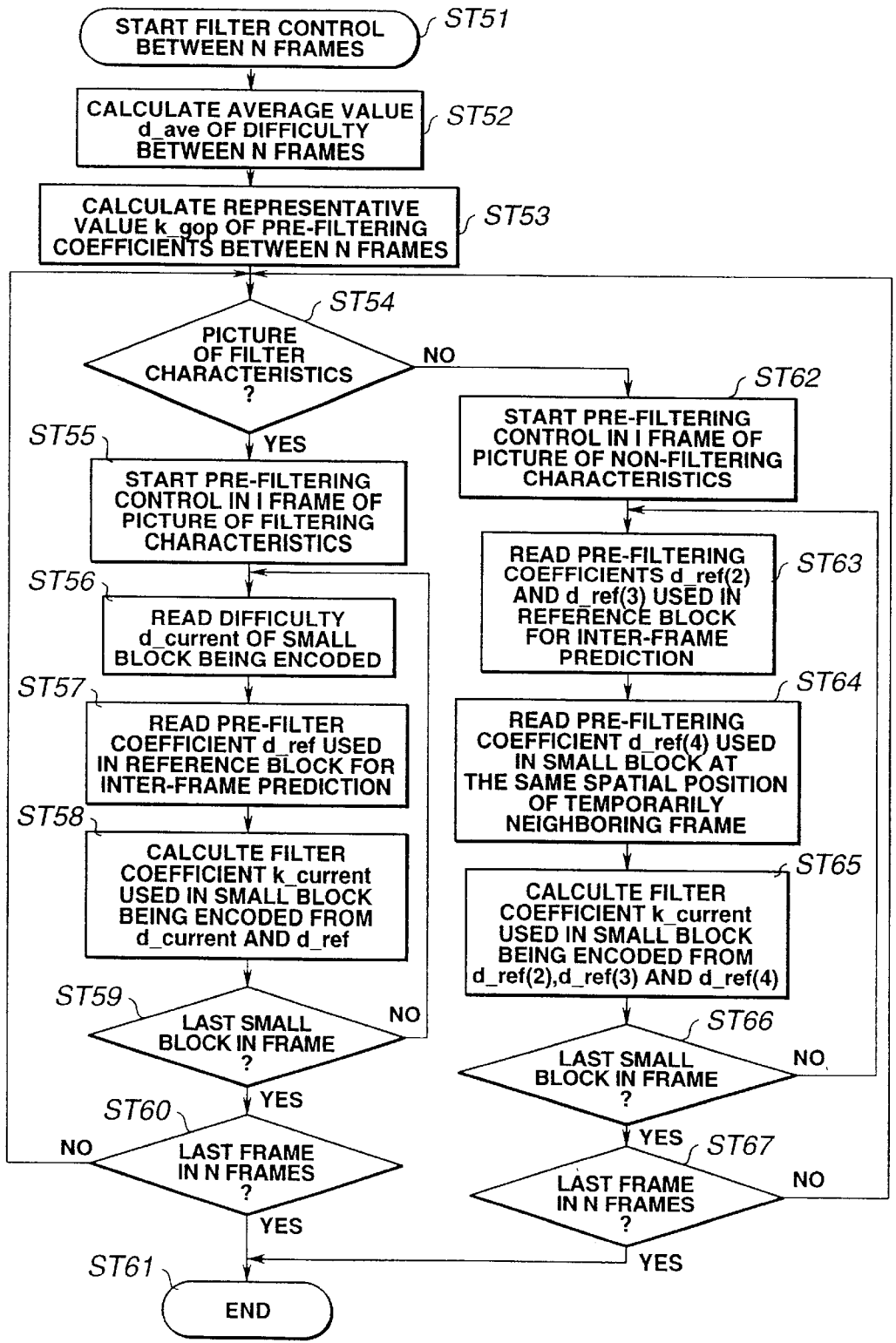
FIG. 22 is a flowchart showing an example of the method for calculating pre-filtering characteristics k_current.

Referring to FIG. 22, an instance of calculating the pre-filter characteristics k_current is explained. The flowchart of FIG. 22 differs from the flowchart of FIG. 20 in the steps ST57, ST58, ST63, ST64 and ST65, these steps corresponding to the steps ST36, ST38, ST 43, ST44 and ST 45, respectively. Since the steps ST51 to ST56, ST59 to ST62 and ST65 ff are the same as the steps ST31 to ST36, ST39 to ST42 and ST46, respectively, these steps are not explained specifically.

In FIG. 22, the encoding difficulty d_ref(1) of the small block, referred to by the current small block in the inter-frame prediction, is read, as shown in FIG. 19A. At the next step 58, the low-pass pre-filter coefficient k_current used in the current small block is calculated from the encoding difficulty d_current of the small block currently being encoded and the above-mentioned encoding difficulty d_ref (1) in the same manner as in the illustrative calculations shown in FIG. 12.

At step ST63, the encoding difficulty d_ref(2) and d_ref (3), used in the small blocks of the past reference picture and the future reference picture, and which are referred to by the current small block in the inter-frame prediction as shown in FIG. 19B, are read, as shown in FIG. 19B. At step ST64, the low-pass pre-filter coefficient k_ref(4), used in the small block at the same spatial position of the temporally proximate position, is read, as shown in FIG. 19B.

FIG. 23 shows typical calculations of the low-pass pre-filter coefficient k_current. If the picture currently encoded, past reference picture and the future reference picture are in relative positions as shown in FIG. 19B, the d_current is calculated by interpolation from the above d_ref(2) and d_ref(3), as shown by the equation (j). The encoding difficulty coefficient d-ref(4) of a small block of a currently encoded picture is compared to that of a small block lying at the same spatial position as the small block of a picture temporally proximate to the picture being encoded, as in the conditions (k) and (l). If the variation between the d_current and the d-ref(4) is larger than a pre-set threshold value, control is performed to suppress the variation.

In more detail, in the illustrative calculations shown in FIG. 23, if the d_current is larger than C times the d_ref(4), where C>1, as in the condition (k), the d_current is changed to C times d-ref(4). If the d_current is smaller than D times the d_ref(4), where D<1, as in the condition (1), the d_current is changed to D times d_ref(4). The above procedure sets the encoding difficulty d_current of the current small block. From the encoding difficulty d_current and k_gop, the low-pass pre-filter coefficient k_current used in the current small block is calculated, as in condition (j).

If the picture of non-filtering characteristics is an I-picture, the encoding difficulty of the small block at the same position of the past reference picture is set to d_ref(2), while the encoding difficulty of the small block at the same position of the future reference picture is set to d_ref(3).

In the flowchart of FIG. 22, there is stored in the pre-filter control information storage circuit 26 the encoding difficulty d_ref of the small blocks calculated in the past. From this pre-filter control information storage circuit 26, the encoding difficulty d-ref of the small block referred to in the inter-frame prediction is read out based on the block address mb_address of the current small block and the motion vector signal MV.

In reading out the encoding difficulty d_ref, as described above, it is possible to use only the block address mb_address to read out as the filter coefficient d_ref the parameter specifying the passband limitation of the low-pass pre-filter used in the small block at the same block address mb_address position on the frame referred to in the inter-frame prediction. In this case, it is unnecessary to enter the motion vector signal MV to the pre-filter control information storage circuit 26.

Reverting to FIG. 17, the current small block is low-pass-filtered in a manner specified by the pre-filter coefficient k_current to output a processed picture signal S122.

The processed picture signal S22 and its motion vector signal MV are entered to the moving picture encoding circuit 24 so as to be processed with inter-frame predictive coding and so as to be outputted at an output terminal 29 as an encoded bitstream S24.

Figure 24:
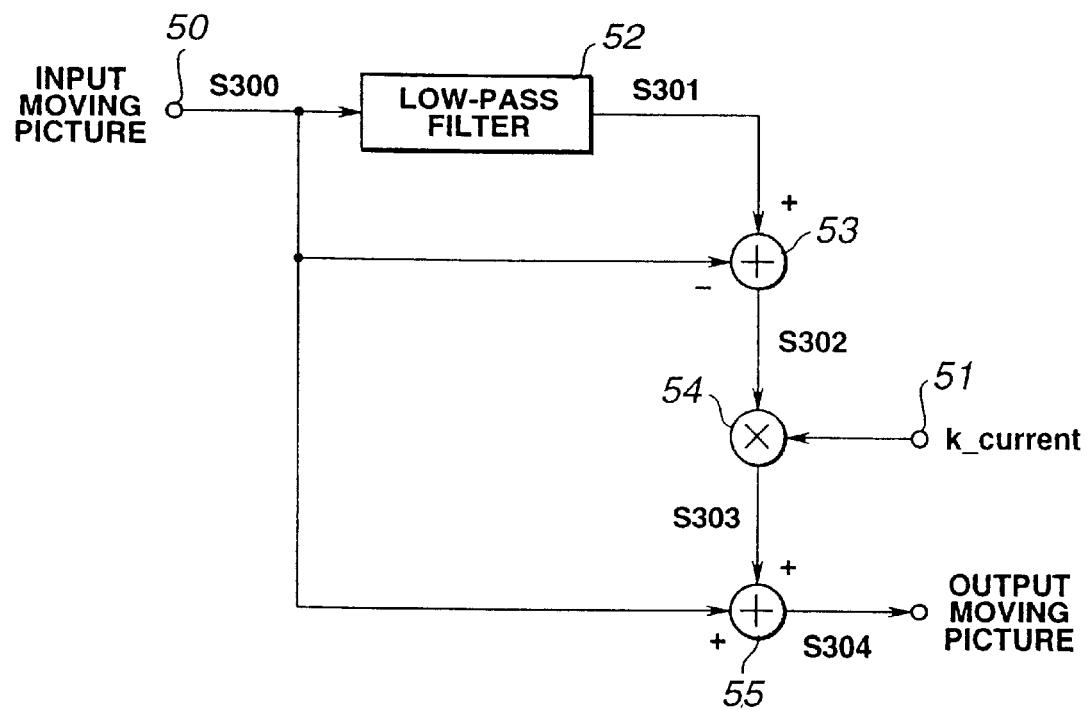
FIG. 24 shows an illustrative structure of a pre-filter.

FIG. 24 shows an illustrative structure of the pre-filter 23. In the illustrative structure, shown in FIG. 24, an input picture signal S300 to the pre-filter 23 is entered to an input terminal 50. On the other hand, the low-pass pre-filter coefficient k_current, entered from the pre-filter control circuit 28 with or without interpolation, is entered to an input terminal 51.

The low-pass pre-filter coefficient k_current is set so that $0 \leq k\_current \leq 1$.

The input picture signal S300 is entered to a low-pass filter 52 for low-pass filtering. The resulting low-pass filtered picture signal S301 is entered to an arithmetic unit 53, which then outputs a difference signal S302 corresponding to a difference between the processed picture signal and the input picture signal S300, where $$S302 = S301 - S300.$$

The difference signal S302 is entered to an arithmetic unit 54 which then multiplies the difference signal S302 with the low-pass pre-filter coefficient k_current to output a signal S303, where $$S303 = S302 \times k\_current.$$

The signal S303 from the arithmetic unit 54 is entered to an arithmetic unit 55, which outputs a pre-filtering picture signal S304 corresponding to the sum of the signal S303 and the input picture signal S300, where $$S305 = S303 - S302$$
$$= (1 - k\_current) \times S300 + (1 - k\_current) \times S301.$$

The moving picture encoding circuit 24 may be constructed as shown in FIG. 14, while the encoding difficulty measurement circuit 46 may be constructed as shown in FIG. 14.

Figure 25:
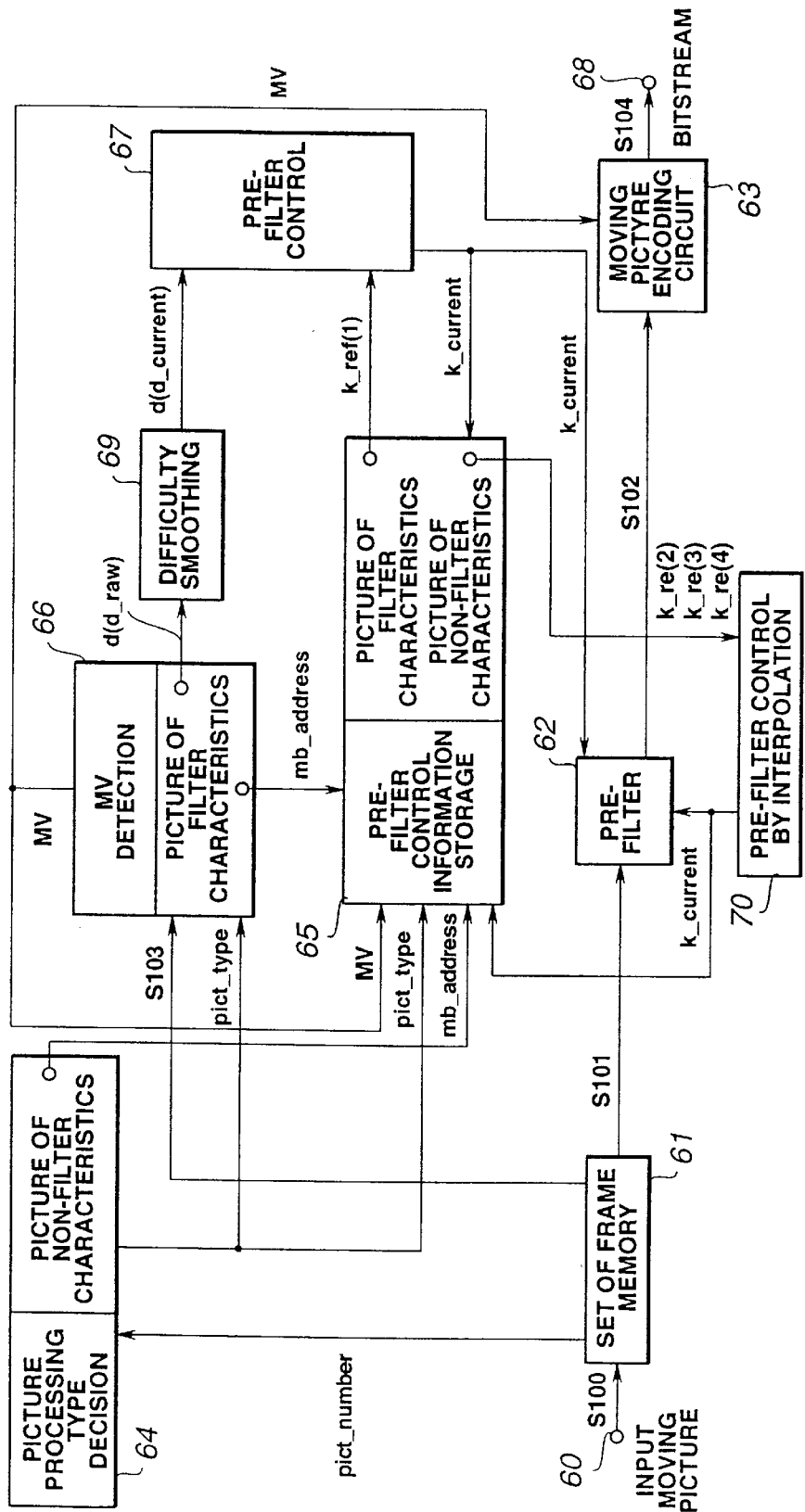
FIG. 25 is a block circuit diagram showing a fourth illustrative structure of the moving picture encoding device.

A moving picture encoding circuit of a fourth embodiment of the present invention is shown in FIG. 25.

The fourth embodiment of FIG. 25 differs from the above-described third embodiment most strongly in using prediction residuals outputted by the motion vector detection circuit 66, that is a sum Ef of absolute values of the differences between the signal Aij of the current block and the signal Fij of a block referred to by an optional motion vector, as calculated in accordance with the above-mentioned equation (1).

In FIG. 25, a digital moving picture signal S100, entering an input terminal 60, is entered to a set of frame memories 61 for storage therein. Using the picture data S103, stored in the set of frame memories 61, the motion vector detection circuit 66 detects the inter-frame motion vector, as explained with reference to the third embodiment described above.

The motion vector detection circuit 66 calculates the motion vector signal MV and the prediction residuals Ef, calculated by the above equation (1), from one small block of the input picture to another, to send the motion vector signal MV to a moving picture encoding circuit 63 and to a pre-filtering information storage circuit 65.

Based on an input processing number pict_number of the input picture data, a picture processing type decision circuit 64 verifies whether a picture being processed is a picture of filtering characteristics or a pictures of non-filtering characteristics. If the picture being processed is a picture of filtering characteristics, such as a P-picture, the circuit switching signal pict_type (1) is entered to the pre-filtering information storage circuit 65 and to the motion vector detection circuit 66.

The motion vector detection circuit 66, fed with the circuit switching signal pict_type (1), outputs the prediction residual Ef as the encoding difficulty d (d_raw) of the small block.

For evading the filter coefficients from differing drastically between neighboring small blocks, an encoding difficulty smoothing circuit 69 smoothes the input d (d_raw) in a frame to calculate the smoothed encoding difficulty information d (d_current). The smoothing processing by the encoding difficulty smoothing circuit 69 is carried out in the same way as in the third embodiment described above. The encoding difficulty of the small block being encoded d (d_current) is entered to a pre-filtering control circuit 67. In a pre-filtering information storage circuit 65 is fed with the pre-filtering coefficients used in the small block entered in the past. To the pre-filtering information storage circuit 65 are entered the block address mb_address specifying the position on the frame of the current small block, motion vector signal MV of the current small block and the circuit switching signal pict_type (1).

From the pre-filtering information storage circuit 65, the filter coefficient k_ref (1), as a parameter specifying the passband limitations of the low-pass filter used in the small block referred to by the current small block in the inter-frame prediction, is read out, based on the above signals, so as to be entered to the pre-filtering control circuit 67.

In reading out the filter coefficient k_ref(1), it is possible to use only the block_address mb-address to read out, as the filter coefficient k_ref, a parameter specifying the passband limitations of the low-pass pre-filter used by the small block lying at the same block address mb_address position on the frame referred to in the inter-frame prediction. In this case, it is unnecessary to enter the motion vector signal MV to the pre-filtering information storage circuit 65.

When fed with the encoding difficulty d and the filter coefficient k_ref(1), the pre-filtering control circuit 67 generates the filter coefficient k_current, as a parameter specifying the passband limitations of the low-pass pre-filter used in the current small block, based on the above signals, to output the generated parameter to the pre-filter 62. It is noted that the pre-filter 62 has characteristics explained with reference to FIG. 2. That is, the pre-filter 62 has lowpass filter characteristics such that, the smaller the filter coefficient k_current, the narrower is the passband of the low-pass filter.

The characteristics of the pre-filter 62 may be different from those of the low-pass filter shown in FIG. 2.

The filter coefficient k_current, calculated by the pre-filtering control circuit 67, is sent to and stored in the pre-filtering information storage circuit 65, so as to be used as a reference value k_ref when setting the pre-filter coefficient to be used in a small block entered in future.

If the picture processing type decision circuit 64 finds that, based on the input pict_number, the picture currently processed is a picture of non-filtering characteristics, such as an I-picture or a B-picture, the circuit switching signal pict_type (2) is sent to the pre-filtering information storage circuit 65 and to the motion vector detection circuit 66, while the block address mb_address specifying the position on the frame of the current small block is sent to the pre-filtering information storage circuit 65 and to an interpolation circuit 70.

The prediction residual Ef is not outputted by the motion vector detection circuit 66 fed with the circuit switching signal pict_type (2).

The pre-filtering information storage circuit 65, fed with the block address mb_adress of the current small block, motion vector MV of the current small block and with the circuit switching signal pict_type (2), reads out filter coefficient k_ref (2) and k_ref(3), as parameters specifying the passband limitations of the low-pass filter used by the small blocks of the future reference picture and the past reference picture referred to by the current small block in the inter-frame prediction, and a filter coefficient k_ref(4), as a parameter specifying the passband limitation of the low-pass pre-filter used by the small block lying at the same spatial positions of the temporally proximate picture.

In reading out the filter coefficients k_ref(2) and k_ref (3), it is possible to use only the block_address mb-address to read out, as the filter coefficients k_ref(2) and k_ref(3), a parameter specifying the passband limitations of the low-pass pre-filter used by the small block lying at the same block address mb_address position on the frame referred to in the inter-frame prediction. In this case, it is unnecessary to enter the motion vector signal MV to the pre-filtering information storage circuit 65.

When fed with the motion vector signal MV of the current small block and with the filter coefficients k_ref(2), k_ref (3) and k_ref(4), the interpolation circuit 70 performs interpolation, based on the filter coefficient k_ref(2) of the past reference picture and on the filter coefficient k_ref(3) of the future reference picture, while generating the filter coefficient k_current of the current small block, using the filter coefficient k_ref(4) of the small blocks lying at the same spatial position of temporally proximate picture, in order to enter the generated output to the pre-filter 62.

It is also possible not to use the filter coefficient k_ref(4) used in the small block at the same spatial position of the picture lying temporally proximate to the current small block, and to read out only the filter coefficients k_ref(2) and k_ref(3) used in the small block referred to by the current small block in the inter-frame prediction, in order to generate and output the filter coefficient k_current of the current small block.

If the picture of non-filtering characteristics is a picture not doing inter-frame prediction, such as an I-picture of the MPEG system, the filter coefficients of the small blocks lying at the same spatial positions of the temporally previous and temporally succeeding pictures of filtering characteristics, as the filter coefficient k_ref(2) of the past reference picture and as the filter coefficient k_ref(3) of the future reference picture, in order to perform interpolation. In this case, the filter coefficient k_ref(4) of the small block lying at the same spatial position of the temporally proximate picture is not used.

If, in the I-picture, motion prediction is used, the I-picture can also be used as a picture of filtering characteristics. The pre-filter 62 has characteristics as shown in FIG. 2. Here, the smaller the filter coefficient k_current, the narrower is the passband of the low-pass filter characteristics.

The filter coefficient k_current, calculated by the interpolation circuit 70, is also sent to and stored in the pre-filtering information storage circuit 65 so as to be used as a reference value (filter coefficient k_ref) when setting the pre-filter coefficient used in the small block entered in future.

The above procedure adaptively sets the filter coefficient of the pre-filter 62 to realize the encoding system which gives optimum subjective impression and optimum encoding efficiency.

The method for calculating the filter coefficient k_current is the same as that explained in the first embodiment with reference to FIG. 9.

The current small block is low-pass-filtered in a manner specified by the pre-filter coefficient k_current to output a processed picture signal S102.

The processed picture signal S102 and its motion vector signal MV are entered to the moving picture encoding circuit 63 so as to be processed with inter-frame predictive coding and so as to be outputted at an output terminal 68 as an encoded bitstream S104. The structure of the moving picture encoding circuit 63 is the same as that of the second embodiment explained with reference to FIG. 13.

In the present third embodiment of the moving picture encoding circuit, in which the filter characteristics at the time of pre-filtering for the moving picture signals encoded by inter-frame predictive coding can be adaptively changed to conform to the encoding difficulty d of small blocks splitting the picture, it is possible to select a low-pass filter of narrower passband for a portion of the picture exhibiting locally fast movement or presenting a complex picture pattern and higher encoding difficulty, while it is possible to select a low-pass filter of broader passband for a portion of the picture exhibiting slow movement or presenting a flat picture pattern and lower encoding difficulty.

In consideration of difference in the picture-based encoding difficulty, as in the MPEG system, pictures of reference as to encoding difficulty are specified to evade drastic difference in the pre-filter coefficients between consecutive pictures.

Moreover, in a fourth embodiment of the moving picture encoding device, not only the encoding difficulty of the small blocks, but also the pre-filtering controlling information used by the small blocks referred to by the small block being encoded in the inter-frame prediction and by the small block lying at the same spatial position of the proximate picture, are taken in to account, to correct the filter characteristics selected as described above, and to set ultimately the pre-filtering characteristics for the small block of the currently encoded small block, in order to prevent the inter-frame prediction coding efficiency from being lowered. Thus, the low-pass pre-filtered moving picture gives a higher subjective impression of the encoded picture quality and a higher encoding efficiency than those achieved by the conventional system.

The encoded bitstream, obtained on encoding by the moving picture encoding devices of the first to fourth embodiments, is recorded on a signals recording medium or transmitted over a transmission channel.

Figure 26:
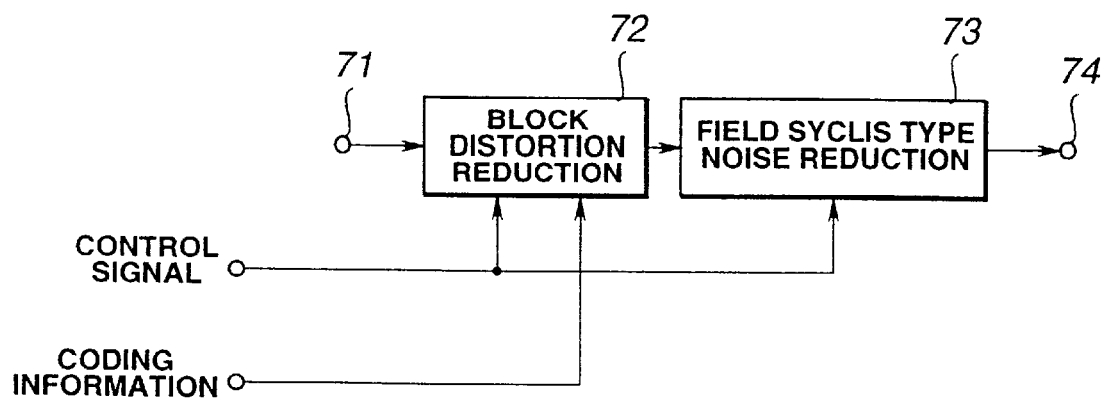
FIG. 26 is a block diagram showing an illustrative structure of a noise reducing circuit.

An illustrative structure of the above-described noise reducing circuit 14 is hereinafter explained. Referring to FIG. 26, the noise reducing circuit 14 includes a block distortion reducing circuit 72, fed with picture data from the MPEG decoder 13, entered from an input terminal 71, and a field recursive type noise reducing circuit 73, fed with picture data from the block distortion reducing circuit 72. An output of the field recursive type noise reducing circuit 73 is outputted at an output terminal 74 to the above-mentioned picture quality correction circuit 15.

Figure 27:
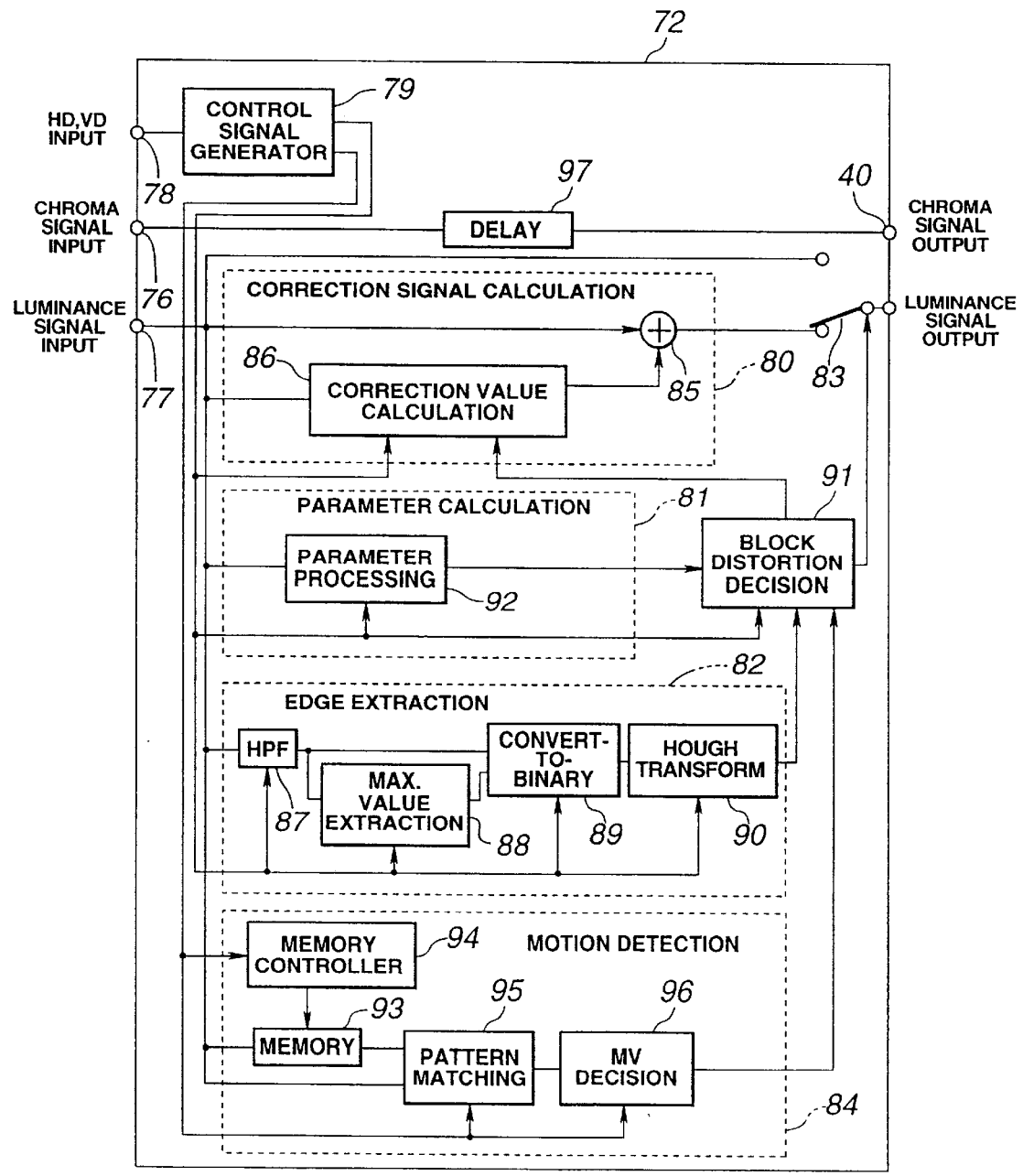
FIG. 27 is a schematic block diagram showing the structure of a picture data block distortion reducing device according to the present invention.

The block distortion reducing circuit 72 is configured as shown in FIG. 27. The block distortion reducing circuit 72, shown in FIG. 27, has a chroma signal input terminal 76, to which are entered chroma components of picture data, decoded by the MPEG decoder 13 following the encoding with, for example, block encoding, by the MPEG encoder 5, and a luminance signal input terminal 77, to which are entered luminance components of the picture data.

To a HD-VD input terminal 78 are entered horizontal and vertical synchronization signals, which are sent to a control signal generator 79, where various timing signals required in various circuits are produced.

The luminance signals, entering the luminance signal input terminal 77, are sent to a correction signal calculating unit 80, a parameter calculating unit 81, an edge extraction circuit 82, a switching selection circuit 83 and a motion detection circuit 84.

In the correction signal calculating unit 80, the input luminance signals are fed to an adder 85 and a correction value calculation unit 86. The correction value calculation unit 86 predicts the tilt following the correction based on the difference from neighboring pixels on either sides of the boundary. The correction signal calculating unit 80 also finds a correction value corresponding to the correction intensity information from the block distortion decision unit, while finding a pixel-based correction value inversely proportionate to the boundary distance. The correction value from the correction value calculation unit 86 is sent to the adder 85 where it is summed to the input luminance signal.

The input luminance signal is also sent to a high-pass filter (HPF) 87 of the edge extraction unit 82 for degree-two differentiation for detecting edge elements. In the present embodiment edge elements are extracted using, for example, the Laplacian filter. The edge-detected signal from the HPF 87 is sent to a maximum value extraction unit 88. In this maximum value extraction unit 88, the maximum value is detected in an edge extraction blocks on both sides of the block boundary for finding a threshold value required by the next-stage convert-to-binary unit 89.

To the convert-to-binary unit 89, the threshold value found by the maximum value extraction unit 88 and the signal edge element signal extracted by the HPF 87 are entered and conversion-to-binary operation is carried out based on the threshold value. A Hough transform unit 90 executes Hough transform in the edge extraction block on both sides of the block boundary, based on the converted binary signal, for mapping the edge element in a parameter space $(\rho, \theta)$ to find a straight line $(\rho 0, \theta 0)$ in the block. The $\rho 0, \theta 0$, thus found, are entered to a block distortion decision unit 91.

The input luminance signal from the luminance signal input terminal 77 is sent to a parameter calculation circuit 92 of a parameter calculation unit 81 to find parameters in the correction block required by the block distortion decision unit 91.

The input luminance signal is also entered to a memory 93 of the motion detection circuit 84 and is written therein under control by a memory controller 94. The luminance signal of the previous field, read out by the memory controller 94, is sent to a pattern matching unit 95 for pattern matching to the input luminance signal. The results of the processing of the pattern matching are sent to a vector decision unit 96 for discriminating the size of the movement. The presence or absence of the movement, thus found, is informed to the block distortion decision unit 91.

The block distortion decision unit 91 verifies, based on the straight-line component $(\rho 0, \theta 0)$ in the block from the edge extraction unit, parameters in the correction block from the parameter processing unit and the size of the movement from the motion detection unit, whether or not block distortion persists and whether or not the block distortion correction value is to be used under control, that is whether or not the block distortion correction value is strong or weak. This correction strong/weak signal is sent to a correction value calculation circuit 32 of the correction signal calculation unit 80, while a correction on/off signal is sent to a control terminal of the switching selection circuit (selector) 83.

The input luminance signal is also fed to the adder 85 of the correction signal calculating unit 80 and is summed to the luminance signal and the correction value found from the luminance signal and the correction value calculation unit 86 to produce a signal freed of the block distortion. This signal is sent to the switching selection circuit (selector) 83.

The selector 83 is responsive to the block distortion on/off signal from the block distortion decision unit 91 to select which of the input luminance signal or the corrected signal is to be outputted.

On the other hand, the input chroma signal is entered to a delay circuit 97 for matching the delay to that of the luminance signal traversing the correction circuit.

The method of setting the output correction signal of the correction value calculating unit 85 if the block distortion on/off signal from the block distortion decision unit 91 is off may also be used without employing the selector 83.

Although it is assumed in the noise reducing circuit 72 of FIG. 27 to apply block distortion reduction only to luminance signals, similar processing may also be applied to chroma signals.

The algorithm of reducing the block distortion in the block distortion reducing circuit 72 configured as shown in FIG. 27 is explained in further detail.

Figure 28:
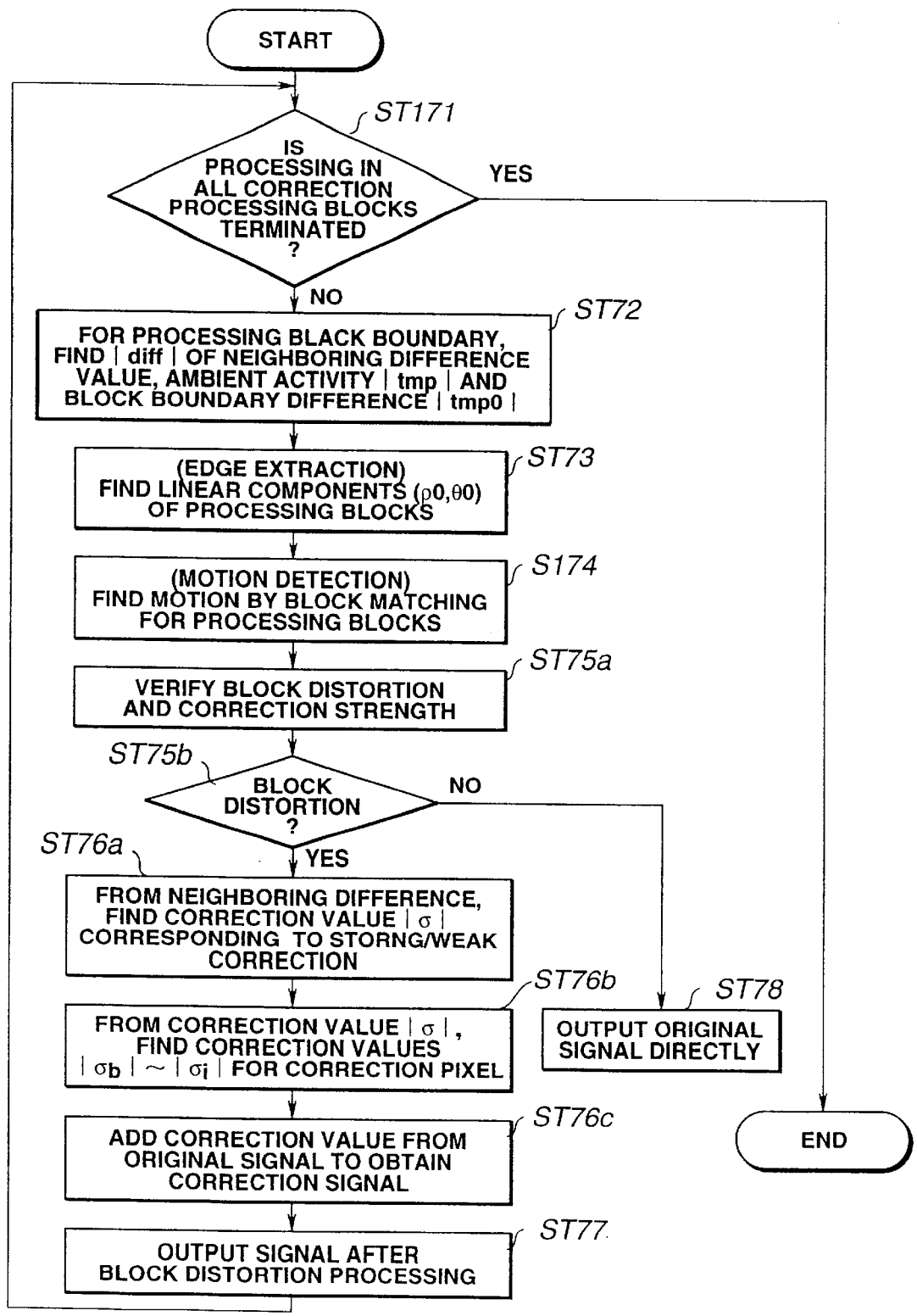
FIG. 28 is a flowchart for illustrating the sequence of processing of the block distortion reducing method.

FIG. 28 shows the flowchart for illustrating the algorithm of the block distortion reducing method embodying the present invention. Although the instance of FIG. 28 shows the processing algorithm in the horizontal (H) direction, the block distortion reducing algorithm in the vertical (V) direction is similar except that the processing in the H direction is changed to that in the V direction and hence is not explained specifically.

In FIG. 28, it is verified at step ST71 whether or not the processing for reducing the block distortion has come to a close for all block boundaries in the H-direction. If the result is YES, the processing is terminated and, if otherwise, processing transfers to step ST72.

Figure 29:
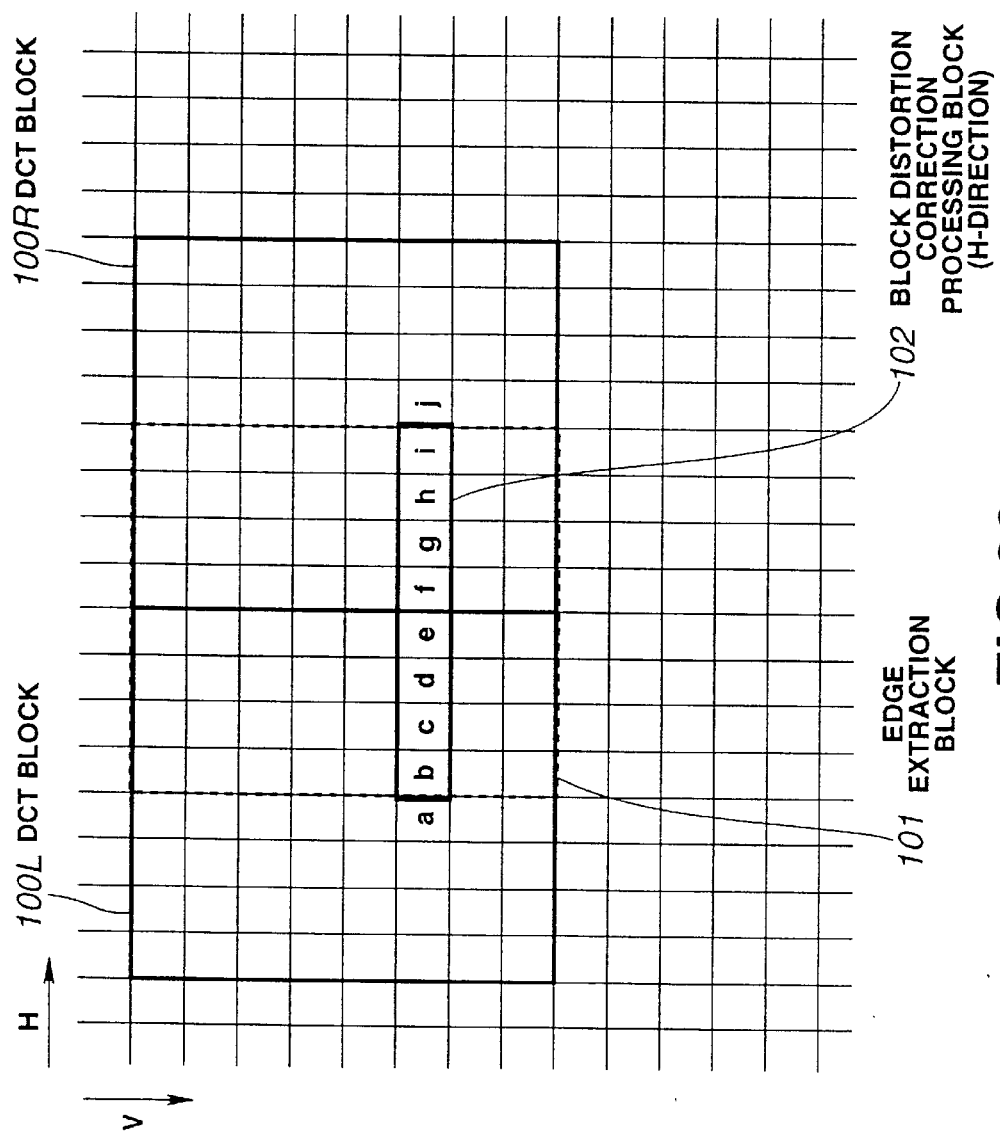
FIG. 29 shows pixels in the vicinity of the block boundary for correcting block distortion.

The pixels used for processing for reducing the bloc distortion are explained with reference to FIG. 29. In the example of FIG. 29, DCT encoding is used for block encoding and 8×8 pixels make up a DCT block. That is, if five pixels each towards left and right of the block boundary of a left DCT block 100L and a right DCT block 100R are used for reducing the block distortion, and four pixels each from the block boundary serve as a correction range, an edge extraction block 101 is an 8×8 pixel block centered about the block boundary, while a block distortion correction block 103 is a block of eight pixels on a line in the edge extraction block 101. At a first step ST71 of FIG. 29, it is verified whether or not the block distortion processing has been carried out on all correction blocks 102.

At the next step ST72, the boundary difference |tmp0|, activity |tmp| and the neighboring difference |diff| as parameters required for decision on whether or not block distortion persists, are found by the following equations:

$$|tmp0|=|f-e|$$

$$|tmp|=(|b-a|+|c-b|+|d-c|+|e-d|+|g-f|+|h-g|+|i-h|+|j-i|)/8$$

$$|diff2|=|d-c|$$

$$|diff3|=|e-d|$$

$$|diff4|=|g-f|$$

$$|diff5|=|h-g|.$$

Figures 30, 31:
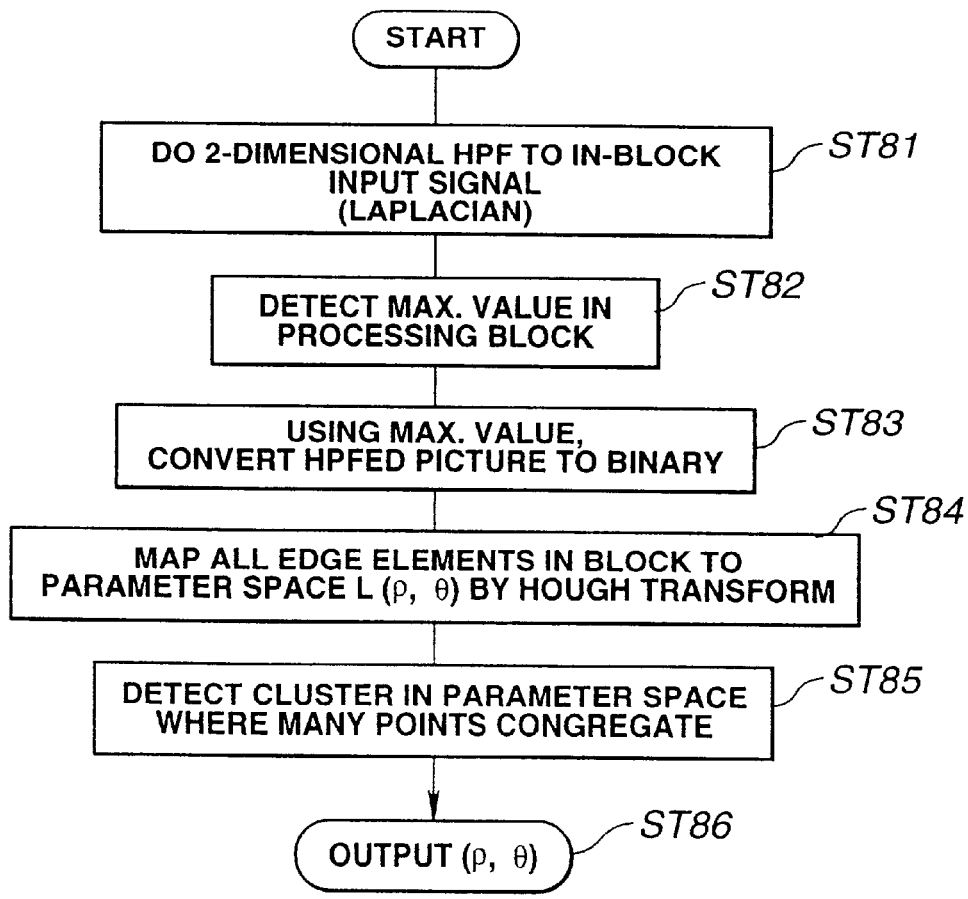
FIG. 30 is a flowchart for illustrating a typical operation for edge extraction.
FIG. 31 shows an example of Laplacian filter coefficients.

As may be seen from the above equations, the boundary difference |tmp0| is an absolute value of the difference between neighboring pixels e and f on either sides of the boundary of the DCT blocks of FIG. 30, while the activity |tmp| is an average value of the absolute values of the differences between the neighboring pixels of a block distortion processing block 102, excluding the difference between the pixels e and f. The neighboring difference |diff| is an absolute value of the respective differences between the pixels c and d, d and e, f and g and g and h.

At the next step ST73, a straight line component ($\rho 0$, $\theta 0$) is found by doing edge extraction in the edge extraction block 101 corresponding to the correction block. The edge extraction processing will be explained subsequently in detail.

Then, processing transfers to step ST74 to check the size of the motion of the two DCT blocks on either sides of the correction block. The motion detecting operation will be explained subsequently in detail.

Then, at step ST75a, it is verified, using the parameters found at steps ST72, ST73 and ST74, straight-line component ($\rho 0$, $\theta 0$) and the size of the motion, whether or not there is the block distortion in the block boundary and as to the intensity of correction. An example of the block distortion verification will be explained subsequently.

If, at the next step ST75b, it is found that the block distortion persists, processing transfers to step ST76a and, if otherwise, to step ST78.

If it is found that block distortion persists, processing transfers to step ST76a to find the boundary step difference |step| following the correction by the equation $$|step|=|diff3+diff4|/2$$

from the neighboring difference based on the properties of a picture, in particular the linearity. The amount of correction |$\beta$|, required for affording this magnitude of the boundary step difference |step| following the correction, is found by $$|\beta|=(|tmp0|-|step|)/2$$

It is desirable that the boundary difference |tmp0| be discriminated at a pre-set threshold value corr_th to switch the correction intensity. In this case, if, with |tmp0|<corr_th, the correction intensity is strong (strong correction), the quantity of the correction |$\beta$| is set so that $$|\beta|=(|tmp0|-|step|)/2$$

to perform the correction, whereas, if, with |tmp0|≧corr_th, the correction intensity is weak (weak correction), the quantity of the correction |$\beta$| is halved, that is, set so that $$|\beta|=(|tmp0|-|step|)/4$$

to perform the correction.

Specifically, if the boundary threshold |tmp0| is larger than the pre-set threshold value corr_th, there is the possibility that a mistaken decision was given in block distortion decision even although an edge exists in the block boundary, so that, for evading the mistaken correction, the correction intensity strong/weak is switched.

At the next step ST76b, the pixel-based correction value is found from the produced correction value |$\beta$|. For smoothing the junction to the neighboring correction range, and in consideration that the block distortion intensity is increased as the block boundary is approached, the correction value inversely proportionate to the distance from the boundary is found.

Specifically, if the correction values of the respective pixels b to i in the correction range 102 of FIG. 30 are indicated |$\beta b$| to |$\beta i$|, the following correction values $$|\beta e|=|\beta|, \ |\beta f|=|\beta|,$$

$$|\beta d|=|\beta|/2, \ |\beta g|=|\beta|/2,$$

$$|\beta c|=|\beta|/4, \ |\beta h|=|\beta|/4,$$

$$|\beta b|=|\beta|/8, \ |\beta i|=|\beta|/8,$$

are found, using the above correction value |$\beta$|.

At the next step ST76c, picture signals (picture data) SBb to SBi, corrected for block distortion, are found, using the correction values $|\beta b|$ to $|\beta i|$ for the respective pixels b to i as found at the steps ST76b.

Specifically, with the input picture data of the pre-correction pixels b to i being Sb to Si, the correction is performed, in dependence upon the sign of the tmp0, to give the corrected picture data SBB to SBI such that $SBb=Sb+|\beta b|$ if tmp0≧0; $SBb=Sb-|\beta b|$ if tmp0<0;

$SBc=Sc+|\beta c|$ if tmp0≧0; $SBc=Sc-|\beta c|$ if tmp0<0;

$SBd=Sd+|\beta d|$ if tmp0≧0; $SBd=Sd-|\beta d|$ if tmp0<0;

$SBe=Se+|\beta e|$ if tmp0≧0; $SBe=Se-|\beta e|$ if tmp0<0;

$SBf=Sf-|\beta f|$ if tmp0≧0; $SBf=Sf+|\beta f|$ if tmp0<0;

$SBg=Sg-|\beta g|$ if tmp0≧0; $SBg=Sg+|\beta g|$ if tmp0<0;

$SBh=Sh-|\beta h|$ if tmp0≧0; $SBh=Sh+|\beta h|$ if tmp0<0;

$SBI=Si-|\beta i|$ if tmp0≧0; $SBI=Si+|\beta i|$ if tmp0<0;

At the next step ST77, the signals corrected for block distortion in this manner are outputted.

If it is found at step ST75b that no block distortion persists, processing transfers to step ST78 to directly output the original signal of the correction range.

Referring to FIG. 30, a typical operation for edge detection at the above step ST73 is explained.

At the first step ST81 of FIG. 30, input signals in the edge extraction block are processed by a two-dimensional high-pass filter (HPF), such as a Laplacian filter, for extracting edge elements.

This two-dimensional Laplacian filter may be exemplified by, for example, coefficients shown in FIG. 31. However, the two-dimensional Laplacian filter may also be a Sobel operator, a Prewitt operator, a Kirsch operator, a Robinson operator etc.

Then, processing transfers to step ST82 to detect the maximum value Max of the signal in a block to which HPF is applied. At the next step ST83, edge elements are extracted by a convert-to-binary operation, using a threshold value Thresh (for example, Thresh=max/2) derived from this maximum value Max. This convert-to-binary operation is such an operation in which an output signal Sout=1 for an input signal Sin>Thresh and in which an output signal Sout=0 for an input signal Sout≦Thresh.

Then, processing transfers to step ST84 to apply Hough transform to the extracted edge elements to map the edge elements to a parametric space $(\rho,\theta)$. This Hough transform maps the edge elements (x,y) in a block to the parametric space $(\rho, \theta)$ by an equation $x\cos\theta+y\sin\theta=\rho$.

At the next step ST85, a cluster where many points congregate in this parametric space $(\rho 0,\theta 0)$. A straight line traversing this $(\rho 0,\theta 0)$ is a linear edge detected in the edge extraction block. At the step ST86, the parameter $(\rho,\theta)$ is outputted.

Figure 32:
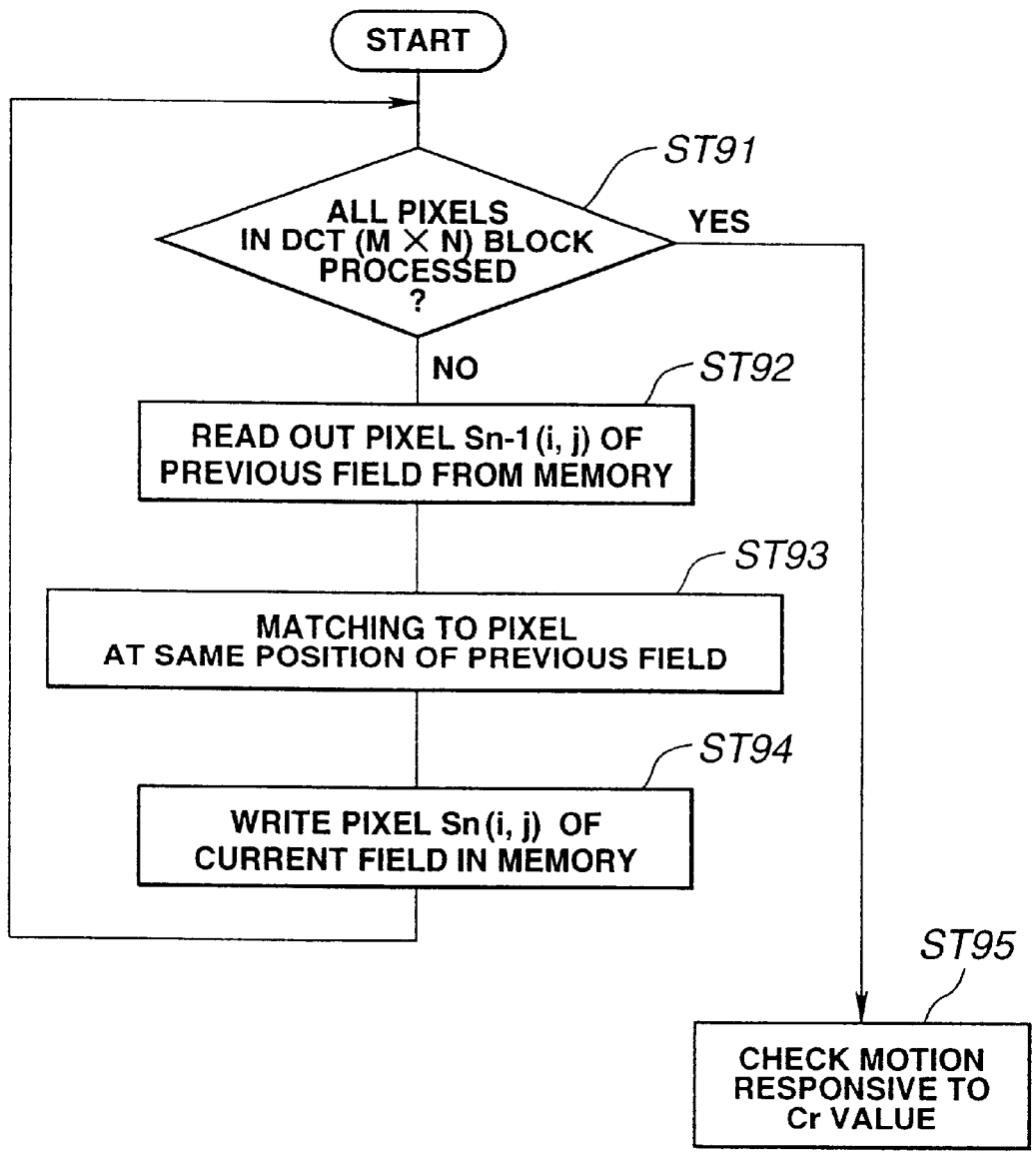
FIG. 32 is a flowchart for illustrating an example of the processing for motion extraction.

Referring to FIG. 32, a typical operation for detecting the motion at step ST74 of FIG. 28 is explained.

In the motion detection operation at step ST74 of FIG. 28, pattern matching is done on left and right DCT blocks 100L, 100R on either sides of the correction block in the processing of FIG. 30.

For the totality of the pixels in the DCT block, the pixels at the same positions of the previous field are read out for pattern matching from the memory at step ST92. The processing indicated by the equation (1) is carried out at step ST93 to write the pixels of the current field in the memory at step ST94.

In the equation (1), Sn(i, j) denotes the luminance signal of the pixel at a position (i,j) of the n'th field, while BLK_H and BVLK_V denote the DCT block size in the H and V directions, respectively.

In the processing of all these steps ST92 to ST94, it is checked at the first step ST91 whether or not processing has come to a close for all pixels in the DCT (M×N) block. If the result is YES, that is if the processing has come to a close, processing transfers to step ST95 to check for the motion depending on the value of Cr as found by the equation (1).

By way of the motion discrimination at this step ST95, it is possible to pre-set threshold values mov_thL and mov_thH for the above value of Cr, where mov_thL<mov_thH, and to make discrimination such that the motion be small, medium and large for Cr<mov_thL, mov_thL≦Cr≦mov_thH and for mov_thH<Cr, respectively.

Although the pattern matching is done for the totality of pixels in the DCT block, this is merely illustrative since it is also possible to apply LPF and to decimate 2, 4 pixels to effect pattern matching on the decimated pixels.

Although pattern matching for the DCT blocks lying at the same position is used in the embodiment of FIG. 32 as means for finding the magnitude of the motion, such embodiment is, of course, merely illustrative and is not limiting the invention. For example, it is also possible to compare pattern matching C(k) for all tentative vectors in the range of motion compensation to find the possible presence of motion with the tentative vector according the smallest C(k) or to effect matching of representative points.

Figure 33:
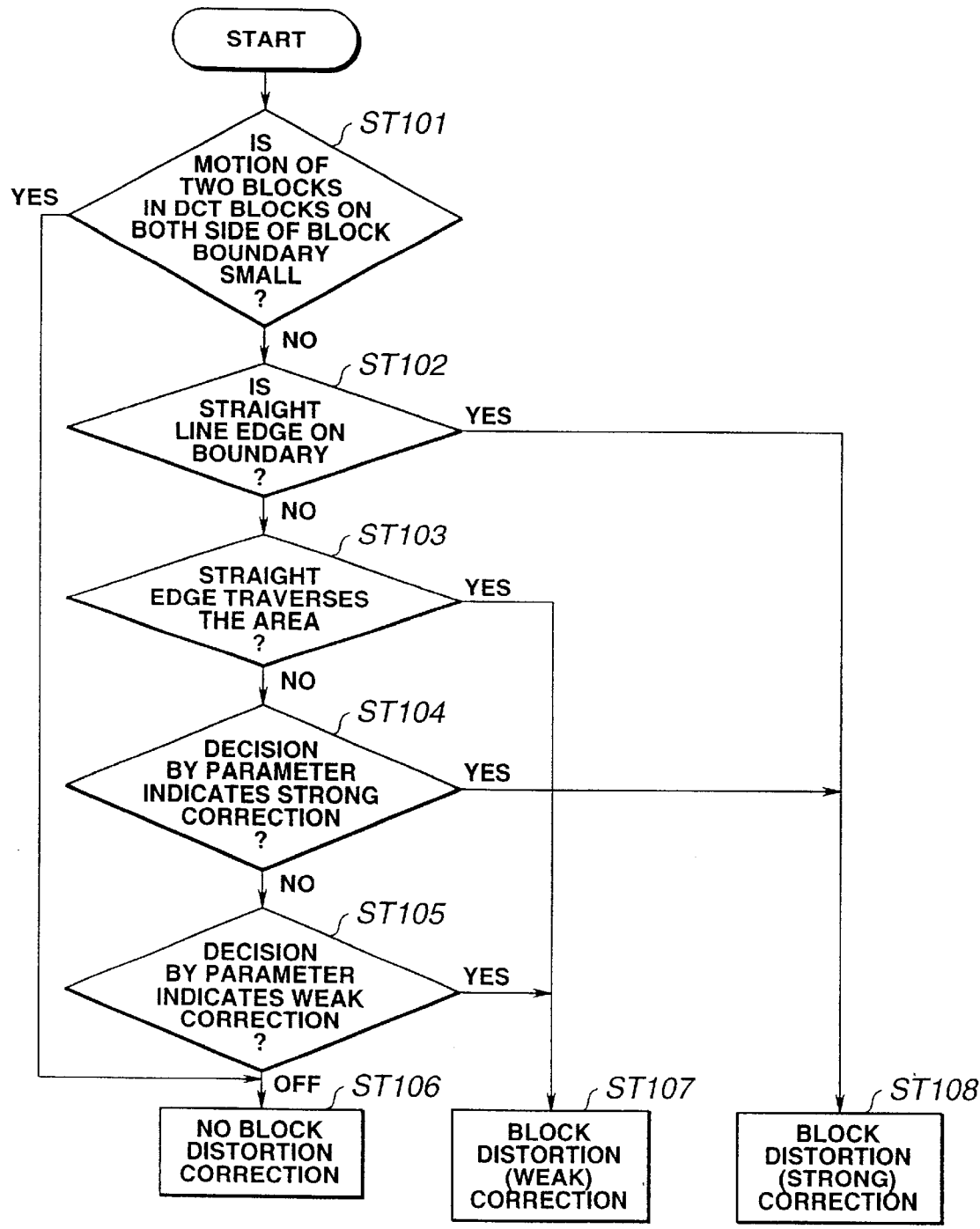
FIG. 33 is a flowchart for illustrating a typical block distortion discriminating processing operation.

Referring to FIG. 33, an illustrative operation for block distortion discrimination at steps ST75a and ST75b of FIG. 28 is explained.

In the embodiment of FIG. 33, parameter discrimination and discrimination by motion detection are used in combination.

First, the above-described pattern matching is done on the left and right DCT blocks 100L, 100R lying on both sides of the block boundary of the correction block of FIG. 29 to check the size of the motion. At step ST101, it is checked whether or not the detected motion is small or large. If the motion in both DCT blocks 100L, 100R us found to be small, a decision is given that there is no quantization error and processing transfers to step ST106 to terminate the processing without applying block distortion correction.

If the result of check at step ST101 is NO, that is if the motion is not small, processing transfers to step ST102 to check whether or not a straight line edge is present on the block boundary. At this time, $\rho 0$=(edge extraction block size)/2 and $\theta 0=\pi/2$ are set. If it is found at step ST102 that the edge is on the boundary, it is verified that strong block distortion persists and hence processing transfers to step ST108 to apply the correction for block distortion (strong).

If the result of check at step ST102 is NO, processing transfers to step ST103 to verify whether or not the straight line edge traverses an area close to the boundary of the left and right DCT blocks in FIG. 7. If the straight line edge traverses this area, it is verified that weak block distortion persists and hence processing transfers to step ST107 to apply correction for block distortion (weak).

If the result at step ST83 is NO, block distortion is checked, using parameters, in order to give decision as to whether the correction is strong (step ST104) or weak (step ST105). If a decision is given for a strong correction or a weak correction, processing transfers to step ST108 or ST107, respectively. Otherwise, a decision is given that the correction is off and processing transfers to step ST106.

By way of an example of the block distortion verification, it is verified whether or not the block distortion persists by checking, on the basis of the above-mentioned parameters |tmp0|, |tmp| and |diff|, (1) whether or not the step difference is prominent compared to its perimetral portion, that is whether or not boundary difference |tmp0|>activity |tmp|;

(2) whether the step difference is due to quantization errors of the dc and low frequency components (that is whether boundary difference |tmp0|<threshold value div_th; it being noted that, although a fixed value is used as the threshold value div_th in the present embodiment, there may also be used a value proportionate to the maximum value of the quantization step size of each block; and (3) whether or not there is any step difference larger than the boundary step difference on both sides o the boundary, that is whether or not there persists an edge on one or the other side of the boundary; in other words, whether or not neighboring difference |diff3|≦boundary difference |tmp0| and neighboring difference |diff4|≦boundary difference |tmp0|.

If all of these three conditions are met, a decision is given that there persists the block distortion. The correction intensity is set depending on whether or not the boundary difference |tmp0| is smaller than a predetermined threshold value corr_th such that the correction is strong or weak if |tmp0|<corr_th or |tmp0|≧corr_th, with corr_th<div_th, respectively.

It is preferred that the values of the threshold values div_th and corr_th be adaptively changed depending on the size of the motion obtained by the above-mentioned motion detection processing.

For example, it suffices if div_th=DIV_TH (constant) and corr_th=CORR_TH (constant) for large motion and if div_th=DIV_TH/2 and corr_th=CORR_TH/2 for medium motion.

Meanwhile, the size of the motion in the motion detection is not limited to three stages of large/medium/small, while the values of the threshold values div_th and corr_th are not limited to two stages of large/small and may be varied over finer stages.

In the processing for edge detection, described above with reference to FIG. 30, a simpler method, now explained, may be used in place of the above-mentioned Hough transform.

Figure 34:
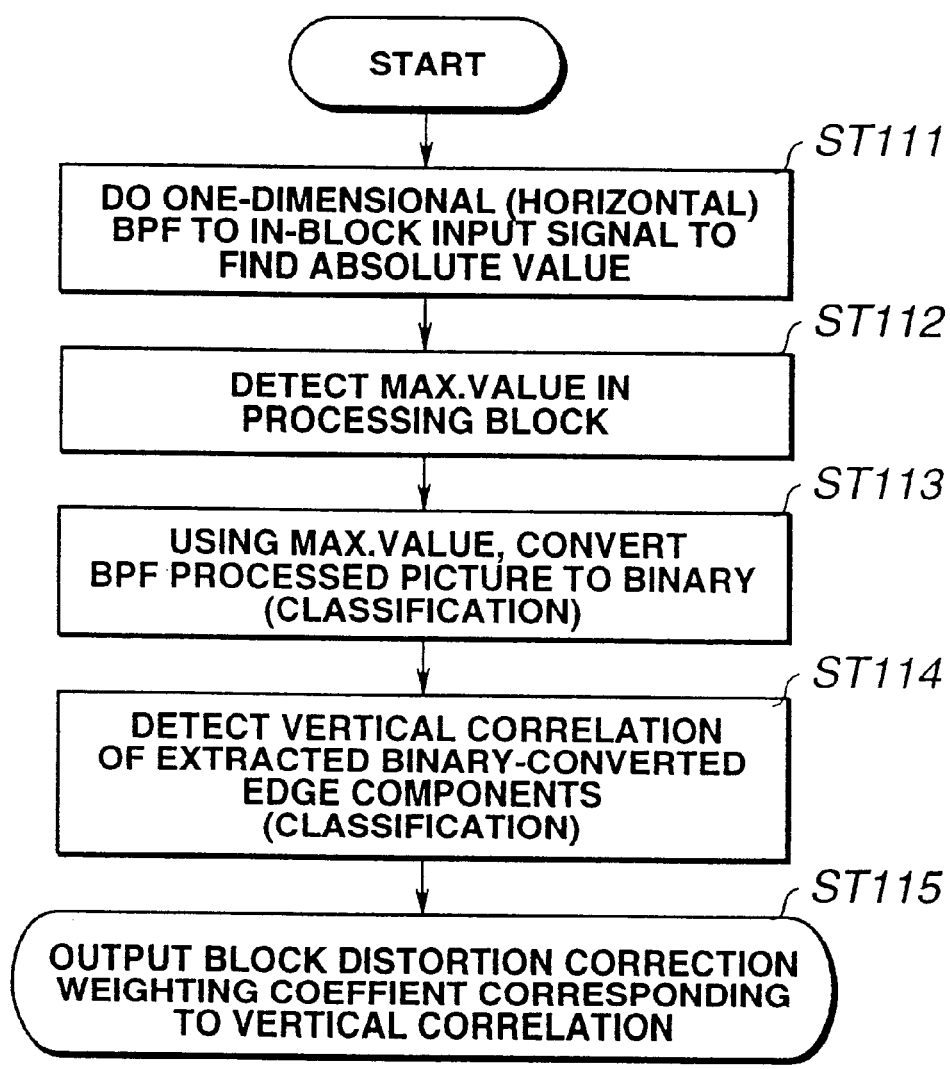
FIG. 34 is a flowchart for illustrating a typical processing operation for edge extraction by one-dimensional quadratic differentiation.
Figure 35:
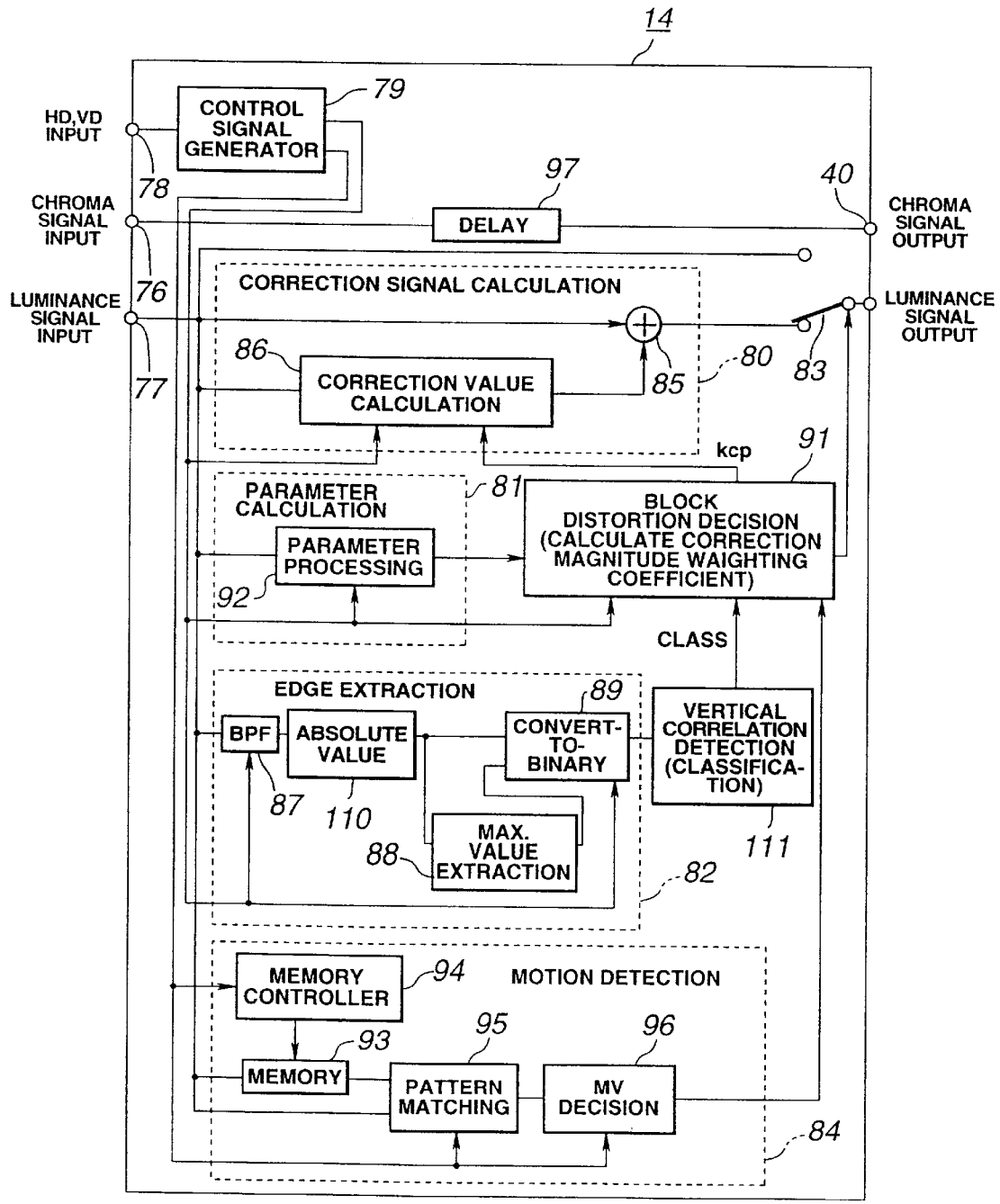
FIG. 35 is a schematic block diagram showing a picture data block distortion reducing device in case of edge extraction of FIG. 34.

FIGS. 34 and 35 show a flowchart for illustrating the operation for this simplified edge extraction and a schematic block diagram of a block distortion circuit employing this edge extraction.

In the present instance, edge extraction is done by degree-two differentiation in a one-dimensional direction or in a horizontal direction (band-pass filter or BPF). The transfer function (z) of the degree-two (quadratic)differentiation characteristics is exemplified by $$H(z)=(-1+2z-1-z-2)/4.$$

After taking an absolute value of the quadratic differentiated signal, the maximum value is detected at step ST112 in a processing block. Using this maximum value, the BPF processed picture is converted at the next step ST113 into a binary-valued picture to detect the edge. The threshold value for the convert-to-binary operation may, for example, be one-half the maximum value obtained on quadratic differentiation and absolute value taking in a block, as in the above-described embodiment.

The edge extraction unit 82' of FIG. 35 differentiates the luminance signal input from the terminal 77 by the BPF 87' by quadratic differentiation as described above. An absolute value circuit 110 and a maximum value detection circuit 88 take an absolute value and a maximum value, respectively. The maximum value from the maximum value detection circuit 88 is sent to the convert-to-binary circuit 89 to convert the signal from the absolute value circuit 110 into a binary signal. An output of the convert-to-binary circuit 89 is sent to a vertical correlation detection unit 111.

The vertical correlation detection unit 111 finds the intensity of the vertical correlation in the block boundary of the extracted edge components. A typical method of finding the intensity of the vertical correlation is explained using FIG. 36.

Figure 36:
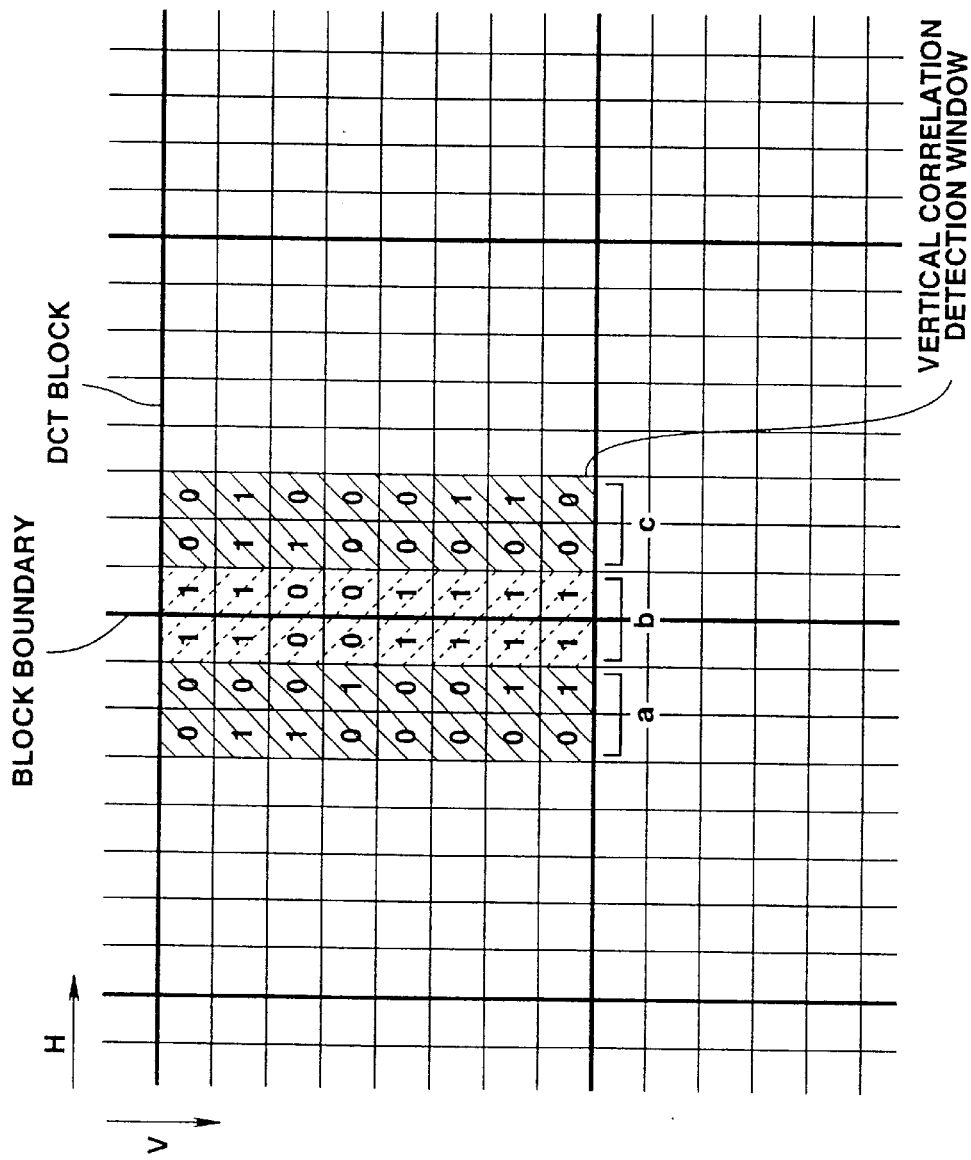
FIG. 36 shows pixels in the vicinity of the DCT block boundary for illustrating the method for finding the intensity of vertical correlation.

The vertical correlation detection unit 111 splits pixels in a vertical correlation detection window into an area b containing a block boundary under consideration and its neighboring areas a and c. The number of the extracted edge components is computed for each of these areas. In FIG. 36, the pixels extracted as an edge are denoted as 1 and those not decided to be edges are denoted as 0. In the present example, Ea=5, Eb=12 and Ec=5.

The ratio Kv of the number of the edge components in the area containing the block boundary to that in the areas not containing the block boundary is found for classification (step ST114 of FIG. 34).

For example, this classification is made so that for Kv≧4, the class is class 1;

2≦Kv<4, the class is class 2;

1≦kv<2, the class is class 3; and

Kv<1, the class is class 4.

Figure 37:
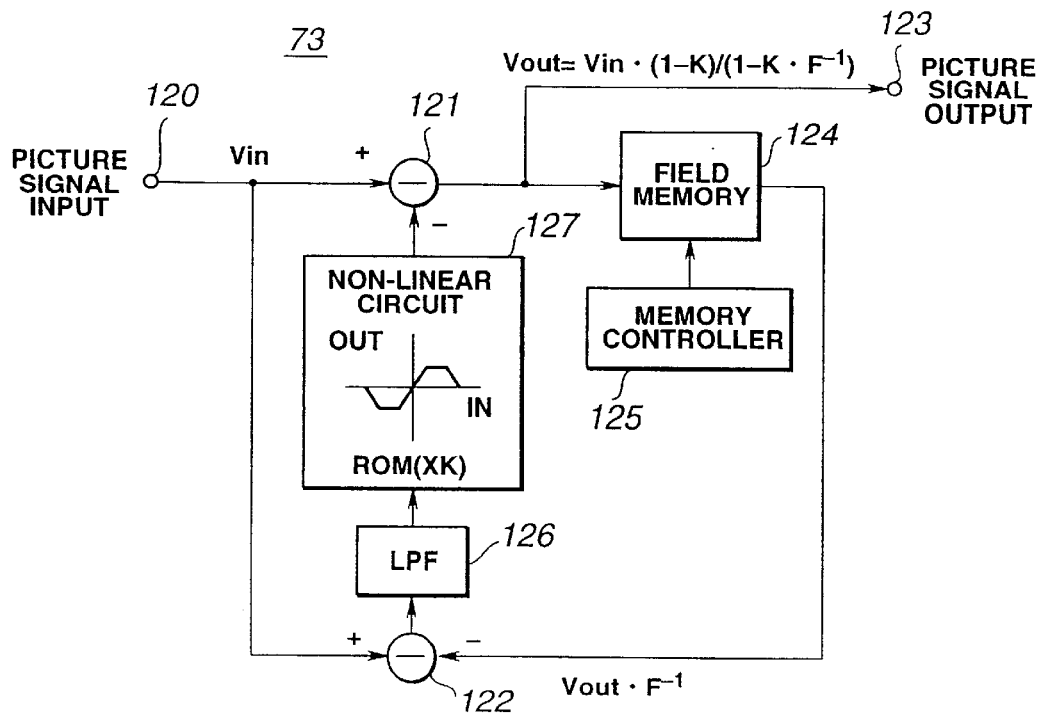
FIG. 37 is a block diagram showing a typical field recursive type noise reduction circuit.

In the embodiment of FIG. 37, since $$Kv=(2\times12)/(5+5) =2.4,$$

the class is class 2.

The role of a block distortion decision unit 91' of FIG. 35 is hereinafter explained. For each class, a weighting coefficient Kc is assigned. The weighting coefficients, assigned to the respective classes, may be selected, for example, as follows:

| class | weighting coefficient |
|---|---|
| 1 | 1 |
| 2 | 0.75 |
| 3 | 0.5 |
| 4 | 0.25 |

From the respective parameter values, as found in the parameter calculating unit, the decision on correction off/strong correction/weak correction is given to obtain a weighting coefficient Kp.

| correction stage | weighting coefficient Kp |
|---|---|
| off | 0 |
| weak | 0.5 |
| strong | 1 |

The product of the weighting coefficients Kc and Kp is sent to a correction value calculation unit to control the correction quantity of the block distortion.

Therefore, if the block boundary exhibits strong vertical correlation, the correction quantity is increased to render it possible to remove the block distortion effectively. That is the block distortion can be improved in detection accuracy.

Since the structure and the operation of FIG. 35 are otherwise the same as those of the embodiment of FIG. 28, the corresponding portions are indicated by the same reference numerals and are not explained specifically.

In the present embodiment, the numbers of the classes and the correction stages are four and three, respectively. This configuration is, however, merely illustrative since the weighting coefficient Kc may be found by the following equation:

$Kc=Eb/(Ea+Eb+Ec)$.

The value of div_th, which is a threshold value for detection by the block distortion decision unit, may also be controlled by the classes obtained from the correlation detection unit. For example, since the weaker the vertical correlation, the lower is the possibility that the block distortion persists, the value of the detection threshold div_th is increased to perform control in a direction of increasing the detection difficulty.

Although the above-described algorithm is used in connection with an edge extraction unit, correction signal calculation unit and the block distortion verification parameter calculating unit of the present embodiment, these parameters are merely illustrative. For example, an LPF may be used for the correction signal calculating unit, while a variety of edge extraction methods, such as an edge extraction method by edge trailing, and a variety of optional parameters, may be used for the edge extraction unit and for the block distortion decision unit, respectively.

Although the foregoing embodiment is directed to applying correction for block distortion in the horizontal direction of the luminance signal, this embodiment is merely illustrative and, for example, correction for block distortion may be applied to the vertical direction or to the chroma signals.

With the above-described block distortion reducing circuit, in which edge components of input picture data are extracted, the motion is detected, the parameters required for block distortion discrimination are found, the block distortion is discriminated on the basis of the results of edge detection, results of motion detection, and the results of parameter calculations, and the correction of block distortion is applied responsive to the results of discrimination, the block distortion can be discriminated effectively by using the information on the edge components and motion detection, thus preventing the occurrence of mistaken discrimination. The result is evasion of inconveniences inherent to mistaken discrimination of the block distortion, such as failure in complete elimination of distortion or producing pseudo-edges due to mistaken edge correction.

Referring to FIG. 37, an illustrative example of a field recursive noise reduction circuit 73 is hereinafter explained.

To an input terminal 120 of FIG. 37 are supplied picture signals from the block distortion reducing circuit 72 shown in FIG. 27. These input picture signals Vin are sent to subtractors 121, 122. An output signals of the subtractor 121 is retrieved via an output terminal 123 and written in a field memory 124. A memory controller 125, provided in association with the field memory 124, controls the writing and readout of the field memory 124. The readout data of the field memory 124 are delayed one field with respect to the writing data. That is, if the output signal and the field delay are denoted as Vout and as F−1, respectively, an output signal of the field memory 124 is Vout·F−1. This field-delayed output signal is sent to the subtractor 122 which subtracts the field-delayed output signal Vout·F−1 from the input signal Vin to output the resulting signal.

An output signal of the subtractor 122 is sent via a band-limiting low-pass filter (BPF) 126 to a non-linear circuit 127. This non-linear circuit 127, multiplying the output signal with a feedback coefficient K depending on the signal level of the output of the LPF 126 as an input signal, is constituted by, for example, a ROM. The non-linear circuit 127 has input/output characteristics such that it outputs a smaller field difference as noise components while outputting a larger field difference reduced to zero on the assumption that such larger field difference is caused by the motion. That is, the non-linear circuit 127 extracts noise components by exploiting the characteristics that noise components are small in field-to-field correlation and low in amplitude.

An output signal of the nonlinear circuit 127 K·(Vin−Vout·F−1) is sent to the subtractor 121 for extraction from the input picture signal Vin. This is tantamount to subtracting the noise component, extracted by the subtractor 121, from the input picture signal Vin, to derive a noise-reduced output picture signal Vout.

From Vout=Vin−K·(Vin−Vout·F−1) and Vout·(1−K·F−1)= Vin·(1−K), the output picture signal Vout is given by $Vout=Vin·(1-K)/(1-K·F-1)$.

Figure 38:
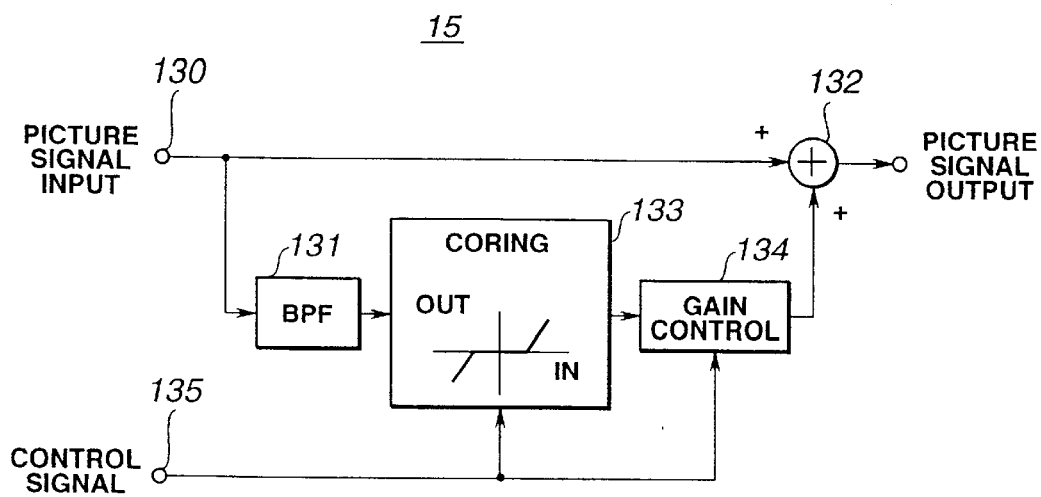
FIG. 38 is a schematic block diagram showing a typical contour enhancement circuit as picture quality correction means.

Referring to FIG. 38, a contour enhancement circuit, as an illustrative example of the picture quality correction circuit 15 of FIG. 4, is hereinafter explained.

FIG. 38 shows an illustrative structure of the contour enhancement circuit which is to be the picture quality correction circuit 15. In FIG. 38, picture data from the noise reducing circuit 14 of FIG. 4, specifically picture data obtained from the field recursive noise reduction circuit 73 of FIG. 37 via output terminal 74, is sent to an input terminal 130. An input signal from the input terminal 130 is sent to a band-pass filter (BPF) 131 and to an adder 132. The BPF 131 extracts mid to high frequency components, such as picture contour components. The extracted contour components are sent to a coring circuit 133 so as to be subjected to non-linear processing (coring) of removing noise components, such as small amplitude signals. The resulting signals are sent to a gain control circuit 134 and thereby controlled in the correction quantity so as to be sent as a correction signal to an adder 132.

To a terminal 135 are sent control signals from the control circuit 19 of FIG. 4. These control signals are sent to the coring circuit 133 and to a gain control circuit 134. Specifically, a control switch for contour enhancement is provided in the actuating input unit 20 of FIG. 4. By acting on this switch, it is possible to control the strength of the effect of contour enhancement.

This enhances the mid to high frequency components in the picture signals to improve the definition of the picture.

In the above-described picture quality correction circuit 15, in which the noise, such as the block distortion, produced on picture compansion using block DCT encoding, is removed in advance, it is possible to improve the effect of correction of picture quality, such as contour enhancement subsequently.

Also, in the picture quality correction circuit 15, the weighted encoding information may be used for performing adaptive processing in the post-processing, such as by the contour enhancement circuit.

That is, it may be contemplated, for reducing the failure due to mistaken discrimination of the block distortion, to control the quantity of correction of the block distortion depending on the size of the step difference of the block boundary. If, in this case, the step difference of the block boundary is significant, the correction quantity is diminished, such that a small step difference of the block boundary is left. For not enhancing the residual block distortion, adaptive processing of contour enhancement is performed, using the weighted encoding information.

Figure 39:
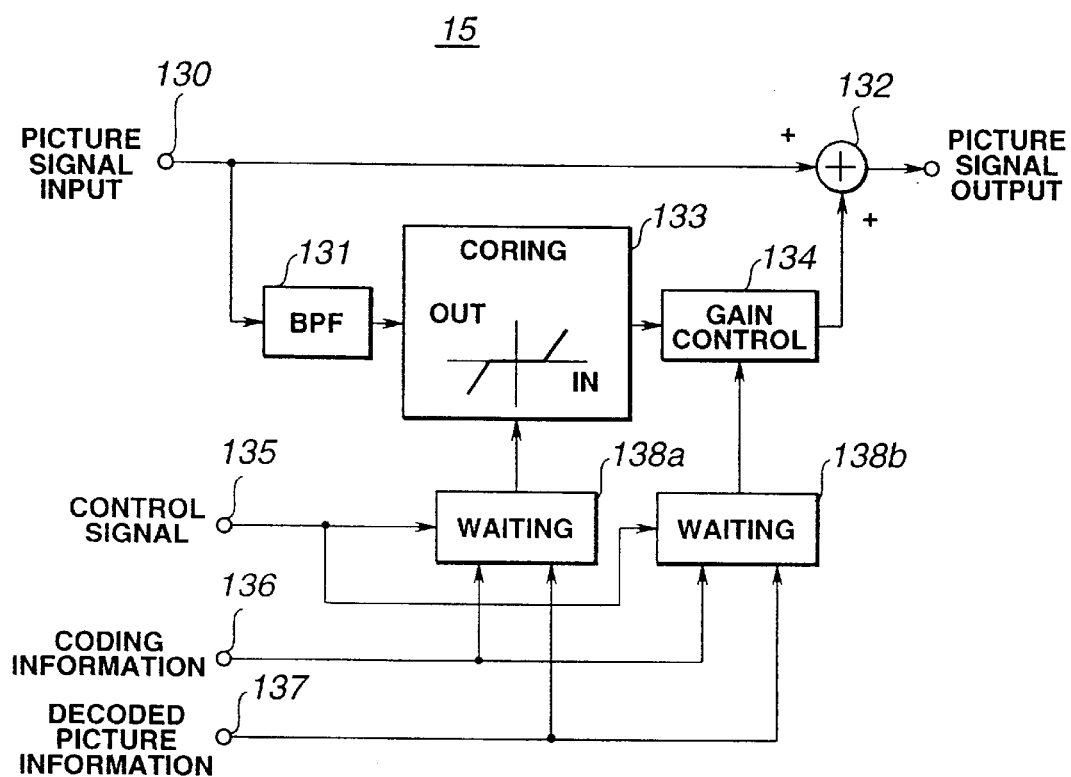
FIG. 39 is a block diagram showing another typical contour enhancement circuit.

FIG. 39 is a block diagram showing the structure of the contour enhancement circuit according to this modification. In a gain control circuit 134, shown in FIG. 39, the control signals sent from the control circuit 19 of FIG. 4 are weighted by a weighting circuit 138b, on the basis of the value of the quantization step, as the quantization information from a terminal 136, the value of the step difference of the block boundary as the decoded picture information from the terminal 137 and the distance from the block boundary. If the gain setting value, as a parameter supplied to the gain control circuit 19 of FIG. 1, is Gst, the quantization step weighting coefficient is KQ and the weighting coefficient of the boundary distance is LW, the gain value G, as a parameter supplied to the gain control circuit 134, is found by, for example, the following equation:

$$G=Gst \times (KQ/8) \times (LW/4)$$

where ⅛ and ¼ denote normalization coefficient.

Figure 40:
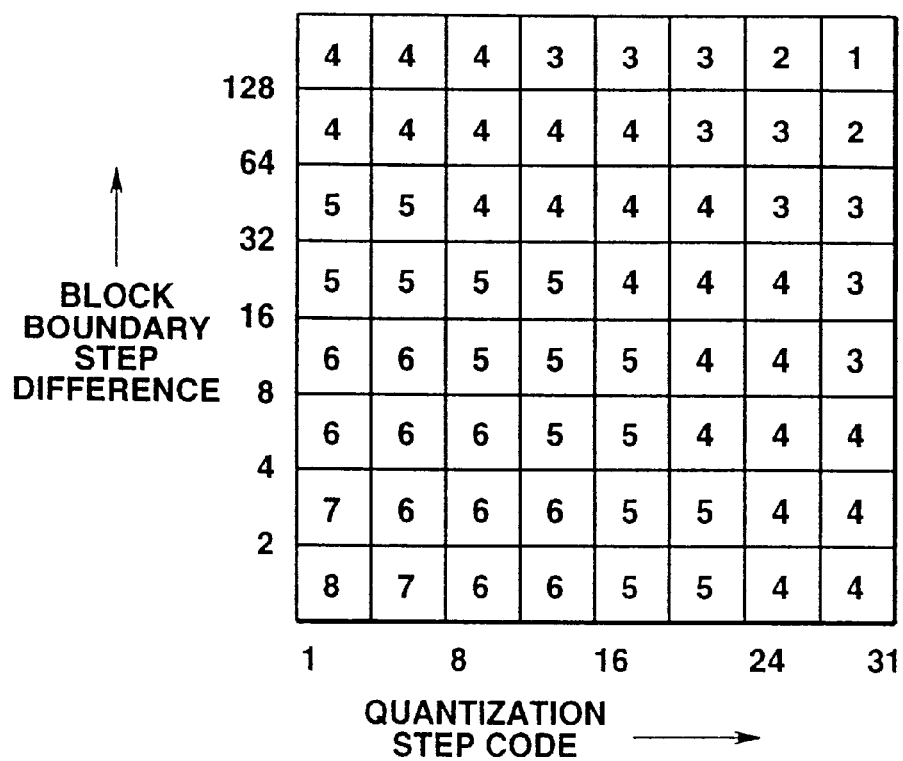
FIG. 40 shows a specified example of quantization step weighting coefficients for referred to the quantization step codes and the block boundary step difference.
Figure 41:
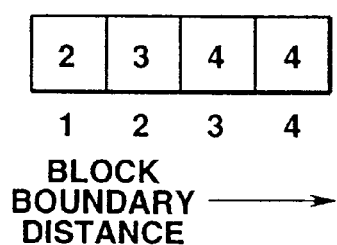
FIG. 41 illustrates typical boundary distance weighting coefficients for the block boundary distance.

FIGS. 40 and 41 denote the quantization step weighting coefficient for the quantization step code and the block boundary step difference and the boundary distance weighting coefficient for the block boundary distance, respectively.

By way of an example, it is assume that, with the gan setting value as the control signal from a terminal 135 equal to 2, the quantization step code and the block boundary step difference are accorded, such that, from the table of FIG. 40, the quantization step weighting coefficient is 4. It is also assumed that the distance 1 from the block boundary is accorded to the table of FIG. 41 to give a boundary distance weighting coefficient equal to 2. In this case, the parameter sent to the gain control circuit 134, that is the gain G, is given by $$G=2 \times (4/8) \times (2/4)=0.5$$

thus weakening the contour enhancement effect.

This also applies for the coring circuit 133.

That is, in the coring circuit 133, shown in FIG. 39, the parameters sent from the terminal 135, as control signals, are weighted by a weighting circuit 138a, based on the value of the quantization step, as the quantization information from a terminal 136, the value of the step difference of the block boundary as the decoded picture information from the terminal 137 and on the distance from the block boundary.

Figure 42:
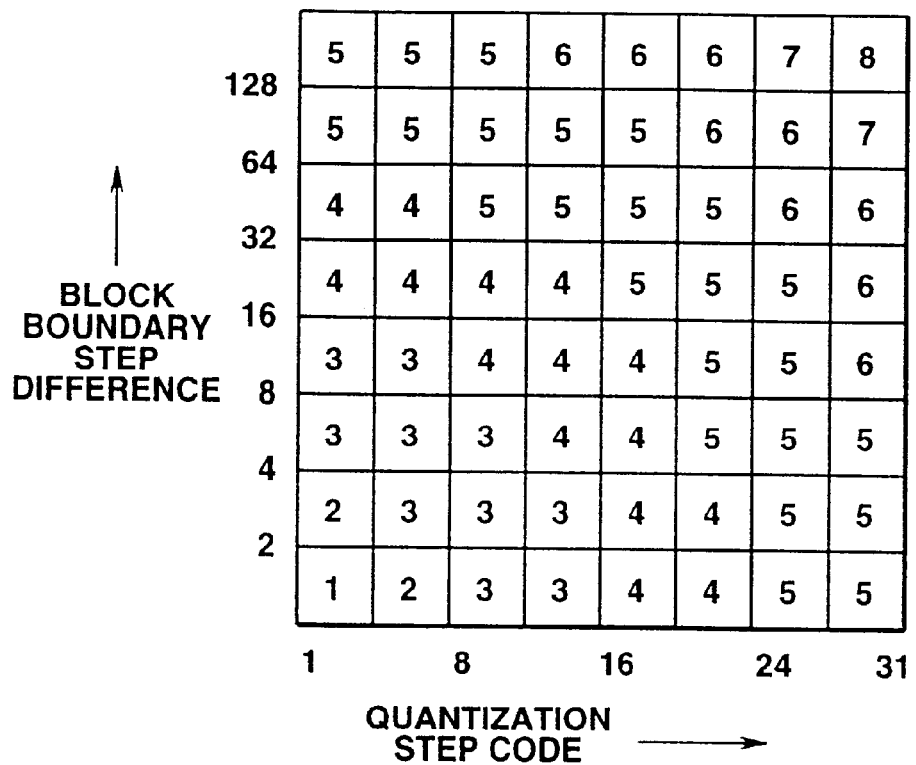
FIG. 42 illustrates typical coring weighting coefficients referred to the quantization step code and the block boundary step difference.

FIG. 42 shows the coring weighting coefficient for the quantization step code and the block boundary step difference. If the coring setting value in the control circuit 19 of FIG. 4 is Cst, the weighting coefficient is KC and the weighting coefficient of the boundary distance is LW, the value of the parameter C, sent to the coring circuit 133, is found by, for example, the following equation:

$$C=Cst \times KC \times (LW/4)$$

where ¼ is a divisor for normalization.

Meanwhile, the characteristics of FIGS. 39 to 42 are merely illustrative and are not intended for limiting the invention. In case of compansion in the aforementioned MPEG system, the quantization step is varied on the macro-block basis. It is therefore possible to take into account the difference of the quantization step of the neighboring macro-blocks in the block boundary under consideration.

The picture quality correction circuit 15 also is not limited to the above-described embodiment. For example, although the above-described embodiment has been explained in connection with the processing in the horizontal direction, the description applies for the vertical (V) direction as well. The present invention also may be applied not only to the processing of luminance signals but also that of chroma signals.

Thus, in the picture quality correction circuit 15, including the contour enhancement circuit, in which, in decoding and processing the encoded picture signals, the decoded picture signals are reduced in noise and the picture signals thus reduced in noise are corrected for the picture quality, it is possible to achieve effective correction of the picture quality, such as by contour enhancement.

Specifically, by first reducing or eliminating the quantization distortion or noise, such as mosquito noise, produced on picture compansion, such as block DCT and encoding, and by subsequently corecting the picture quality, such as by contour enhancement, it is possible to remove the block distortion or the mosquito noise or to correct the picture quality such as by contour enhancement.

Moreover, in the course of the above-described noise reduction, the distortion or noise produced in the picture or the distortion or noise produced between pictures may be effectively removed by first reducing the noise in the screen of the picture signals and subsequently reducing the noise produced between the pictures.

With the MPEG encoder 5 of the above-described optical disc recording/reproducing device 1, it is also possible to encode the intensity of the pre-filter including its on/off state every sequence, every GOP, every picture, every slice or every macro-block and to append the encoded intensity as data to the header of the picture data for recording on the optical disc D. It is also possible to transmit the data specifying the intensity of the pre-filter to the noise reducing circuit 14 over a transmission channel.

An instance of appending data specifying the pre-filter intensity every slice to picture data in this manner to the optical disc recording/reproducing device 1 is explained using the MPEG encoder 5 shown in FIG. 5.

Figure 43:
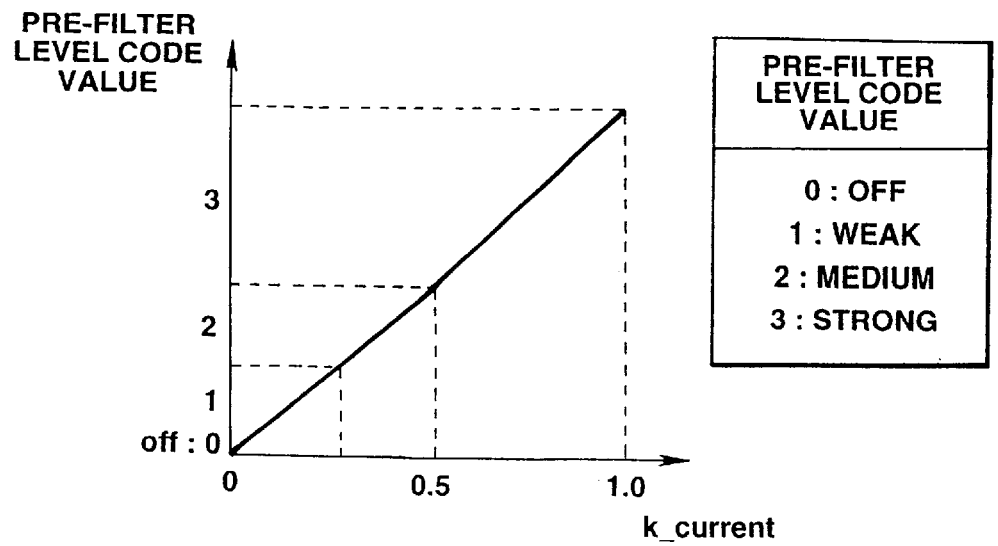
FIG. 43 shows the relation between the pre-filter level and the filter coefficients $k_{13}$ current.

For generating data specifying the intensity of the pre-filter 23 every slice, a representative value in each slice of the slice-based filter coefficient k_current is determined and generated. In determining the slice-based representative value, it is coded in, for example, four stages, as shown in FIG. 43. In this figure, the code values of the pre-filter level (pre-filter intensity) are determined responsive to the intensity of the filter coefficient k_current. Specifically, the pre-filter levels are coded so that the filter off state, weak filter level, medium filter level and the strong filter level are coded to 0, 1, 2 and 3, respectively.

This representative value is an average value of the small blocks in each slice. The coded intensity values of the pre-filter 23 are appended as the picture data headers along with a variety of additional information items. The pre-filter levels, indicating the intensity of the pre-filter 23, are appended to the picture data by, for example, the moving picture encoding circuit 24, for recording on the optical disc D. These pre-filter levels are sent via MPEG decoder 13 to the noise reducing circuit 14 and to the picture quality correction circuit 15.

The pre-filter level, specifying the filter intensity, may also be entered from the pre-filter 23 to the noise reducing circuit 14 and/or the picture quality correction circuit 15 over a transmission channel as the encoding information.

An instance of using data specifying the pre-filter intensity in the noise reducing circuit 14 is explained.

Figure 44:
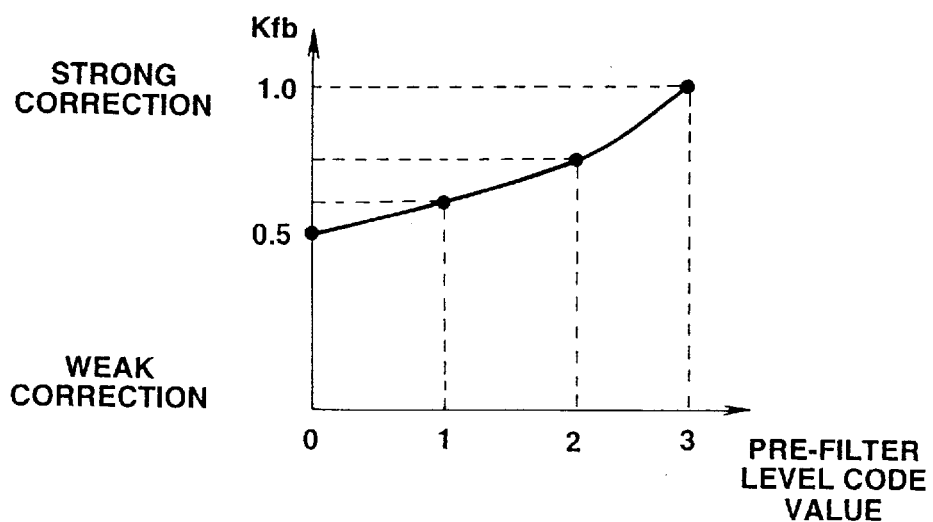
FIG. 44 shows the relation between the coefficients Kfb related to the code values and the pre-filter level.

If the pre-filter level is used in the above-mentioned block distortion reducing circuit 72, the above-mentioned weighting coefficient Kc is changed using a coefficient Kfb corresponding to the code value from the MPEG encoder 5. That is, the present block distortion reducing circuit 72 sets the weighting coefficient Kcf of block distortion correction based on the pre-filter level by $$Kcf=Kc \times Kfb$$

where Kfb is set as shown in FIG. 44 in accordance with the pre-filtering level.

Figure 45:
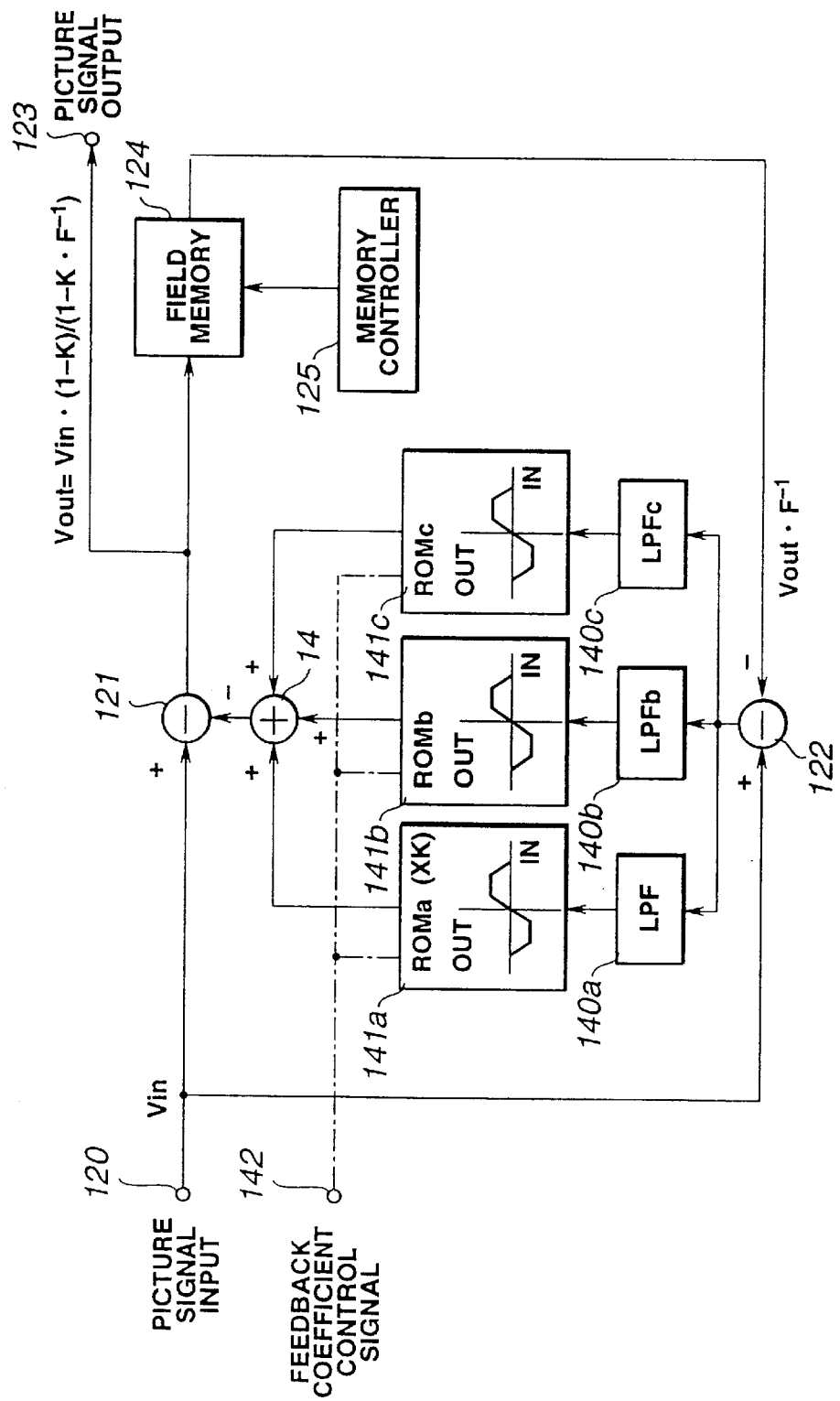
FIG. 45 is a block diagram showing another typical field recursive noise reducing circuit.
Figure 46A:
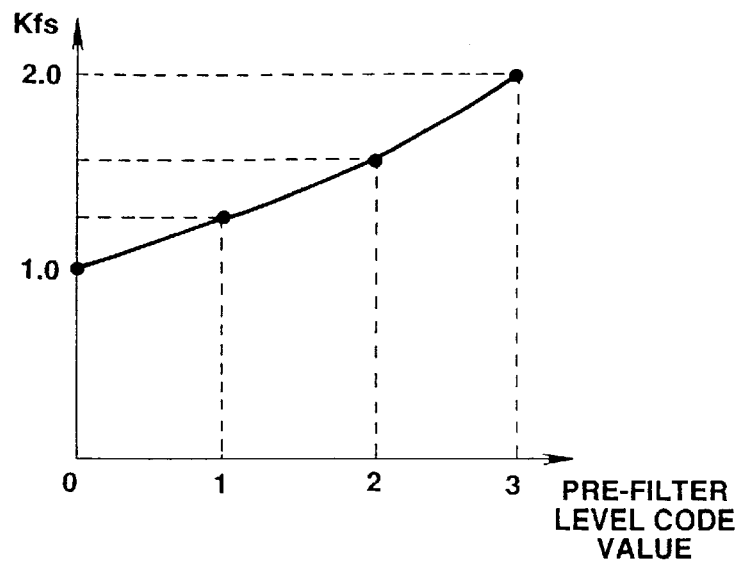
FIGS. 46A and 46B illustrate the relation between the weighting coefficient Kfs and the pre-filter level and that between the weighting coefficients Kfc and the pre-filter level, respectively.
Figure 46B:
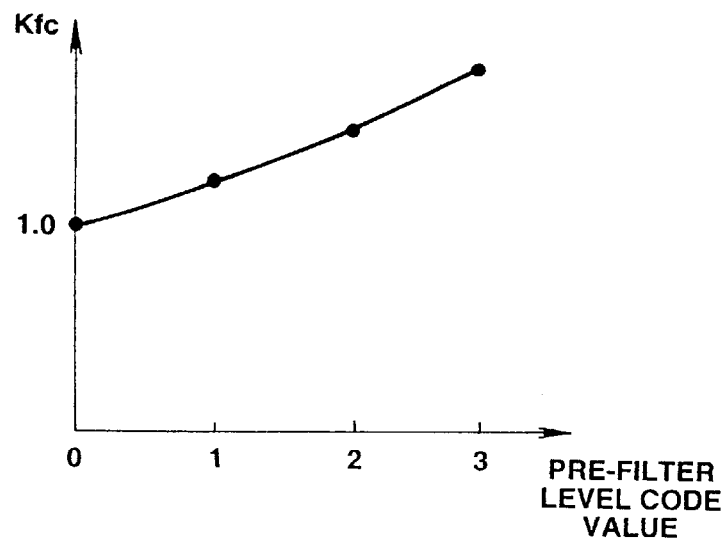

The field recursive noise reducing circuit may be configured as shown in FIG. 45. That is, the field recursive noise reducing circuit 73, shown in FIG. 45, is made up of a subtractor 121, a subtractor 122, an LPF 140a and band-pass filters 140b, 140c, limiting the frequency bands, non-linear circuits 141a to 141c, a field memory 124 and a memory controller 125. In the following description, parts or components which are the same as those of the above-described field recursive noise reducing circuit are depicted by the same reference numerals and are not explained specifically.

The present field recursive noise reducing circuit 73 has the LPF 140a and the BPFs 140b and 140c for controlling the feedback quantity from one frequency band to another. That is, with the present field recursive noise reducing circuit 73, the pre-filter level is sent from a terminal 142 to the non-linear circuits 141a to 141c, to change the feedback quantity responsive to the pre-filter level from the MPEG encoder 5. The non-linear circuits 141a to 141c vary the input/output characteristics responsive to the supplied pre-filtering level.

With the present field recursive noise reducing circuit 73, control is managed so that the feedback quantity of the higher frequency band will be increased for the stronger pre-filter level. It is thus possible with the present field recursive noise reducing circuit 73 to reduce the noise of the smaller amplitude in the frequency band having high field difference signals. With the field recursive noise reducing circuit 73, soft switching is preferably used to prevent the feedback quantity from being abruptly changed in the frequency band based boundary.

The picture data traversing the non-linear circuits 141a to 141c are summed by the adder 143 and thence supplied to the subtractor 121.

This efficiently removes the high frequency component generated on decoding the signal portions pre-filtered in the above-mentioned MPEG encoder 5. Thus, it is possible with the present field recursive noise reducing circuit 73 to remove the block distortion or mosquito noise produced in the picture data encoded by the MPEG encoder 5 and subsequently decoded by using data specifying the intensity of the pre-filter level.

An instance of using the pre-filter level in the picture quality correction circuit 15 shown in FIG. 39 is explained.

In the present picture quality correction circuit 15, the weighting coefficients generated by weighting circuits 138a, 138b, are varied. That is, in the present picture quality correction circuit 15, the gain of a gain control circuit 134 is multiplied with a coefficient Kfs corresponding to the pre-filter level, while a coring setting value of the coring circuit 133 is multiplied with a coefficient Kfc corresponding to the pre-filter level. That is, the coring circuit sets the coring setting value to Cst'=Cst×Kfs, while the gain control circuit 134 sets the gain to G'=G×Kfc. The weighting coefficients Kfs and Kfc corresponding to the pre-filter level are varied in accordance with the pre-filter level. As in the above-described field recursive noise reducing circuit 73, it is desirable to effect smooth switching in terms of frequency so that the gain and coring setting value are not changed abruptly with the frequency bands.

Thus, with the present picture quality correction circuit 15, the picture quality can be corrected responsive to the high frequency components produced on encoding and subsequent decoding to enable efficient correction of the picture quality.

What is claimed is:

1. A picture signal processing apparatus for encoding and decoding an input picture on a block basis, comprising:

filtering means for filtering the input picture responsive to characteristics of the input picture;

encoding means for block encoding a picture filtered by the filtering means;

decoding means for decoding the picture encoded by said encoding means; and noise reducing means for reducing at least the block distortion of the picture decoded by said decoding means, said noise reducing means comprising:

extracting means for extracting an edge component of an input picture;

detecting means for detecting the motion of the input picture;

first calculating means for calculating parameters required for block distortion discrimination from the input picture;

discriminating means for discriminating the block distortion based on the results of edge detection, the results of motion detection and the results of the parameter calculations;

second calculating means for calculating a correction value for reducing the block distortion; and correction means for correcting the input picture by said correction value corresponding to the results of decision of said block distortion on the input picture and outputting the corrected input picture by way of noise reduction.

2. The picture signal processing apparatus according to claim 1 wherein said noise reducing means reduces the noise in a picture and subsequently reduces the noise generated between pictures.

3. The picture signal processing apparatus according to claim 1 further comprising:

picture quality correction means for correcting the picture quality of a picture;

said picture quality correction means correcting the picture quality of an input picture processed with a noise reducing operation by said noise reducing means.

4. The picture signal processing apparatus according to claim 1 wherein said filtering means fibers said input picture to reduce the mosquito noise produced in the picture decoded by said decoding means.

5. The picture signal processing apparatus according to claim 1 further comprising:

switching selecting means for switching between the corrected signal and the input picture responsive to the results of discrimination from said block distortion discriminating means and outputting the result of switching.

6. The picture signal processing apparatus according to claim 1 wherein said filtering means filters an input picture made up of luminance signals and chroma signals and wherein said noise reducing means performs the noise reduction on one of the luminance signals or the chroma signals.

7. The picture signal processing apparatus according to claim 1 wherein said noise reducing means performs noise reduction on at least one of the vertical direction or the horizontal direction of the input picture.

8. The picture signal processing apparatus according to claim 1 further comprising:

recording/reproducing means for recording an input picture on a recording medium and for reproducing the input picture recorded on the recording medium;

said recording/reproducing means recording the input picture encoded by said encoding means and reproducing the encoded input picture recorded on the recording medium.

9. The picture signal processing apparatus according to claim 8 wherein said encoding means appends a filtering level detected by said filter level detection means to an input picture for encoding the input picture and wherein said recording/reproducing means records the input picture with the filtering level appended thereto by said encoding means on the recording medium.

10. The picture signal processing apparatus according to claim 1 further comprising:

filtering level detection means for detecting the filtering level of filtering performed by said filtering means;

said filtering level detection means furnishing the detected filtering level to said noise reducing means, said noise reducing means at least reducing the block distortion of the input picture decoded by said decoding means responsive to the filter level.

11. The picture signal processing apparatus according to claim 10 wherein said filter level detection means sends the detected filtering level to said picture quality collection means, said picture quality correction means correcting the picture quality of the input picture decoded responsive to the filtering level.

12. A picture signal processing method for encoding and decoding an input picture on a block basis, comprising:

filtering the input picture responsive to characteristics of the input picture;

block encoding a filtered input picture;

decoding the picture encoded by said block encoding; and reducing at least the block distortion of the decoded picture by performing the steps of:

extracting an edge component of an input picture;

detecting the motion of the input picture;

calculating parameters required for block distortion discrimination from the input picture;

discriminating the block distortion based on the results of edge detection, the results of motion detection and the results of the parameter calculations;

calculating a correction value for reducing the block distortion; and performing correction by said correction value corresponding to the results of decision of said block distortion on the input picture and outputting the corrected input picture by way of noise reduction.

13. The picture signal processing method according to claim 12 wherein the noise-reduced picture is processed with picture quality correction.

14. The picture signal processing method according to claim 12 wherein said noise in a picture is reduced and subsequently the noise generated between pictures is reduced.

15. The picture signal processing method according to claim 12 wherein said input picture is filtered to reduce the mosquito noise produced in the picture by decoding.

16. The picture signal processing method according to claim 12 wherein, in discriminating the block distortion, the intensity of the block distortion is discriminated in plural stages and the correction is performed with a correction quantity corresponding to the discriminated intensity.

17. The picture signal processing method according to claim 12 wherein the input picture is made up of luminance signals and chroma signals and the noise reducing operation is performed on at least one of the luminance signals or chroma signals.

18. The picture signal processing method according to claim 12 wherein said noise reducing means performs noise reduction on at least one of the vertical direction or the horizontal direction of the input picture.

19. The picture signal processing method according to claim 12 wherein the encoded input picture is recorded on a recording medium and the input picture recorded on the recording medium is reproduced.

20. The picture signal processing method according to claim 12 further comprising:

detecting the filtering level in the filtering;

doing decoding responsive to the filtering level, and reducing at least the block distortion of the decoded input picture.

21. The picture signal processing method according to claim 20 further comprising detecting the filtering level in the filtering; and correcting the picture quality of the input picture decoded responsive to the detected filtering level.

22. The picture signal processing method according to claim 20 further comprising:

attaching the detected filter level to the input picture to encode the picture; and recording the picture with the filtering level attached thereto on the recording medium.

* * * * *